US008493601B2

(12) United States Patent
Hull et al.

(10) Patent No.: US 8,493,601 B2
(45) Date of Patent: Jul. 23, 2013

(54) TECHNIQUES FOR PERFORMING ACTIONS BASED UPON PHYSICAL LOCATIONS OF PAPER DOCUMENTS

(75) Inventors: Jonathan J. Hull, San Carlos, CA (US); Jamey Graham, San Jose, CA (US); Dar-Shyang Lee, Union City, CA (US)

(73) Assignee: Ricoh Company Ltd., Tokyo (JP)

( * ) Notice: Subject to any disclaimer, the term of this patent is extended or adjusted under 35 U.S.C. 154(b) by 51 days.

(21) Appl. No.: 12/980,097

(22) Filed: Dec. 28, 2010

(65) Prior Publication Data

US 2011/0140857 A1 Jun. 16, 2011

Related U.S. Application Data

(63) Continuation of application No. 10/235,028, filed on Sep. 3, 2002, now Pat. No. 7,884,955.

(51) Int. Cl.
*G06F 3/12* (2006.01)
*G06F 19/00* (2011.01)
*G06K 15/00* (2006.01)
*H04Q 5/22* (2006.01)

(52) U.S. Cl.
USPC ........ 358/1.15; 358/1.12; 358/1.16; 235/385; 340/10.6

(58) Field of Classification Search
None
See application file for complete search history.

(56) References Cited

U.S. PATENT DOCUMENTS

| 4,862,160 | A | 8/1989 | Ekchian et al. |
|---|---|---|---|
| 5,287,414 | A | 2/1994 | Foster |
| 5,666,490 | A | 9/1997 | Gillings et al. |
| 5,689,238 | A | 11/1997 | Cannon, Jr. et al. |
| 5,706,452 | A | 1/1998 | Ivanov |
| 5,732,401 | A | 3/1998 | Conway |
| 5,926,116 | A | 7/1999 | Kitano et al. |
| 5,933,829 | A | 8/1999 | Durst et al. |
| 5,936,527 | A | 8/1999 | Isaacman et al. |
| 5,939,981 | A | 8/1999 | Renney |
| 5,942,987 | A | 8/1999 | Heinrich et al. |
| 5,974,202 | A | 10/1999 | Wang et al. |
| 5,978,477 | A * | 11/1999 | Hull et al. ............. 358/403 |

(Continued)

FOREIGN PATENT DOCUMENTS

| CA | 2354464 A1 | 2/2002 |
|---|---|---|
| DE | 19646153 A1 | 5/1998 |

(Continued)

OTHER PUBLICATIONS

Notice of Allowance for U.S. Appl. No. 12/880,869 mailed on Aug. 3, 2012, 7 pages.*

(Continued)

*Primary Examiner* — Vincent Rudolph
(74) *Attorney, Agent, or Firm* — Kilpatrick Townsend & Stockton LLP

(57) ABSTRACT

According to one set of embodiments, techniques are provided for performing actions based upon physical locations of one or more paper documents. According to another set of embodiments, techniques are provided for tracking the physical locations of paper documents. According to another set of embodiments, techniques are provided for determining electronic document information for paper documents. According to another set of embodiments, techniques are provided for determining and tracking the contents of a container. According to another set of embodiments, a document security system is provided. According to another set of embodiments, techniques are provided for tracking documents in a workflow.

19 Claims, 31 Drawing Sheets

U.S. PATENT DOCUMENTS

| | | | |
|---|---|---|---|
| 5,978,773 | A | 11/1999 | Hudetz et al. |
| 6,008,727 | A | 12/1999 | Want et al. |
| 6,055,544 | A | 4/2000 | DeRose et al. |
| 6,100,804 | A | 8/2000 | Brady et al. |
| 6,104,834 | A | 8/2000 | Hull |
| 6,108,656 | A | 8/2000 | Durst et al. |
| 6,122,520 | A | 9/2000 | Want et al. |
| 6,127,928 | A | 10/2000 | Issacman et al. |
| 6,130,621 | A | 10/2000 | Weiss |
| 6,176,425 | B1 | 1/2001 | Harrison et al. |
| 6,195,006 | B1 | 2/2001 | Bowers et al. |
| 6,199,048 | B1 | 3/2001 | Hudetz et al. |
| 6,204,764 | B1 | 3/2001 | Maloney |
| 6,232,870 | B1 | 5/2001 | Garber et al. |
| 6,249,226 | B1 | 6/2001 | Harrison et al. |
| 6,259,367 | B1 | 7/2001 | Klein |
| 6,260,049 | B1 | 7/2001 | Fitzgerald et al. |
| 6,262,662 | B1 | 7/2001 | Back et al. |
| 6,263,121 | B1* | 7/2001 | Melen et al. ........... 382/305 |
| 6,278,413 | B1 | 8/2001 | Hugh et al. |
| 6,294,998 | B1 | 9/2001 | Adams et al. |
| 6,297,737 | B1 | 10/2001 | Irvin |
| 6,304,182 | B1 | 10/2001 | Mori et al. |
| 6,307,473 | B1 | 10/2001 | Zampini et al. |
| 6,324,353 | B1 | 11/2001 | Laussermair et al. |
| 6,326,889 | B1 | 12/2001 | Van Horn et al. |
| 6,333,690 | B1 | 12/2001 | Nelson et al. |
| 6,335,685 | B1 | 1/2002 | Schrott et al. |
| 6,337,619 | B1 | 1/2002 | Kowalski et al. |
| 6,340,931 | B1* | 1/2002 | Harrison et al. ........... 340/572.1 |
| 6,341,931 | B1 | 1/2002 | Bates |
| 6,354,493 | B1 | 3/2002 | Mon |
| 6,359,628 | B1 | 3/2002 | Buytaert |
| 6,380,894 | B1 | 4/2002 | Boyd et al. |
| 6,409,401 | B1* | 6/2002 | Petteruti et al. ........... 400/88 |
| 6,427,032 | B1 | 7/2002 | Irons et al. |
| 6,430,554 | B1 | 8/2002 | Rothschild |
| 6,434,561 | B1 | 8/2002 | Durst, Jr. et al. |
| 6,442,563 | B1 | 8/2002 | Bacon et al. |
| 6,512,919 | B2 | 1/2003 | Ogasawara |
| 6,539,281 | B2 | 3/2003 | Wan et al. |
| 6,542,933 | B1 | 4/2003 | Durst, Jr. et al. |
| 6,600,418 | B2 | 7/2003 | Francis et al. |
| 6,651,053 | B1 | 11/2003 | Rothschild |
| 6,651,063 | B1 | 11/2003 | Vorobiev |
| 6,655,586 | B1 | 12/2003 | Back et al. |
| 6,675,165 | B1 | 1/2004 | Rothschild |
| 6,707,381 | B1 | 3/2004 | Maloney |
| 6,766,363 | B1 | 7/2004 | Rothschild |
| 6,801,907 | B1 | 10/2004 | Zagami |
| 6,825,753 | B2 | 11/2004 | Cardinale et al. |
| 6,860,422 | B2 | 3/2005 | Hull et al. |
| 6,865,608 | B2 | 3/2005 | Hunter |
| 6,892,376 | B2 | 5/2005 | McDonald et al. |
| 6,993,573 | B2 | 1/2006 | Hunter |
| 7,006,664 | B2 | 2/2006 | Paraskevakos |
| 7,030,760 | B1* | 4/2006 | Brown ........... 340/568.1 |
| 7,129,840 | B2 | 10/2006 | Hull et al. |
| 7,357,300 | B2 | 4/2008 | Hull et al. |
| 7,373,850 | B2 | 5/2008 | Malik |
| 7,424,974 | B2 | 9/2008 | Hull et al. |
| 7,506,250 | B2 | 3/2009 | Hull et al. |
| 7,652,555 | B2 | 1/2010 | Hull et al. |
| 7,884,955 | B2 | 2/2011 | Hull et al. |
| 2001/0047381 | A1 | 11/2001 | De Meno et al. |
| 2002/0005774 | A1* | 1/2002 | Rudolph et al. ........... 340/5.61 |
| 2002/0032698 | A1 | 3/2002 | Cox |
| 2002/0032707 | A1 | 3/2002 | Takeoka |
| 2002/0113707 | A1 | 8/2002 | Grunes et al. |
| 2002/0147649 | A1 | 10/2002 | White |
| 2002/0176116 | A1 | 11/2002 | Rhoads et al. |
| 2003/0018669 | A1 | 1/2003 | Kraft |
| 2003/0043073 | A1 | 3/2003 | Gray et al. |
| 2003/0101069 | A1* | 5/2003 | Sando ........... 705/1 |
| 2003/0102970 | A1 | 6/2003 | Creel et al. |
| 2003/0179908 | A1 | 9/2003 | Mahoney et al. |
| 2003/0191719 | A1 | 10/2003 | Ginter et al. |
| 2003/0214388 | A1 | 11/2003 | Stuart et al. |
| 2004/0017313 | A1 | 1/2004 | Menache |
| 2004/0044956 | A1* | 3/2004 | Huang ........... 715/511 |
| 2004/0095276 | A1 | 5/2004 | Krumm et al. |
| 2004/0181756 | A1 | 9/2004 | Berringer et al. |
| 2004/0202386 | A1* | 10/2004 | Quine ........... 382/305 |
| 2004/0205455 | A1 | 10/2004 | Dathathraya |
| 2004/0257231 | A1 | 12/2004 | Grunes et al. |
| 2005/0035862 | A1 | 2/2005 | Wildman et al. |
| 2009/0109095 | A1 | 4/2009 | Hido et al. |
| 2010/0295943 | A1 | 11/2010 | Cha et al. |
| 2011/0050421 | A1 | 3/2011 | Duron et al. |

FOREIGN PATENT DOCUMENTS

| | | |
|---|---|---|
| EP | 794 507 | 5/2004 |
| FR | 2782703 A1 | 3/2000 |
| JP | 08-050598 A | 2/1996 |
| JP | 08-101980 A | 4/1996 |
| JP | 10-013642 A | 1/1998 |
| JP | 10-154229 A | 6/1998 |
| JP | 2001-052054 A | 2/2001 |
| JP | 2002-046821 A | 2/2001 |
| JP | 2001-253517 A | 9/2001 |
| JP | 2002-120475 A | 4/2002 |
| JP | 2002-522999 A | 7/2002 |
| JP | 4256748 B2 | 4/2004 |
| JP | 2002337426 A | 2/2009 |
| WO | WO 00/26856 A2 | 5/2000 |

OTHER PUBLICATIONS

Allen, et al., "Workflow: An Introduction," Workflow Handbook, copyright 2001, pp. 15-38.

"Breakthrough RFID Laser Technology," Product Sheet: Lexmark RFID UHF Option for Printers, at URL: http://www1.lexmark.com/en_US/documents/RFID-Option-Customer-FINAL.pdf, printed on May 6, 2011, 1 page.

"Hitachi Announces world's smallest RFID IC, the 'mu-chip'," Jul. 5, 2001, printed on Jan. 21, 2001, at URL: http://www.hitachi.com/about/pressroom/a-2001-Jul-5-ZZZM9WXNSOC.html, 2 pages.

Kwon, "Tiny Bay Area Invention Could Change Security," printed on Jan. 21, 2002, at URL: http://beta.kpix.com/news/local/2001/12/03/Tiny_Bay_Area_Invention_Could_Change_Security . . . , pp. 1-2.

"RFID UHF Option," User's Guide, Jun. 2009, 21 pages, Lexmark International, Inc.

Want, et al., "Bridging Physical and Virtual Worlds with Electronic Tags," CHI '99, May 15-20, 1999, pp. 370-377, ACM.

Want et al., "Expanding the Horizons of Location-Aware Computing," Guest Editor's Introduction, Aug. 2001, pp. 31-34, IEEE.

Want, et al., "Ubiquitous Electronic Tagging," Submitted to IEEE Concurrency, Dec. 1999, pp. 1-6.

"URIs, URLs, and URNs: Clarifications and Recommendations 1.0," Report from the joint W3C/IETF URI Planning Interest Group, W3C Note Sep. 21, 2001, printed on Jun. 9, 2005, at URL http://www.w3.org/TR/uri-clarification/, pp. 1-11.

Web pages from PaperClick.com, printed on Jun. 14, 2006, at URL: http://www.paperclick.com, 10 pages.

"The Workflow Management Coalition Specification—Workflow Management Coalition Workflow Standard—Interoperability Wf-XML Binding," Document No. WFMC-TC-1023, May 1, 2000, version 1.0, 40 pages, The Workflow Management Coalition.

Non-Final Office Action for U.S. Appl. No. 10/235,035, mailed on Mar. 13, 2006, 18 pages.

Notice of Allowance for U.S. Appl. No. 10/235,035, mailed on Aug. 28, 2006, 17 pages.

Notice of Allowance for U.S. Appl. No. 10/235,035, mailed on Dec. 8, 2006, 11 pages.

Non-Final Office Action for U.S. Appl. No. 10/235,035, mailed on Jun. 1, 2007, 13 pages.

Notice of Allowance for U.S. Appl. No. 10/235,035, mailed on Dec. 17, 2007, 9 pages.

Notice of Allowance for U.S. Appl. No. 10/235,035, mailed on Apr. 11, 2008, 10 pages.

Non-Final Office Action for U.S. Appl. No. 10/235,042, mailed on Jun. 23, 2005, 23 pages.

Final Office Action for U.S. Appl. No. 10/235,042, mailed on Mar. 8, 2006, 20 pages.
Advisory Action for U.S. Appl. No. 10/235,042, mailed on Jun. 23, 2006, 4 pages.
Non-Final Office Action for U.S. Appl. No. 10/235,042, mailed on Nov. 7, 2006, 25 pages.
Final Office Action for U.S. Appl. No. 10/235,042, mailed on Jun. 15, 2007, 9 pages.
Final Office Action for U.S. Appl. No. 10/235,042, mailed on Oct. 18, 2007, 8 pages.
Notice of Allowance for U.S. Appl. No. 10/235,042, mailed on Nov. 30, 2007, 6 pages.
Notice of Allowance for U.S. Appl. No. 10/235,042, mailed on Jan. 8, 2009, 6 pages.
Non-Final Office Action for U.S. Appl. No. 10/235,032, mailed on Oct. 6, 2004, 18 pages.
Non-Final Office Action for U.S. Appl. No. 10/235,032, mailed on Jul. 5, 2005, 20 pages.
Final Office Action for U.S. Appl. No. 10/235,032, mailed on Mar. 22, 2006, 23 pages.
Non-Final Office Action for U.S. Appl. No. 10/235,032, mailed on Jul. 12, 2006, 25 pages.
Final Office Action for U.S. Appl. No. 10/235,032, mailed on Dec. 29, 2006, 23 pages.
Non-Final Office Action for U.S. Appl. No. 10/235,032, mailed on Aug. 9, 2007, 19 pages.
Non-Final Office Action for U.S. Appl. No. 10/235,032, mailed on Feb. 21, 2008, 17 pages.
Non-Final Office Action for U.S. Appl. No. 10/235,032, mailed on Sep. 17, 2008, 17 pages.
Final Office Action for U.S. Appl. No. 10/235,032, mailed on Apr. 28, 2009, 7 pages.
Notice of Allowance for U.S. Appl. No. 10/235,032, mailed on Oct. 2, 2009, 26 pages.
Non-Final Office Action for U.S. Appl. No. 10/235,028, mailed on Feb. 1, 2006, 21 pages.
Final Office Action for U.S. Appl. No. 10/235,028, mailed on Sep. 7, 2006, 20 pages.
Non-Final Office Action for U.S. Appl. No. 10/235,028, mailed on Apr. 4, 2007, 19 pages.
Non-Final Office Action for U.S. Appl. No. 10/235,028, mailed on Jan. 11, 2008, 16 pages.
Final Office Action for U.S. Appl. No. 10/235,028, mailed on Jul. 1, 2008, 15 pages.
Advisory Action for U.S. Appl. No. 10/235,028, mailed on Oct. 9, 2008, 4 pages.
Non-Final Office Action for U.S. Appl. No. 10/235,028, mailed on Jan. 16, 2009, 17 pages.
Non-Final Office Action for U.S. Appl. No. 10/235,028, mailed on Jul. 9, 2009, 18 pages.
Non-Final Office Action for U.S. Appl. No. 10/235,028, mailed on Jan. 21, 2010, 25 pages.
Non-Final Office Action for U.S. Appl. No. 10/235,028, mailed on May 17, 2010, 20 pages.
Notice of Allowance for U.S. Appl. No. 10/235,028, mailed on Sep. 29, 2010, 7 pages.
Notice of Allowance for U.S. Appl. No. 10/235,030, mailed on Aug. 15, 2006, 26 pages.
Non-Final Office Action for U.S. Appl. No. 10/234,414, mailed on Dec. 8, 2003, 13 pages.
Notice of Allowance for U.S. Appl. No. 10/234,414, mailed on Jun. 21, 2004, 11 pages.
Notice of Allowance for U.S. Appl. No. 10/234,414, mailed on Sep. 23, 2004, 9 pages.
Requirement for Restriction/Election for U.S. Appl. No. 10/996,805, mailed on Jan. 24, 2006, 4 pages.
Non-Final Office Action for U.S. Appl. No. 10/996,805, mailed on Jun. 7, 2006, 16 pages.
Non-Final Office Action for U.S. Appl. No. 10/996,805, mailed on Jan. 19, 2007, 14 pages.
Final Office Action for U.S. Appl. No. 10/996,805, mailed on Aug. 21, 2007, 11 pages.
Notice of Allowance for U.S. Appl. No. 10/996,805, mailed on Nov. 26, 2007, 12 pages.
Oka et al., Distribute Target Tracking Using Signal Strength Measurements by a Wireless Sensor Network, IEEE Journal on Selected Areas in Communications, IEEE Service Center, Piscataway, US, vol. 28, No. 7, Sep. 2010, 10 pages.
Extended European Search Report for corresponding European Application No. 11180618.8 dated Jan. 13, 2012, 7 pages.

* cited by examiner

```
<workflow action>
<application user = "Jan Brady">
<Public_key> 653678 </Public_key>
<Requested_Action>
Enter patient identification and diagnosis code
</Requested_Action>
<Send_to>
Patient's employee benefit manager
</Send_to>
<Status> Awaiting completion </Status>
</workflow action>

<destination>
<company> Ricoh </company>
<application user = "Ronda Rich">
<public_key> 765890 </public_key>
<postal address>
223 Villa Boulevard, West Caldwell, NJ, 22356
</postal address>
<requested action>
Verify Eligibility and forward to Claims Processing
</requested action>
<Status> null </Status>
</destination>

</destination>
<company> Capon </company>
<application user = "Cathy Conroy">
<public_key> 006234 </public_key>
<postal address>
124 East Manchester, Palo Alto, CA 94025
</postal address>
<requested action>
Verify Eligibility and forward to Claims Processing
</requested action>
<Status> null </Status>
</destination>
```

*Fig. 38*

TECHNIQUES FOR PERFORMING ACTIONS BASED UPON PHYSICAL LOCATIONS OF PAPER DOCUMENTS

CROSS-REFERENCES TO RELATED APPLICATIONS

The present application is a continuation of U.S. patent application Ser. No. 10/235,028, filed Sep. 3, 2002, now U.S. Pat. No. 7,884,955, issued Feb. 8, 2011, the entire contents of which are incorporated by reference herein for all purposes.

In addition, the present application is related to the following patent applications and patents, the entire contents of which are incorporated by reference herein for all purposes:

(1) U.S. patent application Ser. No. 08/754,721, filed Nov. 21, 1996, now U.S. Pat. No. 5,978,477, issued Nov. 2, 1999;

(2) U.S. patent application Ser. No. 10/235,035, filed Sep. 3, 2002, now U.S. Pat. No. 7,424,974, issued Sep. 16, 2008;

(3) U.S. patent application Ser. No. 10/235,042, filed Sep. 3, 2002, now U.S. Pat. No. 7,506,250, issued Mar. 17, 2009;

(4) U.S. patent application Ser. No. 10/235,032, filed Sep. 3, 2002, now U.S. Pat. No. 7,652,555, issued Jan. 26, 2010;

(5) U.S. patent application Ser. No. 10/235,030, filed Sep. 3, 2002, now U.S. Pat. No. 7,129,840, issued Oct. 31, 2006; and (6) U.S. patent application Ser. No. 10/234,414, filed Sep. 3, 2002, now U.S. Pat. No. 6,860,422, issued Mar. 1, 2005.

BACKGROUND

Embodiments of the present invention relate generally to the field of document processing.

The number of paper documents used in commercial and non-commercial environments has increased substantially with the proliferation of copiers, printers, facsimile machines, and other paper document producing devices. As a result, the ability to track physical locations of paper documents is of great importance, especially in an office environment. In addition to tracking the locations of paper documents, users also frequently need to perform one or more actions based on the physical locations of the paper documents. Conventionally available systems do not provide the ability to track or perform actions based on physical locations of paper documents.

In light of the above, there is a need for techniques that facilitate the tracking of paper documents and the performance of actions based upon physical locations of the paper documents.

Further, due to the widespread use of computers and other data processing systems an increasing amount of information is now being stored in digital or electronic form. For example, electronic information is stored in the form of electronic documents such as files, etc. Examples of electronic documents include documents created using application programs such as word processors, email programs, image editors, etc., scanned images of paper documents, documents stored in various formats such as PDF, Postscript, etc., and other types of documents stored in electronic form.

The vast number of electronic documents coupled with the proliferation of paper document output devices such as copiers, printers, and facsimile machines, has also greatly increased the number of paper documents that are generated using the electronic documents.

Due to the large number of electronic documents and paper documents, it becomes very difficult to identify an electronic document corresponding to a particular paper document. The problem is particularly acute in office environments. Most office users have had the experience of spending a great amount of time trying to locate an electronic document corresponding to a particular paper document.

As a result, the ability to locate electronic documents corresponding to paper documents is of great importance, especially in an office environment.

Further, containers are widely used to store objects. Examples of containers include: boxes, cabinets, cupboards, shelves, storage racks, etc. used in office environments to store a variety of objects including documents, books, stationery, and several other objects; a briefcase or bag used by a person; a toolbox used by a handyman to store tools, etc.; storage containers used for transportation purposes; and other types of containers.

A common problem shared by all containers is that there is no easy way of automatically determining the contents of a container. In order to determine the contents of a container, a user has to manually peruse through the objects stored in the container. This process of manually determining the contents of a container can be extremely time-consuming and frustrating, especially when a container stores several items. For example, it may take a user a lot of time to determine the contents of a box of documents.

Several techniques have been developed to ease the task of determining objects stored in a container. However, most of these techniques still require significant manual effort and lack the automation and convenience desired by users. There is therefore a need for techniques that automate and simplify the task of determining the contents of a container.

Further, in any project involving a group of people, cooperative and coordinated interaction typically is key to the success or failure of the undertaking The project begins with a series of meetings to identify the desired goals, and to begin understanding the tasks needed to achieve the goal. In a marketing situation, for example, product managers and sales persons convene frequently to define the product line or services, to identify potential markets and target customers, to develop advertising strategies and product roll-out scenarios, and so on. In an engineering setting, basic design goals and basic implementation strategies are discussed and identified.

An important though somewhat tedious outcome of this effort is the production of many documents. Most documents are freely distributed among individuals. Invariably, however, a number of documents will be produce that contain sensitive information. Engineering plans and designs might have to be documented, but kept secret or otherwise secured. Marketing plans and forecasts, and customer lists are typically sensitive subject matter that require controlled access.

These sensitive documents, nonetheless, need to be copied, distributed, and otherwise disseminated among many individuals in the organization in order for progress to occur. A need therefore exists for a method and system to provide document security support.

Further, during the course of running a business, there are many steps and people involved in each endeavor. Accompanying this activity might be the flow of large numbers of documentation. For example, documents generated by a person or by people in a workgroup often require distribution to other people in the company or among different groups of people. Workflow systems provide a way for managing the flow of numerous documents during the course of a project.

Any substantial project is likely to produce volumes of paperwork. Effective management of a large-scale project requires up to date information. In the case of documents, it is important to know who has what document, how far along a document is in the review process, and so on. This can facilitate identifying critical paths and bottlenecks. It is therefore desirable to be able to enhance a workflow system to improve its utility.

BRIEF SUMMARY

Certain embodiments of the present invention provide techniques for performing one or more actions based upon physical locations of one or more paper documents. According to one embodiment, the paper documents have identification tags physically associated with them. The physical locations of the paper documents are determined based upon information read from the identification tags physically associated with the paper documents. One or more actions are performed based upon the physical locations of the paper documents.

According to another embodiment, techniques are provided for performing an action based upon physical locations of paper documents. This embodiment receives information identifying a first physical location and a first action to be performed. This embodiment also receives information read from identification tags physically associated with one or more paper documents located at the first physical location. For each paper document in the one or more paper documents, paper document-related information for the paper document is determined based upon information read from the identification tag physically associated with the paper document. The first action is then performed using the paper document-related information corresponding to at least one paper document in the one or more paper documents.

According to another embodiment, techniques are provided for performing an action. In this embodiment, a data processing system receives information specifying a physical location, a condition associated with the physical location, and an action to be performed if the condition associated with the physical location is satisfied. The data processing system also receives information read from identification tags physically associated with one or more paper documents located at the physical location. The data processing system then determines if the condition associated with the physical location is satisfied based upon the information read from the identification tags physically associated with the one or more paper documents located at the physical location. The action is performed if the condition associated with the physical location is satisfied.

Additional embodiments of the present invention provide techniques that facilitate tracking of physical locations of paper documents. These embodiments can track physical locations of paper documents that have identification tags physically associated with them. Each identification tag that is physically associated with a paper document is configured to store information that can be used to uniquely identify the paper document with which the identification tag is physically associated. For a particular paper document, the identification tag physically associated with the particular paper document along with information stored in the identification tag facilitates tracking of the physical location of the particular paper document.

According to one embodiment, techniques are provided for storing information that enables tracking of physical locations of paper documents. In this embodiment, a paper document is generated using a paper document output device, wherein an identification tag is physically associated with the paper document. Identification information stored by the identification tag is determined. The identification information determined from the identification tag is used to identify the paper document. The identification information is stored along with physical location information identifying a physical location of the paper document. The information is stored such that the physical location information is associated with the stored identification information.

Additional embodiments of the present invention provide techniques for determining electronic document information for a paper document. The electronic document information determined for a paper document may include information identifying an electronic document corresponding to the paper document. The electronic document information may also include information identifying a location where the electronic document is stored or a pointer or reference to the electronic document. The electronic document information determined for a paper document may be stored along with identification code information read from an identification tag that is physically associated with the paper document. The electronic document information for a paper document may also be stored in an identification tag that is physically associated with the paper document or physically associated with another paper document generated based upon the paper document.

According to one embodiment, techniques are provided for processing a paper document. In this embodiment, a first file descriptor is determined from an electronic representation of a first paper document. A feature descriptor is determined from a first database that matches the first feature descriptor, the first database storing information identifying a plurality of feature descriptors and electronic document information for each feature descriptor in the plurality of feature descriptors, wherein the electronic document information for a feature descriptor comprises information identifying an electronic document. Electronic document information associated with the matching feature descriptor is determined from the information stored in the first database. The identification code associated with an identification tag along with the electronic document information associated with the matching feature descriptor is stored in a second database such that the electronic document information associated with the matching feature descriptor is associated with the identification code.

According to another embodiment, techniques are provided for performing an operation using a paper document. In this embodiment, a first identification code is read from an identification tag that is physically associated with a first paper document. An identification code from a first database that matches the first identification code is then determined, the first database storing information identifying a plurality of identification codes and electronic document information for each identification code in the plurality of identification codes, the electronic document information for each identification code comprising information identifying an electronic document. Electronic document information associated with the matching identification code is then determined from the first database. The operation is then performed or initiated using the electronic document identified by the electronic document information associated with the matching identification code.

Additional embodiments of the present invention provide a container that is capable of outputting information related to objects stored in the container. The container is able to output information for objects that are stored by the container and that have identification tags physically associated with them.

According to one embodiment, a container is provided comprising one or more tag readers, a processing module, and an output module. The tag readers are configured to read information from identification tags physically associated with one or more objects contained in the container. The processing module is configured to determine, for at least one object in the one or more objects, object-related information to be output for the at least one object based upon the information read from the identification tag physically associated with the at least one object. The output module is configured to output the object-related information determined for the at least one object.

According to another embodiment, the processing module is configured to receive a search query that includes information specifying search criteria. The tag readers are configured to read information from identification tags physically associated with the one or more objects contained in the container. The processing module is further configured to determine, based upon the information read from the identification tags physically associated with the one or more objects, if the search criteria is satisfied by an object from the one or more objects. The output module is configured to output object-related information for an object from the one or more objects if it is determined that the search criteria is satisfied by the object.

According to yet another embodiment, a container comprises one or more tag readers configured to read a first set of identification codes from identification tags physically associated with a first set of objects contained in the container, a processor, and a memory coupled to the processor, the memory configured to store a plurality of code modules for execution by the processor. The plurality of code modules comprise: a code module for comparing the first set of identification codes with a baseline set of identification codes to determine if an identification code is included in the first set of identification codes and not included in the baseline list of identification codes and if an identification code is included in the baseline set of identification codes and not included in the first list of identification codes, the baseline set of identification codes corresponding to a baseline set of objects; a code module for indicating that the container contains an object corresponding to an identification code that is not included in the baseline set of objects if the identification code is included in the first set of identification codes and is not included in the baseline set of identification codes; and a code module for indicating that an object corresponding to an identification code included in the baseline set of objects is not contained by the container if the identification code is included in the baseline set of identification codes and is not included in the first set of identification codes.

Additional embodiments of the present invention provide a document security system. Document monitoring includes sensing documents placed on a suitable surface and monitoring the documents for changes in position on the surface. Sensors collect first information indicative of a first position, and second information indicative of a second position. The sensor data is compared to determine that a change in position occurred. In one embodiment, a recording action can be initiated in response to detection that a change in position has occurred. In another embodiment of the invention, document processing functions can be enabled or disabled, based on the information collected by the sensors. In one aspect of the invention, the sensor component comprises a radio frequency identification (RFID) tag and associated interrogation device(s).

Additional embodiments of the present invention provide techniques for tracking documents in a workflow. A workflow system and method comprise one or more sensors disposed about an area of the workflow. The sensors detect proximity of a document as it is moved about in the area of the workflow. The information collected is associated with information relating to the document. The workflow system integrates this information with a display of the workflow graph, reflecting the movement of documents in the workflow. The workflow graph can be presented in graphical form, showing a graphical representation of the workflow.

The foregoing, together with other features, embodiments, and advantages of the present invention, will become more apparent when referring to the following specification, claims, and accompanying drawings.

BRIEF DESCRIPTION OF THE DRAWINGS

FIG. 38 illustrates a conventional XML representation of the workflow fragment shown in FIG. 37.

DETAILED DESCRIPTION

Figure 1:
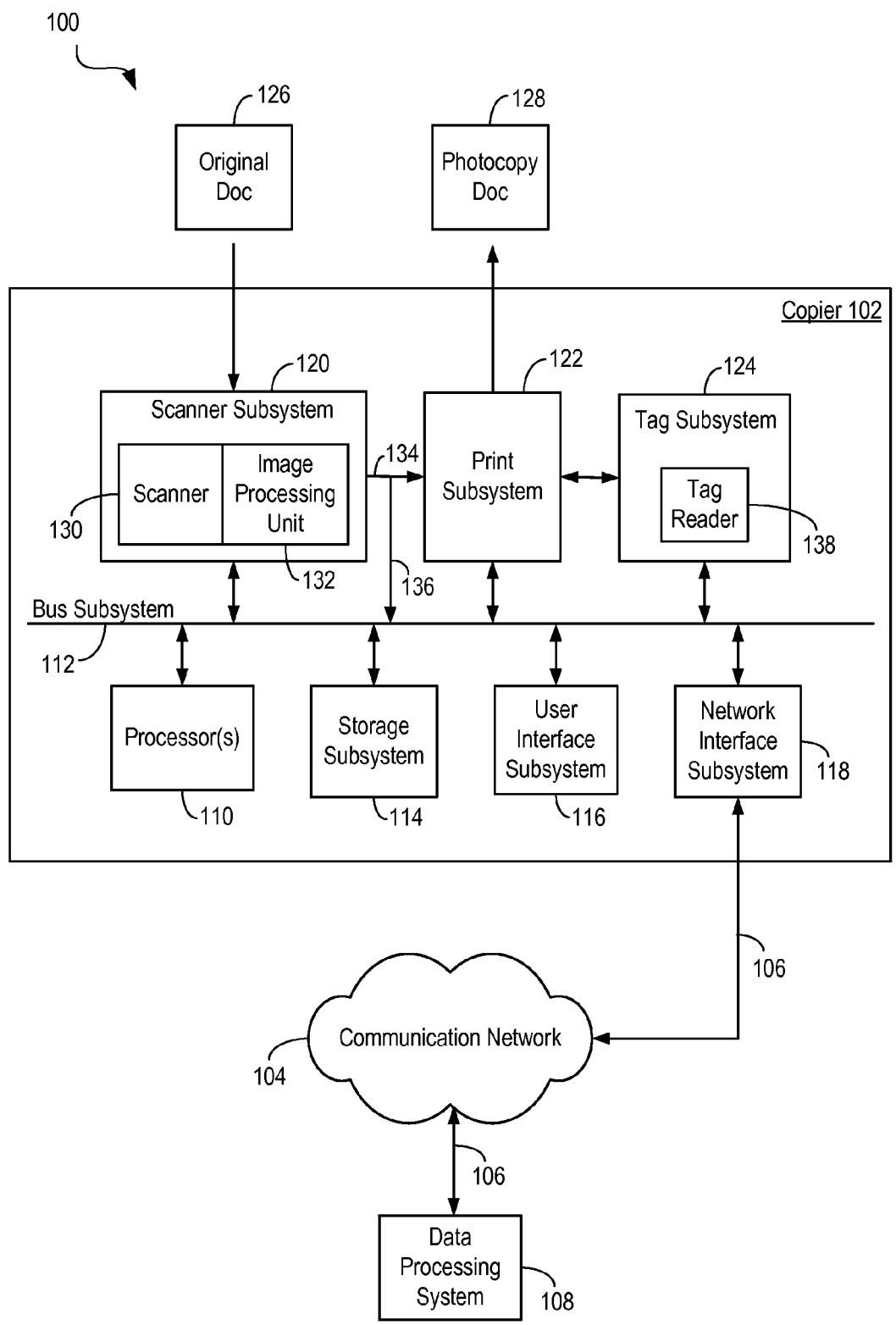
FIG. 1 is a simplified block diagram of a network environment comprising a copier that is configured to physically associate identification tags with paper documents according to an embodiment of the present invention.

Techniques for Performing Actions Based Upon Physical Locations of Paper Documents Certain embodiments of the present invention provide techniques for performing one or more actions based upon physical locations of one or more paper documents. For purposes of this invention, the term "paper document" is intended to refer to a document comprising one or more pages of any tangible medium on which information can be printed, written, drawn, imprinted, embossed, etc. For example, a paper document may refer to a document printed by a printer, a document output by a copier or scanner, a document output by a facsimile machine, a photograph, a book, a single page of paper, a document comprising a plurality of papers, and the like. In alternative embodiments, the teachings of the present invention may also be applied to other types of objects.

For purposes of this invention, the term "electronic document" is intended to refer to information stored in an electronic or digital form. Examples of electronic documents include files, documents created using application programs such as word processors, email programs, image editors, etc., scanned images of paper documents, documents stored in various formats such as PDF, Postscript, etc., and other types of documents stored in electronic form.

According to the teachings of the present invention, actions are performed based upon physical locations of paper documents that have identification tags physically associated with them. Each identification tag that is physically associated with a paper document is configured to store information that facilitates identification of the physical location of the paper document. The information stored in the identification tag is also used to perform actions based upon the physical location of the paper document.

According to an embodiment of the present invention, each identification tag stores information that can be used to uniquely identify the paper document with which the identification tag is physically associated. For example, an identification tag may store an identification code that may be used to uniquely identify a paper document with which the identification tag is physically associated. It should be understood that other types of information that can be used to identify documents might also be stored in an identification tag in alternative embodiments of the present invention.

Depending upon the type of identification tag used, the identification code information may be stored in the memory of the identification tag when the tag is manufactured, when the tag is activated, or at some later time using software or hardware techniques. For example, a paper document output device may be configured to store a unique identification code in the memory of an identification tag that physically associated with a paper document or is selected to be physically associated with a paper document generated by the paper document processing device.

In addition to identification code information, other types of information related to a paper document may also be stored in an identification tag that is physically associated with the paper document. For example, the information stored in an identification tag may include an electronic representation of the contents of the paper document (e.g., a scanned image of the paper document, a Postscript format file or Portable Document Format (PDF) or image format or other file format, etc.), information identifying the author of the paper document, the date when the paper document was created, the number of pages in the paper document, and other like information. Other information that can be stored in an identification tag is described in U.S. application Ser. Nos. 10/235,035, 10/235,042, 10/235,032, 10/235,030, 10/234,414, the entire disclosures of which are herein incorporated by reference for all purposes.

Various devices known to those skilled in the art may be used as identification tags. A device that can be used as an identification tag generally includes an on-device memory that is capable of storing information that can be read by a tag reader. As previously indicated, depending on the type of identification tag used, the information (e.g., identification code information) stored in the identification tag may be stored in the memory of the identification tag when the tag is manufactured, when the tag is activated, or at some later time using software or hardware programming applications.

Various different types of tag readers may be used to read information stored by identification tags. The type of tag reader used and the technique used by the tag reader for reading the information stored on an identification tag depends on the type of the identification tag. According to an embodiment of the present invention, a tag reader may read information from an identification tag by scanning the identification tag. In other embodiments, a tag reader may read the information by receiving the information from the identification tag. A tag reader may receive the information from an identification tag in response to an external stimulus (e.g., electromagnetic energy) or signal provided to the identification tag. The external stimulus or signal may be provided by the tag reader or by some other device or application. If the identification tag is self-powered, the identification tag may be configured to communicate the information stored by the identification tag to the tag reader. A tag reader may read the information stored by a tag reader in various forms including electromagnetic waves, electronic signals, acoustic signals, etc.

According to an embodiment of the present invention, radio frequency identification devices (RFIDs) may be used as identification tags. For example, the Mu-chip manufactured by Hitachi, Ltd. may be used as an identification tag. The Mu-chip is a radio recognition IC chip that measures 0.4-mm square and is 60 microns thick in its present embodiment. Due to its reduced size, the Mu-chip can be embedded in paper. The Mu-chip comprises an on-chip memory (presently a 128-bit ROM) that can be programmed to store information such as the identification code for a paper document.

In its present embodiment, information stored by a Hitachi Mu-chip can be read by exposing the Mu-chip to 2.45 GHz band microwaves. The Mu-chip uses the microwave energy as a power source and communicates the information stored in the on-chip memory in the form of radio waves that can be detected and read by a tag reader. In alternative embodiments, the Mu-chip may also include an on-chip antenna to increase the communication distance range. In yet other embodiments, a power source may be provided on the Mu-chip and the Mu-chip may be programmed to communicate the information stored by the Mu-chip to a tag reader.

As indicated above, according to the teachings of the present invention, an identification tag is physically associated with a paper document. Various different techniques may be used to physically associate an identification tag with a paper document. The identification tag may be permanently or temporarily attached to a paper document or a page of the paper document. The tag may be attached to the paper document using clips, staples, adhesives, ties, strings, rubber bands, labels with identification tags, and the like. The identification tag may be embedded in a page of the paper document. An identification tag may also be incorporated into an object such as a label, a staple, etc. that is attached to the paper document.

According to an embodiment of the present invention, an identification tag may be physically associated with a paper document at the time the paper document is generated or produced. In this embodiment, the tag may be physically associated with the paper document by the device (referred to as a "paper document output device") that produces or generates the paper document. Examples of paper document output devices include printers, scanners, copiers, facsimile machines, and the like. For example, a copier may be configured to physically associate an identification tag to a photocopy generated by the copier. Likewise, a printer may physically associate an identification tag with a paper document printout generated by the printer. A facsimile machine may physically associate an identification tag with a paper document facsimile output. Likewise, other paper document output devices may be configured to physically associate identification tags with paper documents generated by the devices.

As described above, various different techniques may be used to physically associate an identification tag with a paper document. According to one technique, depending on the size of the identification tag, the identification tag is embedded in a page of the paper document. For example, the Mu-chip due to its reduced size can be embedded in a paper page. A paper page that has an identification tag embedded in it may be referred to as "tagged paper". Accordingly, in an embodiment using Hitachi Mu-chips as identification tags, a paper document output device may physically associate an identification tag with a paper document by using at least one tagged paper to generate the paper document. Accordingly, if a paper document output device has access to tagged paper, the paper document output device may use one or more of the tagged papers to generate the paper document.

An identification tag may also be physically associated with a paper document by physically applying or attaching the identification tag to the paper document. An identification tag may also be physically associated with a paper document generated by a paper document output device using an adhesive, a clip, a staple, a rubber band, a tie, or other like mechanism. The identification tag may also be incorporated into an object (e.g., a staple, a clip, etc.) that is attached to the paper document.

According to an embodiment of the present invention, an identification tag may be physically associated with a paper document by mixing the identification tag in the ink that is printed on one or more pages of the paper document.

In alternative embodiments, a paper document output device may dispense a sticker or label comprising an identification tag. The identification tag may be physically associated with a paper document generated by a paper document output device by applying the sticker or label to the paper document. For example, a copier may dispense a label comprising an identification tag and a user may be requested to apply the dispensed label to a photocopy generated by the copier. Various other techniques may also be used to physically associate an identification tag with a paper document.

According to an embodiment of the present invention, if the size of the identification tag permits, the identification tag may be physically associated with a paper document such that it is not directly visible to the unaided observer or user of the paper document. For example, the identification tag may be embedded in a page of the paper document, the identification tag may be embedded or mounted on a staple that is attached to the paper document.

According to the teachings of the present invention, in addition to physically associating an identification tag with a paper document, a paper document output device is also configured to read information, including identification code information, from an identification tag that is physically associated with a paper document generated by the paper document output device. For example, a copier is configured to read identification code information stored in the memory of an identification tag that is physically associated with a photocopy generated by the copier.

The information read from an identification tag may then be stored. According to an embodiment of the present invention, the identification code read from an identification tag that is physically associated with a paper document is stored along with other information related to the paper document (referred to as "paper document-related information"). The information for a paper document is stored such that the paper document-related information for the paper document is associated with the identification code read from an identification tag that is physically associated with paper document. The information is stored such that the paper document-related information can be retrieved given the identification code for the paper document.

The paper document-related information that is associated with a particular identification code identifying a particular paper document may include various types of information related to the particular paper document. The paper document-related information may include information read from identification tags and other information. For a particular identification code, paper document-related information associated with the identification code may include an electronic representation of the paper document (e.g., scanned images of the paper document, electronic document corresponding to the paper document, etc.) identified by the identification code, information identifying the paper document (e.g., title of the paper document, etc.), information identifying an electronic representation of the paper document (e.g., a filename, directory location, etc.), electronic document information (described in U.S. application Ser. No. 10/235, 042), information identifying the physical location of the paper document (described in U.S. application Ser. No. 10/235,035), and other information. The paper document-related information may also include information identifying another document related to the paper document.

According to an embodiment of the present invention, the identification code information and the paper document-related information is stored in a database (referred to as the "paper document tracking database"). The information in the paper document tracking database may be indexed by the identification code information. In one embodiment, paper document tracking database may be implemented as a table wherein each row of the table stores information related to a particular identification code. Each row (or record) of paper document tracking database may store paper document-related information corresponding to the identification code. The paper document tracking database thus stores information identifying one or more identification codes and corresponding paper document-related information for each identification code. Information stored in the paper document tracking database is used to perform actions based upon physical locations of paper documents.

It should be understood that various other techniques may be used for storing identification code information and the corresponding paper document-related information. For example, the information may be stored in a file, in one or more data structures, and the like. The information may be stored in a memory location accessible to the paper document output device. The memory used for storing the information may be part of the paper document output device or may be part of another system or device coupled to the paper document output device.

As described above, a paper document output device such as a copier may be configured to physically associate an identification tag with a paper document and read and store information that is used to perform actions based upon physical locations of paper documents. FIG. 1 is a simplified block diagram of a network environment 100 comprising a copier 102 that is configured to physically associate identification tags with paper documents according to an embodiment of the present invention. As depicted in FIG. 1, copier 102 is coupled to network 104 via communication links 106. A data processing system 108 may be also be coupled to network 104 via communication links 106. Network environment 100 depicted in FIG. 1 is merely illustrative of an environment incorporating the present invention and does not limit the scope of the invention as recited in the claims. One of ordinary skill in the art would recognize other variations, modifications, and alternatives.

Communication network 104 depicted in FIG. 1 provides a mechanism for allowing communication and exchange of data and information between data processing system 108 and copier 102 and other data processing systems or devices. Communication network 104 may itself be comprised of many interconnected computer systems and communication links Communication network 104 may be embodied as a direct connection, a LAN, a wide area network (WAN), a wireless network, an Intranet, the Internet, a private network, a public network, a switched network, or any other suitable communication network.

The communication links used to connect the various systems depicted in FIG. 1 may be of various types including hardwire links, optical links, satellite or other wireless communication links, wave propagation links, or any other mechanisms for communication of information. Various communication protocols may be used to facilitate communication of information via the communication links. These communication protocols may include TCP/IP, HTTP protocols, extensible markup language (XML), wireless application protocol (WAP), protocols under development by industry standard organizations, vendor-specific protocols, customized protocols, and others.

As shown in FIG. 1, copier 102 includes a processor 110 that communicates with a number of peripheral subsystems via a bus subsystem 112. These peripheral subsystems may include a storage subsystem 114, a user interface subsystem 116, a network interface subsystem 118, a scanner subsystem 120, a print subsystem 122, and a tag subsystem 124.

Bus subsystem 112 provides a mechanism for letting the various components and subsystems of copier 102 communicate with each other as intended. Although bus subsystem 112 is shown schematically as a single bus, alternative embodiments of the bus subsystem may utilize multiple buses.

User interface subsystem 116 allows user interaction with copier 102. A user may be a human user, a device, a process, another computer, and the like. User interface subsystem 116 may be implemented using a touch pad, a touch screen, mechanical buttons, application programming interfaces (APIs), and the like. Interface 116 allows the user to select options for generating a photocopy 128 from an original document 126. For example, interface 116 may allow the user to select the paper size to be used for generating the photocopy, the copy darkness, the copy contrast, number of copies to be produced, magnification/reduction ratio, and other like options known to those skilled in the art. A "Copy/Start" key that allows the user to initiate the copying function may also be provided by interface 116. Copier 102 accepts a document 126 (also referred to as the "original document") and prints a copy 128 (or photocopy) upon selection of the "Start/Copy" key.

According to an embodiment of the present invention, interface 116 may also allow the user to select if an identification tag is to be physically associated with photocopy paper document 128. For example, before photocopying a original document 126, interface 116 may prompt the user to select whether an identification tag is to be physically associated with the photocopy. An identification tag is then physically associated with the photocopy paper document if selected by the user.

In an alternative embodiment of the present invention, an identification tag may be physically associated with the photocopy without prompting the user. In this embodiment of the present invention, activation of the "Copy/Start" key by the user is sufficient to initiate the photocopying function, cause physical association of an identification tag with the photocopy paper document, and cause reading and archival of the identification code (and potentially other information stored by the identification tag) read from the identification tag that is physically associated with the paper document. Depressing the "Copy/Start" key represents a single user command that is interpreted by copier 102 to request both copying, physically associating the identification tag, and reading and archival of information stored by the identification tag. In this embodiment, the user may not be aware that an identification tag has been physically associated with the photocopy produced by copier 102 and that the identification code read from the identification tag and information related to the photocopy has been automatically archived by copier 102.

User interface subsystem 116 also serves as an interface for outputting information to the user. For example, information related to the status of copier 102 or information related to the functions performed by copier 102 may be output to the user via interface 116.

Network interface subsystem 118 provides an interface to other computer systems (e.g., data processing system 108), networks, and devices. Embodiments of network interface subsystem 118 include an Ethernet card, a modem (telephone, satellite, cable, ISDN, etc.), (asynchronous) digital subscriber line (DSL) units, and the like. Network interface system 118 facilitates transfer of information to and from copier 102 in an appropriate format.

Processor 110 performs or controls the functions performed by the various subsystems of copier 102. These functions include physically associating identification tags with photocopies, reading information from identification tags, and archiving the read information. According to an embodiment of the present invention, processor 110 executes a control program that controls operation of copier 102.

Storage subsystem 114 may be configured to store the basic programming and data constructs that provide the functionality of copier 102. For example, according to an embodiment of the present invention, software modules and control programs implementing the functionality of copier 102 may be stored in storage subsystem 114. Processor 110 may execute these software modules. Storage subsystem 114 may also provide a repository or database for storing information according to the teachings of the present invention. For example, the identification code information and corresponding paper document-related information may be stored in storage subsystem 114. It should be understood that the actual archival of identification codes information and photocopy documents-related information may occur either locally (i.e., in storage subsystem 114) or remotely on some other system. For example, according to an embodiment of the present invention, copier 102 may communicate the information to data processing system 108 that may then store the information.

Scanner subsystem 120 includes a scanner 130 and an image-processing unit 132. Scanner 130 is configured to capture an image of original document 126 and transmit the image to image processing unit 132. Image processing unit 132 operates to remove distortion inherent in the scanning process. The output of the image-processing unit is a scanned image of original document 126 with the distortion removed. The scanned image is then forwarded to print subsystem 122 for further processing via video bus 134.

According to an embodiment of the present invention, an image data tap 136 provides processor 110 with access to scanned image data transferred over video bus 134. In alternative embodiments of the present invention, the image scanned by scanner 130 may be provided to processor 110 by scanner subsystem 120.

Print subsystem 122 operates in accordance with well-known laser xerography principles and is configured to receive scanned information from scanner subsystem 120 and produce a paper document photocopy 128 of original document 126. Print engine 122 operates in synchrony with tag subsystem 124 to ensure that an identification tag is appropriately physically associated with photocopy 128 and information from the identification tag is read and stored.

Tag subsystem 124 is configured to physically associate identification tags with photocopies generated by copier 102. As described above, various different techniques may be used to physically associate an identification tag with a photocopy paper document. For example, at least one tagged paper (e.g., paper with an identification tag, such as the Hitachi Mu-chip, embedded in it) may be used to generate photocopy 128. According to an embodiment of the present invention, tag subsystem 124 ensures that at least one tagged page is used to generate photocopy 128. If the photocopy consists of multiple pages, then normal paper pages (i.e., paper pages without the embedded identification tag) may be used for other pages of the photocopy paper document.

An identification tag may also be physically applied or attached to paper document 128. If the size of the identification tag permits, the identification tag may be attached to the paper document photocopy 128 such that it is not directly visible to the unaided observer or user of paper document 128. For example, tag subsystem 124 may attach a staple with an identification tag embedded in it (or mounted on it) to photocopy document 128. The identification tag may also be attached to the photocopy paper document by mixing it in the ink that is printed on the photocopy when the photocopy is generated by print subsystem 122. The identification tag may also be applied to the photocopy paper document using an adhesive (e.g., a sticker comprising the identification tag may be applied to a page of the photocopy). Various other techniques may also be used to physically associate an identification tag with the paper document.

As previously described, each identification tag may store a unique identification code that is used to identify the paper document with which the identification tag is physically associated. The identification code may be programmed into the identification tag when the identification tag is manufactured or activated. According to an embodiment of the present invention, tag subsystem 124 is configured to store a unique identification code in the memory of an identification tag that is selected to be physically associated with photocopy 128 or has already been physically associated with photocopy 128. Hardware or software modules configured to program the identification tag may be incorporated in tag subsystem 124.

If the identification code is already stored in identification tags used by copier 102, tag subsystem 124 is configured to read the identification code from an identification tag that has been physically associated with photocopy paper document 128 generated by copier 102 or that is selected to be physically associated with photocopy document 128. One or more tag readers 138 may be incorporated in tag subsystem 124 to facilitate reading of the identification code information and other information from identification tags.

The type of tag readers used and the techniques used for reading information from identification tags depends on the type of identification tags. For example, if a Hitachi Mu-chip is used as an identification tag, tag readers 138 included in tag subsystem 124 may be constructed to expose each identification tag to 2.45 GHz band of microwaves and to detect and read radio waves emanating from the identification tag. Various other types of tag readers that are capable of detecting electromagnetic, optical, acoustical, or other signals may be used in alternative embodiments of the present invention using other forms of identification tags.

It should be understood that in addition to identification code information other information stored in identification tags used by copier 102 may also be read by tag readers 138. The information read from the identification tags is then stored in a paper document tracking database. The information may be locally stored by copier 102 (e.g., in storage subsystem 114). Alternatively, the information may be forwarded to data processing system 108 for storage, or may be stored on some other computer system or storage device accessible to copier 102.

According to an embodiment of the present invention, the scanned image output of scanner subsystem 120 is stored along with the identification code information. The scanned image of an original paper document is stored as part of the paper document-related information that is associated with an identification code read from an identification tag that is physically associated with a photocopy generated from the original paper document.

The various subsystems of copier 102 function in synchrony to ensure proper functioning of copier 102 according to the teachings of the present invention. Various synchronization signals known to those skilled in the art may be used to achieve this synchronization. Many other configurations of copier 102 are possible having more or fewer components than the system depicted in FIG. 1.

Figure 2:
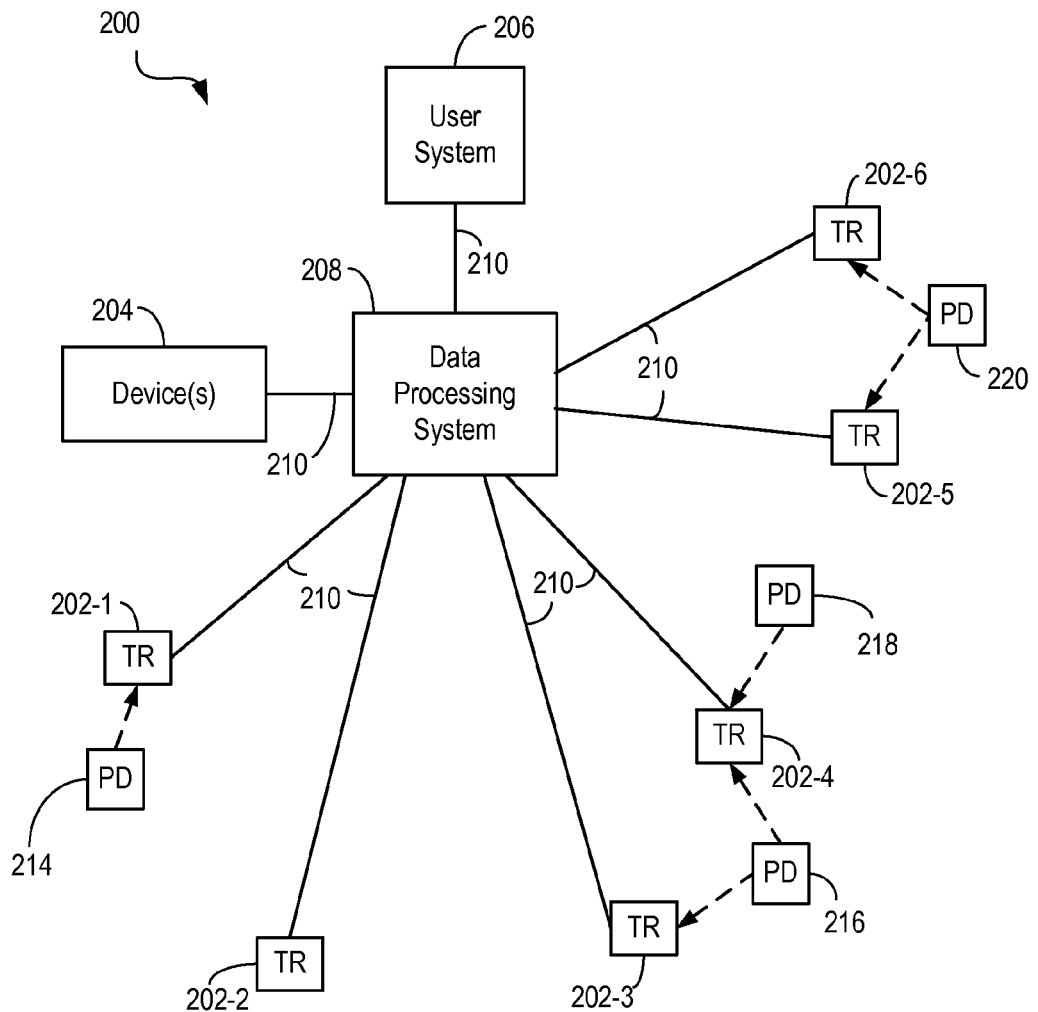
FIG. 2 is a simplified block diagram of a distributed system that may be used to perform actions based upon physical locations of paper documents according to an embodiment of the present invention.

As indicated above, according to the teachings of the present invention, the information stored in the paper document tracking database is used to determine physical locations of paper documents that have an identification tag physically associated with them and to perform actions based upon the physical locations. FIG. 2 is a simplified block diagram of a distributed system 200 that may be used to perform actions based upon physical locations of paper documents according to an embodiment of the present invention. The configuration depicted in FIG. 2 is merely illustrative of an environment incorporating the present invention and does not limit the scope of the invention as recited in the claims. One of ordinary skill in the art would recognize other variations, modifications, and alternatives.

As depicted in FIG. 2, system 200 comprises a plurality of tag readers (TRs) 202, devices 204, and a user system 206 coupled to a data processing system 208 via communication links 210. Communication links 210 depicted in FIG. 2 may be of various types including hardwire links, optical links, satellite or other wireless communication links, wave propagation links, or any other mechanisms for communication of information. Various communication protocols may be used to facilitate communication of information via the communication links. These communication protocols may include TCP/IP, HTTP protocols, extensible markup language (XML), wireless application protocol (WAP), protocols under development by industry standard organizations, vendor-specific protocols, customized protocols, and others.

Tag readers 202 are configured to read information, including identification code information, stored by identification tags that are physically associated with one or more paper documents and to facilitate determination of physical locations of the one or more paper documents. Whether or not a tag reader 202 can read identification code from an identification tag that is physically associated with a paper document depends on the proximity of the paper document to the tag reader. If an identification tag has an on-board power supply (e.g., an on-board battery) and is capable of communicating information (including identification code information) stored in the memory of the identification tag, a tag reader 202 can detect and read the identification code from the identification tag if the reception range of the tag reader overlaps with the communication range of the identification tag.

If an identification tag does not have its own power supply and depends on power supplied by an external entity such as a tag reader, then a tag reader is able to read information, including identification code information, from the identification tag if the tag reader can expose the identification tag to the requisite energy and can read the information transmitted (or radiated) by the identification tag in response to the energy. For example, if a Hitachi Mu-chip is used as an identification tag, a tag reader can read information stored by the Mu-chip if the tag reader is able to expose the Mu-chip to 2.45 GHz band microwaves and is able to read the radio waves that emanate from the irradiated Mu-chip identification tag.

The manner in which a tag reader reads the identification code from an identification tag depends on the type of tag reader and the type of identification tag used. Likewise, a tag reader's ability to detect and read identification code from an identification tag depends on the type of tag reader and the type of identification tag and the proximity of the identification tag to the tag reader.

A tag reader is thus able to read information stored by an identification tag that is physically associated with a paper document if the paper document is physically located proximal or near to the tag reader (i.e., the identification tag that is physically associated with the paper document is at a distance from the tag reader where the tag reader can read information stored by the identification tag). It should be understood that multiple tag readers may be able to read information stored by a particular identification tag that is physically associated with a paper document that is located proximal to the tag readers (i.e., at a distance from where the tag readers can read information from the identification tag physically associated with the paper document).

For example, in the embodiment depicted in FIG. 2, tag reader 202-1 is able to read the identification code from an identification tag physically associated with paper document (PD) 214. Tag readers 202-3 and 202-4 can read the identification code from the identification tag physically associated with paper document 216. Tag reader 202-4 is also able to read the identification code from an identification tag physically associated with paper document 218. Tag readers 202-5 and 202-6 can read the identification code from the identification tag physically associated with paper document 220.

Since a tag reader is thus able to read information stored by an identification tag that is physically associated with a paper document if the paper document is physically located proximal or near to the tag reader, the physical location of a particular paper document can be approximated to be the same as the physical location of a tag reader. Accordingly, the physical location of the paper document can be determined based on the physical location of the tag reader. If multiple tag readers are able to read information from an identification tag associated with a particular paper document, it indicates that the particular paper document is physically located in a location or zone proximal to the multiple tag readers. As described below, data processing system 208 is configured to receive information read by the individual tag readers from the identification tags and to determine the physical locations of the paper documents corresponding to the identification tags.

According to an embodiment of the present invention, tag readers 202 may be configured to send out signals at periodic time intervals to interrogate and read information including identification code information from identification tags that the tag readers can detect and read. In alternative embodiments, a tag reader 202 may be configured to interrogate identification tags that are proximal to the tag reader in response to a signal received from an external system, device, or application, or in response to external stimuli. For example, a tag reader may be configured to interrogate identification tags that are proximal to the tag reader upon receiving a signal from data processing system 208.

In addition to the identification code information, a tag reader may also be configured to read other information stored in an identification tag interrogated by the tag reader. According to an embodiment of the present invention, tag reader 202 may timestamp the read information to indicate when (e.g., date and time) the information was read. The read information may then be stored. The information may be stored by the tag reader or may be forwarded by the tag reader to a central database or computer system (e.g., data processing system 208) that may store and/or process the information.

Data processing system 208 is configured to process requests received from user system 206 to perform one or more actions based upon physical locations of paper documents in distributed system 200. Data processing system 208 uses information received from tag readers 202 to process the requests.

According to an embodiment of the present invention, upon receiving a request to perform an action, data processing system 208 causes tag readers 202 to interrogate identification tags physically associated with paper documents that are located proximal to the tag readers and can be detected and read by the tag readers. The tag readers are configured to interrogate identification tags and communicate information read from the identification tags (which includes identification code information) to data processing system 208. Data processing system 208 then analyzes the information and determines physical locations of paper documents identified by the identification codes received from the tag readers.

As described above, if a particular tag reader is able to read the identification code from an identification tag physically associated with a particular paper document, that implies/indicates that the particular paper document is physically located proximal to the particular tag reader. The physical location of the paper document can be then determined based on the physical location of the tag reader. Accordingly, in order to determine physical locations of the paper documents, for each tag reader from whom identification code information is received, data processing system 208 first determines the physical location of the tag reader.

According to an embodiment of the present invention, data processing system 208 stores (or has access to) information (referred to as "tag reader location information") identifying physical locations of one or more tag readers in distributed system 200. For example, the tag reader location information may indicate that tag reader 202-1 is located in John's office, tag reader 202-2 is located in John's briefcase, tag readers 202-3 and 202-4 are located in the conference room, tag reader 202-5 is located on Mr. Smith's office desk, tag reader 202-6 is located in Mr. Smith's in-box container in his office, and so on.

Data processing system 208 uses the tag reader location information to determine physical locations of tag readers that are able to read one or more identification codes from identification tags. The physical location of a paper document identified by an identification code read by tag reader is then determined based upon the physical location of a tag reader. For example, if tag reader 202-1 is able to read information from an identification tag that is physically associated with paper document 214, then the physical location of paper document 214 is determined to be the same as the physical location of tag reader 202-1.

One or more actions requested by the action request received from user system 206 may then be performed based upon the physical locations of the paper documents. According to an embodiment of the present invention, the actions may be performed using the paper document-related information stored in the paper document tracking database. As described earlier, the paper document tracking database stores information identifying identification codes and paper document-related information corresponding to the identification codes.

Data processing system 208 may determine paper document-related information corresponding to each identification code read by the tag readers and perform an action using the paper document-related information.

The action specified in a request may be performed by data processing system 208, by some device 204 upon receiving a signal from data processing system 208 to perform the action, or by data processing system 208 in combination with some other device. As described below, various different kinds of actions may be performed. Examples of actions include emailing, faxing, copying, printing, and other types of actions.

A user may configure a request to perform an action using user system 206. A user interface may be displayed on user system 206 that allows the user to configure the request. User system 206 may be a personal computer, a portable computer, a workstation, a computer terminal, a network computer, a kiosk, a personal digital assistant (PDA), a communication device such as a cell phone, or any other data processing system. It should be understood that in alternative embodiments of the present invention, a user might also use input devices coupled to data processing system 208 to configure a request.

The information contained in a request may specify the one or more actions to be performed and the criteria involving physical locations of paper documents for performing the actions. Various different types of requests may be received.

According to an embodiment of the present invention, a request received by data processing system 208 specifies that one or more actions be performed using paper document-related information corresponding to one or more paper documents that are physically located at a specified particular physical location. A physical location may correspond to a zone or area in which a paper document may be located.

Figure 3:
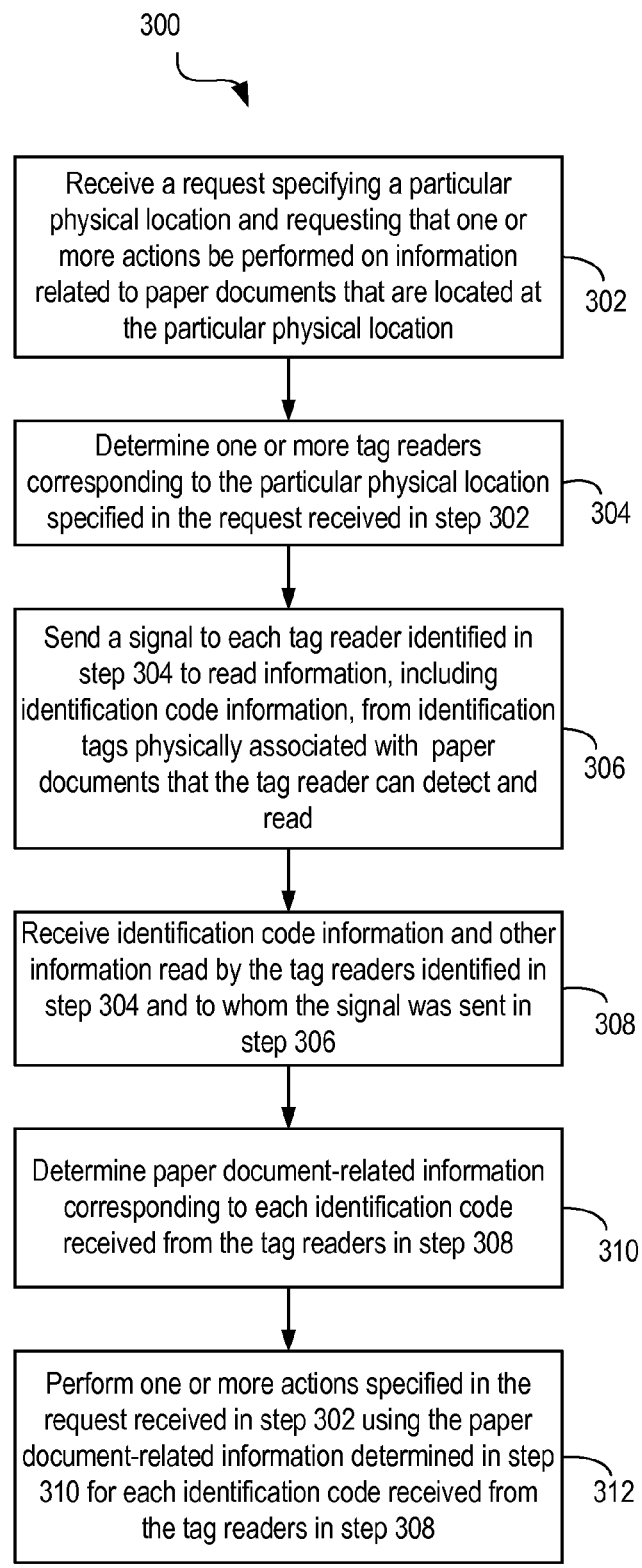
FIG. 3 is a simplified high-level flowchart depicting a method of processing a request that specifies a particular physical location and one or more actions to be performed using paper document-related information related to paper documents that are physically located at the particular physical location according to an embodiment of the present invention.

FIG. 3 is a simplified high-level flowchart 300 depicting a method of processing a request that specifies a particular physical location and one or more actions to be performed using paper document-related information related to paper documents that are physically located at the particular physical location according to an embodiment of the present invention. The method may be performed by data processing system 208, or by data processing system 208 in association with devices 204 or other data processing systems. For example, the method may be performed by software modules executed by processor(s) of data processing system 208, or by hardware modules coupled to data processing system 208, or combinations thereof Flowchart 300 depicted in FIG. 3 is merely illustrative of an embodiment incorporating the present invention and does not limit the scope of the invention as recited in the claims. One of ordinary skill in the art would recognize variations, modifications, and alternatives.

As depicted in FIG. 3, processing is initiated when data processing system 208 receives a request comprising information specifying a particular physical location and requesting that one or more actions be performed on information related to paper documents that are located at the particular physical location (step 302). The request may be received from various sources. According to an embodiment of the present invention, the request is received from user system 206. The request may also be configured by a user interacting with data processing system 208. It should be understood that one or more physical locations might be specified in the request.

There are various ways in which a user may specify the physical location. According to an embodiment of the present invention, the physical location may correspond to a zone or area, e.g., John's office, a particular conference room, Mr. Smith's office desk, Mr. Smith's in-box container in his office, Mr. Smith's briefcase, and so on. Other types of coordinates may also be used for specifying a physical location. According to an embodiment of the present invention, a user may specify a physical location by identifying one or more tag readers located at the physical location. In this embodiment, a user interface may be displayed to the user displaying the various tag readers deployed in the system and physical locations of the tag readers. A user via the user interface can then specify a physical location by selecting one or more tag readers located at the physical location.

In addition to specifying a physical location, a request received in step 302 also specifies one or more actions to be performed. If multiple physical locations are specified in the request, then one or more actions may be specified for each physical location. Examples of requests include: (a) fax contents of all paper documents located in Mr. Smith's in-box to John; (b) make copies of paper documents in the conference room; (c) print one copy of every document in John's office; (d) compose and send an email to John Doe comprising electronic versions of paper documents located in Mary's briefcase and on Mary's desk; (e) and the like.

Data processing system 208 then determines one or more tag readers corresponding to the physical location specified in the request received in step 302 (step 304). According to an embodiment of the present invention, data processing system 208 uses the tag reader location information to determine one or more tag readers corresponding to the user-specified physical location. For example, if the user has specified Mr. Smith's office desk, then tag reader 202-5 (from the previous example) is identified in step 304. If multiple physical locations are specified in the request, then in step 302, tag readers for each of the specified physical locations are determined. It should be understood that step 304 may not be needed if the user has specified the physical location by selecting one or more tag readers.

Data processing system 208 then sends a signal to each tag reader identified in step 304 to read identification code information and other information from identification tags physically associated with one or more paper documents that the tag reader can detect and read (step 306). As described above, if a particular tag reader identified in step 304 is able to read an identification code from an identification tag physically associated with a particular paper document, it indicates that the particular paper document is physically located proximal to the tag reader.

In alternative embodiments of the present invention, the tag readers may be configured to forward information read from the identification tags to data processing system 208 at periodic time intervals. In these embodiments, step 306 may not be needed.

Data processing system 208 then receives identification code information and other information read by the tag readers identified in step 304 (step 308).

Data processing system 208 then determines paper document-related information corresponding to each identification code received from the tag readers in step 308 (step 310). According to an embodiment of the present invention, information stored in the paper document tracking database is used to determine paper document-related information for the identification codes received from the tag readers. The paper document tracking database is searched to identify records whose identification codes match the identification codes read by the tag readers. Paper document-related information for the identification codes is then determined from the matching records.

In alternative embodiments, the paper document-related information for a paper document may be stored in an identification tag that is physically associated with a paper document and may be read by the tag readers along with the identification code information. For such a paper document, data processing system 208 may receive the paper document-related information along with the identification code information for the document in step 308. In this scenario, data processing system 102 need not query the paper document tracking database to determine paper document-related information for the paper document since the paper document-related information is read directly from an identification tag that is physically associated with the paper document.

As previously described, the paper document-related information corresponding to an identification code may comprise (or store a pointer to) a representation of the contents of the particular paper document (e.g., scanned images of the paper document, electronic document corresponding to the paper document), information identifying the paper document (e.g., title of the paper document, etc.), information identifying an electronic representation of the paper document (e.g., a filename, directory location, etc.), and the like. The paper document-related information may also include information identifying another document related to the paper document.

One or more actions specified in the request received in step 302 are then performed using the paper document-related information determined for the one or more identification codes received from the tag readers in step 308 (step 312). According to an embodiment of the present invention, an action is performed using paper document-related information determined for at least one paper document located in the physical location specified in the request.

As indicated above, the paper document-related information corresponding to an identification code may be determined from the paper document tracking database. The paper document-related information may also be read from the identification tags along with the identification code and received from the tag readers. The actions may be performed by data processing system 208, by devices 204 coupled to data processing system 208, or by data processing system 208 in collaboration with one or more devices 204, or by other systems or devices.

Various different kinds of actions may be performed including emailing, faxing, copying, printing, or any other action using the paper document-related information or a portion thereof. For example, if the paper document-related information corresponding to an identification code includes an electronic representation of a paper document, the electronic representation may be emailed to an addressee specified in the request received in step 302. Likewise, if the paper document-related information corresponding to an identification code includes a scanned image of the paper document, the scanned image may be printed on a printer specified in the request. Various other types of actions may also be performed using the paper document-related information corresponding to identification codes read by the tag readers.

According to an embodiment of the present invention, the present invention stores information identifying actions that have been performed for a paper document identified by a particular identification code. The actions-related information may be stored in paper document tracking database and associated with the particular identification code. For example, if the paper document-related information corresponding to the particular identification code was faxed, the following action-related information may be stored in the paper document tracking database and associated with the particular identification code:

FAXED to 650-854-8740 ON 8/23/2000 AT 16:46:21

As shown above, the action-related information identifies an action that was performed, the date when the action was performed, and the time when the action was performed. It should be understood that the action-related information may comprise other types of information in alternative embodiments of the present invention.

By storing action-related information for each action performed for an identification code, information identifying a history of actions performed for the paper document identified by the identification code may be stored.

According to an embodiment of the present invention, the actions-related information may also be stored in an identification tag that is physically associated with a paper document. In this embodiment, the identification tag can be scanned to determine actions that have been performed on paper document-related information corresponding to the paper document to which the identification tag is attached. In this embodiment, the paper document represents an autonomous document that "stores" information identifying actions that have been performed on the document.

As described above, FIG. 3 depicts a method for processing a request received by data processing system 208 that identifies one or more physical locations and actions to be performed using paper document-related information corresponding to paper documents physically located at the specified one or more locations. Various other types of requests may be received by data processing system 208. According to an embodiment of the present invention, data processing system 208 receives a request that specifies selection criteria and one or more actions to be performed if the selection criteria is satisfied.

Figure 4:
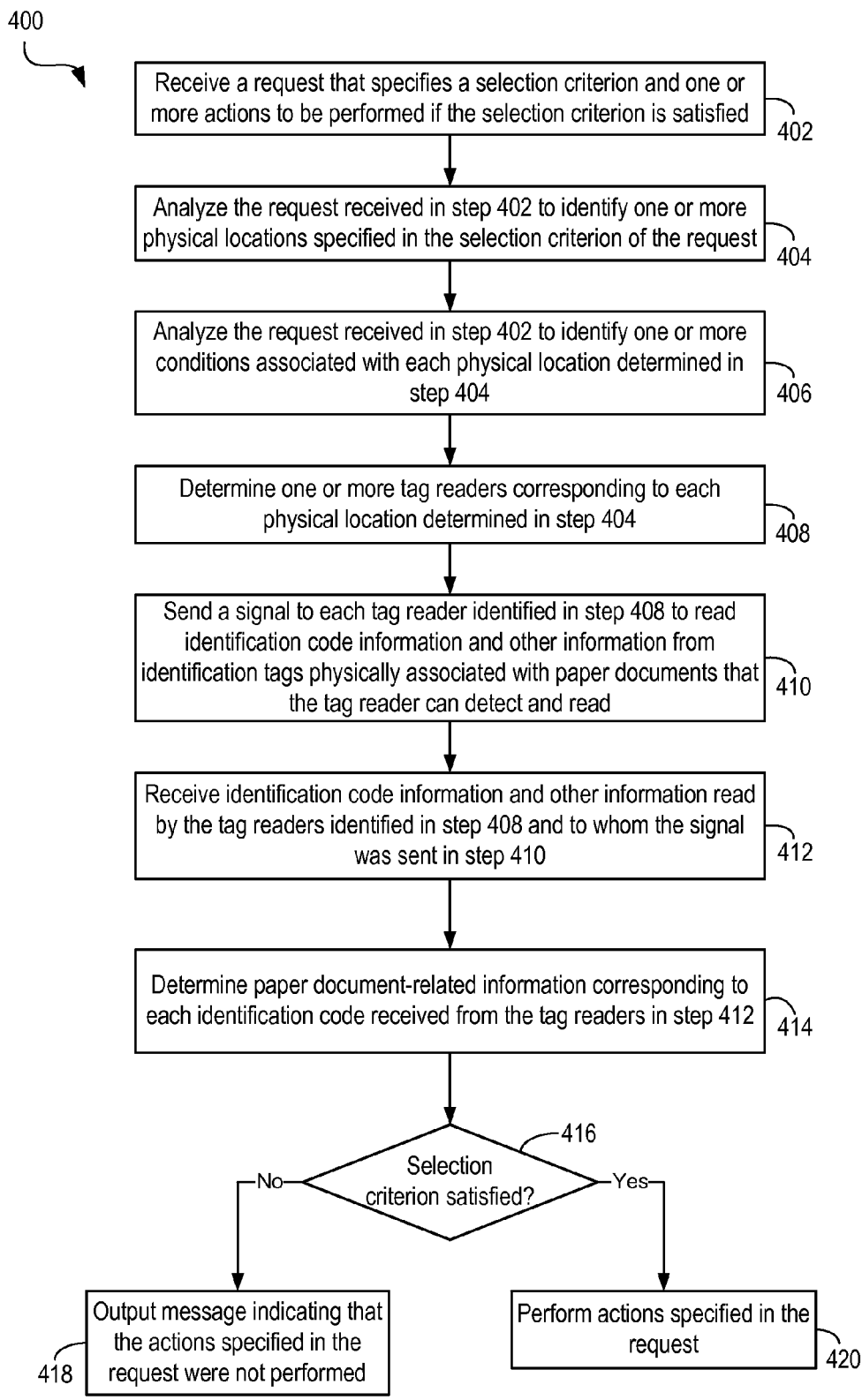
FIG. 4 is a simplified high-level flowchart depicting a method of processing a request that specifies selection criteria and one or more actions to be performed if the selection criterion is satisfied according to an embodiment of the present invention.

FIG. 4 is a simplified high-level flowchart 400 depicting a method of processing a request that specifies selection criteria and one or more actions to be performed if the selection criterion is satisfied according to an embodiment of the present invention. The method may be performed by data processing system 208, or by data processing system 208 in association with devices 204 or in association with other data processing systems. For example, the method may be performed by software modules executed by processor(s) of data processing system 208, or by hardware modules coupled to data processing system 208, or combinations thereof. Flowchart 400 depicted in FIG. 4 is merely illustrative of an embodiment incorporating the present invention and does not limit the scope of the invention as recited in the claims. One of ordinary skill in the art would recognize variations, modifications, and alternatives.

As depicted in FIG. 4, processing is initiated when data processing system 208 receives a request that specifies a selection criterion and one or more actions to be performed if the selection criterion is satisfied (step 402). The request may be received from various sources. For example, the request may be received from user system 206 or may be configured by a user interacting with data processing system 208.

According to an embodiment of the present invention, the selection criterion includes information identifying one or more physical locations and one or more conditions associated with each physical location. The one or more actions specified in the request are performed based upon the extent to which the conditions associated with the specified physical locations are satisfied. Various different notations and techniques known to those skilled in the art may be used to specify the selection criteria and actions.

Examples of requests include:
(1) (selection criterion) Phy. Loc.+Condition: If Paper document "doc1" is located in John's in-box container, (action) fax document "doc1" to Mary;
(2) (selection criterion) Phy. Loc.+Condition: If paper document "doc1" is located in John's in-box container, (action) send an email to Mary indicating that "doc1" is in John's in-box;
(3) (selection criterion) Phy. Loc.+Condition: If John's office contains a document titled "Project Plans for 2002",
   (action) print a copy of the document;
(4) (selection criterion) Phy. Loc. #1+Condition #1: If document "doc1" is located in John's in-box, AND
   Phy. Loc. #2+Condition #1: document "doc2" is located in Mary's office,
   (action) send an email to David;
and other like requests.

Data processing system 208 analyzes the request received in step 402 to identify one or more physical locations specified in the selection criterion of the request (step 404). Various different processing techniques known to those skilled in the art may be used to analyze the request to identify one or more physical locations specified in the request.

Data processing system 208 then analyzes the request received in step 402 to identify one or more conditions associated with each physical location determined in step 404 (step 406). Various different processing techniques known to those skilled in the art may be used to analyze the request to identify one or more conditions associated with each physical location specified in the request.

Data processing system 208 then determines one or more tag readers corresponding to each physical location determined in step 404 (step 408). According to an embodiment of the present invention, data processing system 208 uses the tag reader location information to determine one or more tag readers corresponding to the user-specified physical locations. For example, if the user-specified physical location is "John's in-box", then data processing system 208 uses the tag reader location information to identify one or more tag readers corresponding to or located proximal to John's in-box.

As previously described, a user may also specify a physical location by selecting one or more tag readers. In this scenario step 408 may not be performed.

Data processing system 208 then sends a signal to each tag reader identified in step 408 to read identification code information and other information from identification tags physically associated with paper documents that the tag reader can detect and read (step 410). As described above, if a particular tag reader identified in step 304 is able to read an identification code from an identification tag associated with a particular paper document, it indicates that the particular paper document is physically located proximal to the tag reader.

Data processing system 208 then receives identification code information and other information read by the tag readers identified in step 408 and to whom the signal was sent in step 410 (step 412). In alternative embodiments of the present invention, the tag readers may be configured to forward information read from the identification tags to data processing system 208 at periodic time intervals. In these embodiments, step 410 may be omitted.

Data processing system 208 then determines, based upon information in the paper document tracking database, paper document-related information corresponding to each identification code received from the tag readers in step 412 (step 414). As previously described, the paper document-related information corresponding to an identification code may comprise (or store a pointer to) a representation of the contents of the particular paper document (e.g., scanned images of the paper document, electronic document corresponding to the paper document), information identifying the paper document (e.g., title of the paper document, etc.), information identifying an electronic representation of the paper document (e.g., a filename, directory location, etc.), and the like. The paper document-related information may also include information identifying another document related to the paper document.

In alternative embodiments of the present invention, if the paper document-related information is stored in identification tags, the paper document-related information for an identification code may be read by one or more tag readers identified in step 408 and may be received along with the identification code information in step 412. In this scenario, there is no need to access the paper document tracking database to determine paper document-related information.

Based upon the information determined in step 414 (or information received in step 412), data processing system 208 determines if the selection criterion specified in the request received in step 402 is satisfied (step 416). According to an embodiment of the present invention, in step 416, data processing system 208 determines if the one or more conditions (identified in step 406) associated with each physical location determined in step 404 are satisfied. Various types of processing may be used to determine if the conditions associated with the physical locations are satisfied. For example, if a condition involves determining a characteristic (e.g., title) of a document (e.g., If John's office contains a document titled "Project Plans for 2002") and the paper document-related information determined in step 414 includes a scanned image of the paper document, then image processing techniques may be applied to the scanned image to determine the characteristic (e.g., title) of the paper document. Data processing system 208 may then determine if the condition is satisfied. Various other types of processing may also be performed.

Conditions involving the physical presence of a paper document in a particular physical location (e.g., if paper document "doc1" is located in John's in-box) may be evaluated by determining if a tag reader corresponding to the physical location was able to read identification code corresponding to the particular paper document. In addition to the identification code information, the paper document-related information related to the identification code may be used to determine the identity of the paper document. If none of the tag readers corresponding to the physical location were able to read identification code corresponding to the particular paper document, then the condition is deemed not to be satisfied (i.e., the specified document could not be located at the specified physical location).

Whether or not the one or more actions specified in the request received in step 402 are performed depends upon the extent to which the selection criterion is deemed satisfied. If the selection criterion comprises Boolean connectors that used to connect the various conditions associated with one or more physical locations, then Boolean logic may be used to determine if the action specified by the request is to be performed.

If it is determined in step 416 that the selection criteria is not satisfied, then a message may be output to the user indicating that the one or more actions specified in the request were not performed (step 418). Information identifying one or more reasons for not performing the actions may also be output to the user in step 418.

If it is determined in step 416 that the selection criterion has been satisfied, then the one or more actions specified in the request are performed (step 420). The actions may be performed using information determined in step 414 or using other information. For example, for the example request "If Paper document "doc1" is located in John's in-box container, fax document "doc1" to Mary", "doc1" is faxed to Mary if paper document "doc1" is located in John's in-box container. The actions may be performed by data processing system 208, by devices 204 coupled to data processing system 208, by data processing system 208 in collaboration with one or more devices 204, or by other data processing systems or devices.

As described above, information identifying the actions performed may be stored in paper document tracking database or in identification tags that are physically associated with paper documents identified by identification code information received in step 412.

Techniques that Facilitate Tracking of Physical Locations of Paper Documents

Certain embodiments of the present invention provide techniques that facilitate tracking of physical locations of paper documents. For purposes of this invention, the term "paper document" is intended to refer to a document comprising one or more pages of any tangible medium on which information can be printed, written, drawn, imprinted, embossed, etc. For example, a paper document may refer to a document printed by a printer, a document output by a copier or scanner, a document output by a facsimile machine, a photograph, a book, a single page of paper, a document comprising a plurality of papers, and the like. In alternative embodiments, the teachings of the present invention may also be applied to other types of objects besides paper documents.

For purposes of this invention, the term "electronic document" is intended to refer to information stored in an electronic or digital form. Examples of electronic documents include files, documents created using application programs such as word processors, email programs, image editors, etc., scanned images of paper documents, documents stored in various formats such as PDF, Postscript, etc., and other types of documents stored in electronic form.

Embodiments of the present invention can track physical locations of paper documents that have identification tags physically associated with them. Each identification tag that is physically associated with a paper document is configured to store information that can be used to uniquely identify the paper document with which the identification tag is physically associated. For a particular paper document, the identification tag physically associated with the particular paper document along with information stored in the identification tag facilitates tracking of the physical location of the particular paper document.

As described above, each identification tag that is physically associated with a paper document stored information can be used to uniquely identify the paper document with which the identification tag is physically associated. The information stored in the identification tag may be of various types. According to an embodiment of the present invention, a unique identification code is stored in an identification tag. In this embodiment, the unique identification code is used to identify the paper document with which the identification tag is physically associated. It should be understood that other types of information that can be used to identity documents might also be stored in an identification tag in alternative embodiments of the present invention.

In addition to information that is used to identify a paper document, other information related to the paper document may also be stored in an identification tag that is physically associated with the paper document. For example, according to an embodiment of the present invention, an electronic representation of the contents of the paper document (e.g., a scanned image of the paper document, a Postscript format file or Portable Document Format (PDF) or image format or other format file used for generating the paper document, electronic contents of the paper document or portions thereof, etc.) may be stored in an identification tag physically associated with the paper document. Other types of information such as information identifying the author of the paper document, the date when the paper document was created, the number of pages in the paper document, and other like information may also be stored in the identification tag that is physically associated with the paper document. Other types of information that can be stored in an identification tag is described in U.S. application Ser. Nos. 10/235,042, 10/235,032, 10/235,028, 10/235,030, 10/234,414, the entire disclosures of which are herein incorporated by reference for all purposes.

Various devices known to those skilled in the art may be used as identification tags. According to an embodiment of the present invention, an identification tag device includes an on-device memory that is capable of storing information related to the paper document with which the identification tag is physically associated. Depending upon the type of identification tag used, the information (e.g., identification code information, and other information) may be stored in the memory of the identification tag when the tag is manufactured, when the tag is activated, or at some later time using software or hardware techniques. Various tag readers may be configured to read the information stored by the identification tag.

According to an embodiment of the present invention, in order to track the physical location of a paper document, a tag reader is configured to read the information stored in the identification tag that is physically associated with the paper document. A tag reader may use various different techniques to read information from an identification tag. According to an embodiment of the present invention, a tag reader may read information from an identification tag by scanning the identification tag. In other embodiments, a tag reader may read the information by receiving the information from the identification tag. A tag reader may receive the information from an identification tag in response to an external stimulus (e.g., electromagnetic energy) or signal provided to the identification tag. The external stimulus or signal may be provided by the tag reader or by some other device or application. If the identification tag is self-powered, the identification tag may be configured to communicate the information stored by the identification tag to the tag reader. A tag reader may read the information stored by a tag reader in various forms including electromagnetic waves, electronic signals, acoustic signals, etc.

According to an embodiment of the present invention, radio frequency identification devices (RFIDs) are used as identification tags. For example, the Mu-chip manufactured by Hitachi, Ltd. may be used as an identification tag. The Mu-chip is a radio recognition IC chip that measures 0.4-mm square and is 60 microns thick in its present embodiment. Due to its reduced size, the Mu-chip can be embedded into paper. The Mu-chip comprises an on-chip memory (presently a 128-bit ROM) that can be programmed to store information (e.g., an identification code) that can be used to identify a paper document. In its present embodiment, a tag reader can read information stored by a Mu-chip by exposing the Mu-chip to 2.45 GHz band microwaves. The Mu-chip uses the microwave energy as a power source and communicates the information stored in the on-chip memory in the form of radio waves that can be detected and read by a tag reader. In alternative embodiments, the Mu-chip may also include an on-chip antenna to increase the communication distance range. In yet other embodiments, a power source may be provided on the Mu-chip and the Mu-chip may be programmed to communicate the information stored by the Mu-chip to a tag reader.

Various different techniques may be used to physically associate an identification tag with a paper document. According to one technique, depending on the size of the identification tag, the identification tag is embedded in a page of the paper document. For example, a Mu-chip, due to its reduced size, can be embedded in a page of the paper document. A paper page that has an identification tag embedded in it may be referred to as "tagged paper". In this embodiment, a paper document may include at least one page that has an identification tag embedded in it. According to an embodiment of the present invention, if the paper document output device has access to tagged paper, the paper document output device may use one or more of the tagged papers to generate the paper document.

The identification tag may also be permanently or temporarily attached to a paper document. The tag may be attached to the paper document using clips, staples, adhesives, ties, strings, rubber bands, labels with identification tags, and the like. An identification tag may also be incorporated into an object such as a label, a staple, etc. that is attached to the paper document.

According to an embodiment of the present invention, an identification tag is physically associated with a paper document at the time the paper document is generated or produced. A device that generates or produces a paper document may be referred to as a "paper document output device". Accordingly, in one embodiment of the present invention, the identification tag is physically associated with a paper document by the paper document output device that is used to produce or generate the paper document. Examples of paper document output devices include printers, scanners, copiers, facsimile machines, cameras that are capable of printing photos, and the like.

For example, according to an embodiment of the present invention, a copier may be configured to physically associate an identification tag with a photocopy paper document produced by the copier. Likewise, a printer may be configured to physically associate an identification tag with a paper document printed by the printer. A facsimile machine may be configured to physically associate an identification tag with a paper document facsimile output. Likewise, other paper document output devices may be configured to physically associate identification tags with paper documents when the paper document output devices generate the paper documents.

According to an embodiment of the present invention, a paper document output device is configured to automatically physically associate an identification tag with a paper document generated by the paper document output device when the paper document output device produces the paper document. For example, if the paper document output device has access to tagged paper, the paper document output device may automatically use one or more of the tagged papers to generate the paper document. In other embodiments, the paper document output device may be configured to dispense an identification tag that can be attached to a paper document produced by the paper document output device. The paper document output device may dispense the identification tag when the paper document output device generates the paper document. For example, the paper document output device may output a label with an identification tag affixed on it and request a user of the paper document output device to attach the dispensed label to the paper document generated by the paper document output device.

In addition to physically associating an identification tag with a paper document, for each identification tag that is physically associated with a paper document generated by a paper document output device, the paper document output device may also be configured to read information stored on the identification tag. For example, the paper document output device may be configured to read the identification code information from an identification tag that is physically associated with a paper document generated by the paper document output device. The paper document output device may then store the identification code information read from the paper document.

According to an embodiment of the present invention, the identification code information read from an identification tag physically associated with a paper document is used to uniquely identify the paper document and may be stored by paper document output device. For example, the identification code information may be stored in a database ("paper document tracking database") accessible to the paper document output device.

According to an embodiment of the present invention, along with the identification codes, information identifying physical locations of paper documents corresponding to the identification codes is also stored. For example, for each identification code stored, information identifying the physical location of the paper document identified by the identification code is also stored. The physical location information for a document identified by an identification code is associated with the identification code information for the document. The information is stored in a manner such that the physical location information for a particular document can be determined based upon the identification code for the particular document. According to an embodiment of the present invention, the identification code and the physical locations information are stored in the paper document tracking database.

When a paper document output device generates a paper document, the physical location of the paper document is the same as the physical location of the paper document output device itself. For example, when a copier generates a photocopy, the photocopy is generally located on an output tray of the copier. As a result, when a paper document is generated by a paper document output device, the identification code read from the identification tag physically associated with the paper document is stored and the physical location information associated with the stored identification code is initialized to the physical location of the paper document output device. As indicated above, according to an embodiment of the present invention, the paper document output device may store the identification code information and the physical location information in the paper document tracking database.

For each identification code stored in the paper document tracking database, other information related to the paper document identified by the identification code may also be stored in the paper document tracking database. According to an embodiment of the present invention, electronic information representative of the paper document may also be stored in the paper document tracking database and associated with the identification code identifying the paper document. For example, a scanned image of the paper document, an electronic format (e.g., Postscript format, PDF format, image format, etc.) that is received by the paper document output device and used to generate the paper document, etc. may be stored in the paper document tracking database.

For example, for a paper document generated by a printer, the printer may be configured to store the following information in the paper document tracking database: the identification code information read from an identification tag physically associated with the paper document printed by the printer, information identifying the physical location of the printer, and electronic format (e.g., Postscript file, PDF file, image format, etc.) received and used by the printer to generate the printout.

For a photocopy paper document generated by a copier or scanner from an original paper document, the copier or scanner may be configured to store the following information in the paper document tracking database: the identification code information read from an identification tag physically associated with the photocopy paper document generated by the copier, information identifying the physical location of the copier, and a scanned image of the original paper document that is used by the copier to generate the photocopy.

For a facsimile output generated by a facsimile machine, the facsimile machine may be configured to store the following information in the paper document tracking database: the identification code information read from an identification tag physically associated with the facsimile output, information identifying the physical location of the facsimile machine, and electronic information that is used by the facsimile machine to generate the facsimile output.

According to the teachings of the present invention, the physical location information corresponding to an identification code and stored in the paper document tracking database is updated as the physical location of the paper document identified by the identification code changes. As described below, a network of tag readers is used to determine the physical location of the paper document and to appropriately update the physical location information associated with the identification code identifying the document.

As indicated above, the identification code information and the physical location information for paper documents may be stored in a paper document tracking database. The paper document output device or some other data processing system may store the paper document tracking database. If the information is stored by a system other than the paper document output device, the paper document output device may be configured to forward the information to the other system.

It should be understood that various different techniques known to those skilled in the art might be used for storing identification codes information, physical locations information, and other information described above. For example, in alternative embodiments, the information may be stored in a file, in one or more data structures, and the like.

Figure 5:
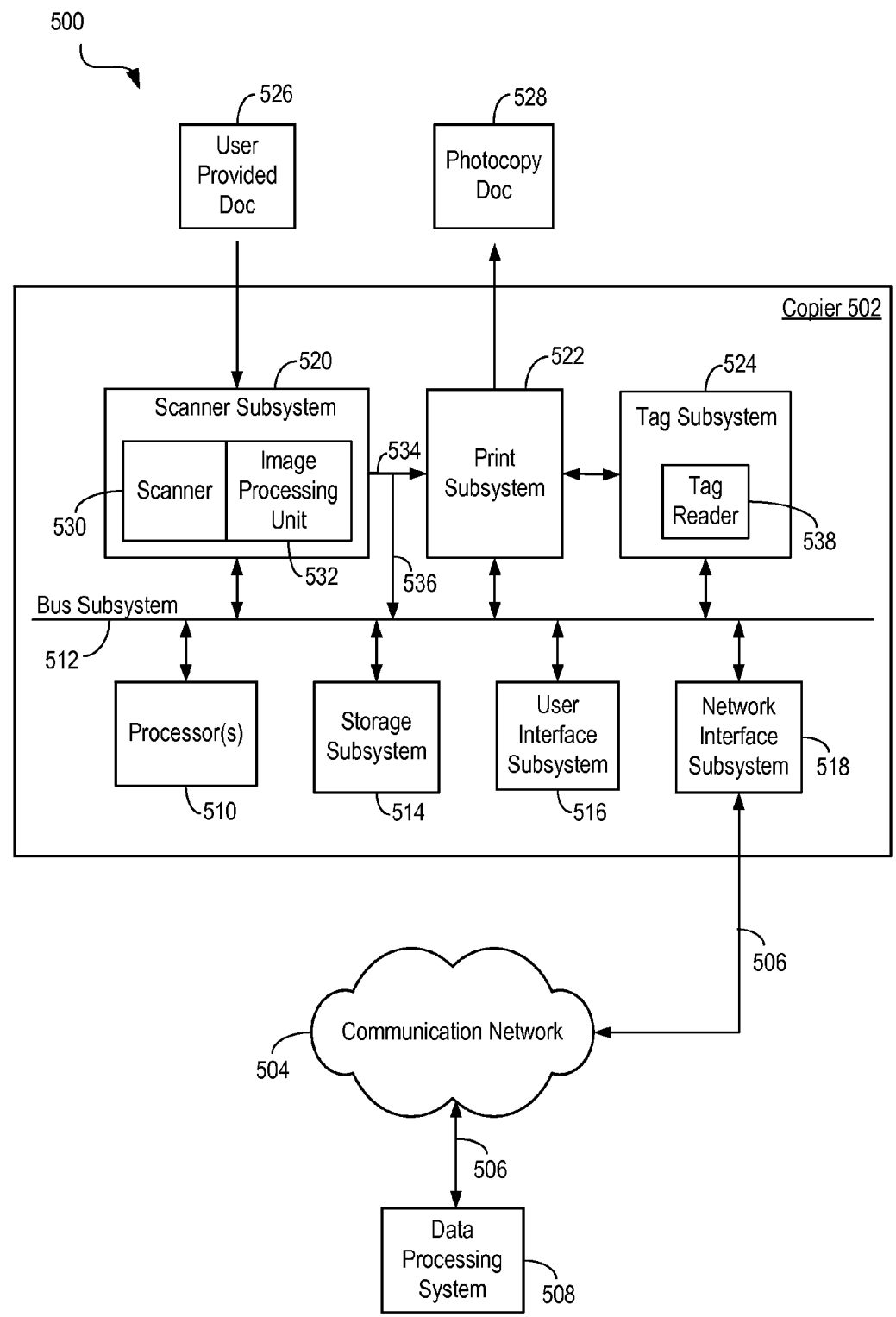
FIG. 5 is a simplified block diagram of a network environment comprising a copier that is configured to generate paper documents according to an embodiment of the present invention.

As stated above, the paper document output device may be embodied as a copier. In accordance with the teachings of the present invention, the copier may be configured to physically associate an identification tag with a paper document generated by the copier and to facilitate storage of identification code information read from identification tags physically associated with the paper document generated by the copier. FIG. 5 is a simplified block diagram of a network environment 500 comprising a copier 502 that is configured to generate paper documents according to an embodiment of the present invention. As depicted in FIG. 5, copier 502 is coupled to network 504 via communication link 506. Copier 502 is configured to accept a document 526 (also referred to as the "user-provided document") and print a copy 528 (or photocopy) of document 526. Document 528 thus represents the paper document generated by copier 502. The user-provided document may be a single or multi-page document. Photocopy document 528 may also be a single or a multi-page document. A data processing system 508 may be also be coupled to network 504 via communication link 506. Network environment 500 depicted in FIG. 5 is merely illustrative of an environment incorporating the present invention and does not limit the scope of the invention as recited in the claims. One of ordinary skill in the art would recognize other variations, modifications, and alternatives.

Communication network 504 depicted in FIG. 5 provides a mechanism for allowing communication and exchange of data and information between data processing system 508 and copier 502. Communication network 504 may itself be comprised of many interconnected computer systems and communication links. Communication network 504 may be embodied as a direct connection, a LAN, a wide area network (WAN), a wireless network, an Intranet, the Internet, a private network, a public network, a switched network, or any other suitable communication network.

Communication links 506 that are used to connect the various systems depicted in FIG. 5 may be of various types including hardwire links, optical links, satellite or other wireless communication links, wave propagation links, or any other mechanisms for communication of information. Various communication protocols may be used to facilitate communication of information via the communication links. These communication protocols may include TCP/IP, HTTP protocols, extensible markup language (XML), wireless application protocol (WAP), protocols under development by industry standard organizations, vendor-specific protocols, customized protocols, and others.

As shown in FIG. 5, copier 502 includes a processor 510 that communicates with a number of peripheral subsystems via a bus subsystem 512. These peripheral subsystems may include a storage subsystem 514, a user interface subsystem 516, a network interface subsystem 518, a scanner subsystem 520, a print subsystem 522, and a tag subsystem 524.

Bus subsystem 512 provides a mechanism for letting the various components and subsystems of copier 502 communicate with each other as intended. Although bus subsystem 512 is shown schematically as a single bus, alternative embodiments of the bus subsystem may utilize multiple buses.

User interface subsystem 516 allows user interaction with copier 502. A user may be a human user, a device, a process, another computer, and the like. User interface subsystem 516 may be implemented using a touch pad, a touch screen, mechanical buttons, and the like. Interface 516 allows the user to select options for generating a photocopy 528 from a user-provided document 526. For example, interface 516 may allow the user to select the paper size to be used for generating the photocopy, the copy darkness, the copy contrast, number of copies to be produced, magnification/reduction ratio, and other like options known to those skilled in the art. Interface 516 may also provide a "Copy/Start" key that allows the user to initiate the copying function. Upon selection of the "Start/Copy" key, copier 502 prints a copy 528 (or photocopy) of the user-provided document 526.

According to an embodiment of the present invention, interface 516 allows a user to select if an identification tag is to be physically associated with photocopy paper document 528 generated by copier 502. For example, before photocopying a user-provided document 526, interface 516 may prompt the user to select whether an identification tag is to be physically associated with the photocopy. An identification tag is then physically associated with the photocopy paper document only if the user indicates that an identification tag is to be physically associated with the photocopy.

In an alternative embodiment of the present invention, an identification tag may be physically associated with a photocopy generated by copier 502 without prompting the user or without receiving the user's permission. In this embodiment of the present invention, activation of the "Copy/Start" key by the user is sufficient to initiate the photocopying function, cause copier 502 to physically associate an identification tag to the generated photocopy paper document, read the identification code information from the identification tag physically associated with the photocopy generated by copier 502, and store the identification code information, and physical location information of document 528 in a paper document tracking database. As indicated above, the physical location of photocopy document 528 may be initialized to the physical location of copier 502. Other information related to the photocopy may also be stored in the paper document tracking database.

According to an embodiment of the present invention, selection of the "Copy/Start" key represents a single user command that is interpreted by copier 502 to request both copying, physically associating an identification tag with the generated photocopy, and storing information in the paper document tracking database. In this embodiment, the user may not be aware that an identification tag has been applied to the photocopy produced by copier 502 and that the identification code read from the identification tag and corresponding physical location information of the generated photocopy has been automatically archived by copier 502 in the paper document tracking database.

User interface subsystem 516 also serves as an interface for outputting information to the user. For example, information related to the status of copier 502 or information related to the copying function initiated by a user might be output to the user via interface 516.

Network interface subsystem 518 provides an interface to other computer systems (e.g., data processing system 508), networks, and devices. Embodiments of network interface subsystem 518 include an Ethernet card, a modem (telephone, satellite, cable, ISDN, etc.), (asynchronous) digital subscriber line (DSL) units, and the like. Network interface system 518 facilitates transfer of information to and from copier 502 in an appropriate format.

Processor 510 performs or controls the overall functioning of copier 502. For example, processor 510 may execute a program that controls the functions of the various subsystems of copier 502. These functions may include physically associating identification tags with photocopies, reading identification code information from the identification tags physically associated with photocopies generated by copier 502, and storing identification code information and corresponding physical location information in the paper document tracking database.

Storage subsystem 514 may be configured to store the basic programming and data constructs that provide the functionality of copier 502. For example, according to an embodiment of the present invention, software modules and control programs implementing the functionality of copier 502 may be stored in storage subsystem 514. Processor 510 may execute these software modules. Storage subsystem 514 may also provide a repository or database for storing information according to the teachings of the present invention. For example, the paper document tracking database may be stored in storage subsystem 514. It should be understood that the paper document tracking database may be stored locally (i.e., by copier 502) or by some other storage system. For example, according to an embodiment of the present invention, the paper document tracking database may be stored by data processing system 508. In this embodiment, copier 502 may be configured to communicate the identification code information and physical location information to data processing system 508.

Scanner subsystem 520 includes a scanner 530 and an image-processing unit 532. Scanner 530 is configured to capture an image of user-provided document 526 and transmit the image to image processing unit 532. Image processing unit 532 operates to remove distortion inherent in the scanning process. The output of the image-processing unit is a scanned image of document 526 with the distortion removed. The scanned image is then forwarded to print subsystem 522 for further processing via video bus 534. The scanned image is used to generate a photocopy 528 of user-provided document 526. According to an embodiment of the present invention, the scanned image is also stored in the paper document tracking database and associated with identification code read from the identification tag physically associated with document 528.

According to an embodiment of the present invention, an image data tap 536 provides processor 510 with access to scanned image data transferred over video bus 534. In alternative embodiments of the present invention, the image scanned by scanner 530 may be provided to processor 510 by scanner subsystem 520.

Print subsystem 522 operates in accordance with well-known laser xerography principles and is configured to receive scanned information from scanner subsystem 520 and produce a paper document photocopy 528 of user-provided document 526. Print engine 522 operates in synchrony with tag subsystem 524 to ensure that an identification tag is appropriately physically associated with photocopy 528 and that identification code information from the identification tag is read and stored in the paper document tracking database along with physical location information for the photocopy.

Tag subsystem 524 is configured to physically associate identification tags with photocopies generated by copier 502. As described above, various different techniques may be used to physically associate an identification tag with a photocopy paper document. For example, the paper document photocopy 528 may be generated using at least one tagged paper. An identification tag may also be attached to photocopy 528 or embodied in an object attached to photocopy 528.

According to an embodiment of the present invention, Hitachi Mu-chips are used as an identification tag. Due to its reduced size, various different ways may be used for physically associating a Mu chip with photocopy 528. If the chip is embedded in paper (i.e., if tagged paper is used), tag subsystem 524 may select at least one tagged paper sheet and provide the tagged paper to print subsystem 522 to generate photocopy paper document 528. According to an embodiment of the present invention, tag subsystem 524 in conjunction with print subsystem 522 ensures that at least one tagged page is used to generate photocopy 528. If the photocopy consists of multiple pages, then normal paper pages (i.e., paper pages without the embedded identification tag) may be used for other pages of the photocopy paper document. The selection of one or more tagged papers for generating photocopy 528 may be performed by tag subsystem 524, by print subsystem 522, or by the two in conjunction.

An identification tag may also be physically associated with a paper document by physically applying or attaching the identification tag to the paper document. If the size of the identification tag permits, the identification tag may be attached to paper document photocopy 528 such that it is not directly visible to the unaided observer or user of paper document 528. For example, the identification tag may be embedded or mounted on a staple, and copier 502 may attach the staple to photocopy document 528. The identification tag may also be attached to photocopy paper document 528 by mixing it in the ink that is printed on one or more pages of the photocopy when the photocopy is generated by print subsystem 522. The identification tag may also be physically associated with the photocopy paper document generated by copier 502 using an adhesive, a clip, or other like mechanism.

In alternative embodiments, copier 502 may dispense a sticker or label comprising an identification tag. The identification tag may be physically associated with photocopy 528 by applying the sticker or label to photocopy document 528. For example, copier 502 may dispense a label comprising an identification tag and a user may be requested to apply the dispensed label to photocopy 528 generated by copier 502. Various other techniques may also be used to physically associate an identification tag with paper document 528.

As previously described, each identification tag stores information such as a unique identification code that can be used to uniquely identify a paper document. The identification code may be programmed into the identification tag when the identification tag is manufactured or activated. In alternative embodiments of the present invention, copier 502 may be configured to write a unique identification code in the memory of an identification tag during the generation of photocopy 528. For example, the identification code information may be stored in the memory of an identification tag before the tag is physically associated with photocopy 528.

According to an embodiment of the present invention, tag subsystem 524 is also configured to read the identification code from an identification tag that is physically associated with a photocopy paper document 528 generated by copier 502. In order to facilitate reading of the identification code from the identification tag, one or more tag readers 538 may be incorporated into tag subsystem 524. The tag readers are configured to read information from each identification tag physically associated with paper documents generated by copier 502. The type of tag reader used generally depends on the type of identification tags used by copier 502. For example, if a Hitachi Mu-chip is used as an identification tag, tag reader 538 included in tag subsystem 524 may be constructed to expose the Mu-chip to 2.45 GHz band of microwaves and to detect and read radio waves emanating from the Mu-chip. Various other types of tag readers that are capable of detecting electromagnetic, optical, acoustical, or other signals may be used in alternative embodiments of the present invention using other forms of identification tags.

Upon reading identification code information from an identification tag that is physically associated with a paper document generated by copier 502, the identification code information and the corresponding physical location information of the paper document is stored. Since the physical location of copy 528 when it is generated is the same as the physical location of copier 502, the physical location information is initialized to the physical location of copier 502. As indicated above, the identification code read from the identification tag physically associated with the generated photocopy and the physical location information for the corresponding paper document may be stored in a paper document tracking database.

In alternative embodiments of the present invention, other information related to the paper document might also be stored in the paper document tracking database along with the identification code information and the physical location information. For example, according to an embodiment of the present invention, the scanned image of document 526 (scanned by scanner subsystem 520) is also stored in the paper document tracking database and associated with the identification code information read from the identification tag that is physically associated with photocopy 528 generated by copier 502 for user-provided document 526. Other types of information related to the photocopy document might also be stored in the paper document tracking database.

Careful synchronization between the various subsystems of copier 502 is needed to ensure proper functioning of copier 502 according to the teachings of the present invention. Various synchronization signals known to those skilled in the art may be used to achieve this synchronization. Many other configurations of copier 502 are possible having more or fewer components than the system depicted in FIG. 5.

As described above, for each photocopy document generated by copier 502, an identification tag storing a unique identification code is physically associated with the photocopy document. Identification code information that is read from the identification tag physically associated with the photocopy and information identifying the physical location of the generated photocopy is stored in the paper document tracking database. In the manner described above, other paper document output devices may also be configured to generate paper documents according to the teachings of the present invention.

Figure 6:
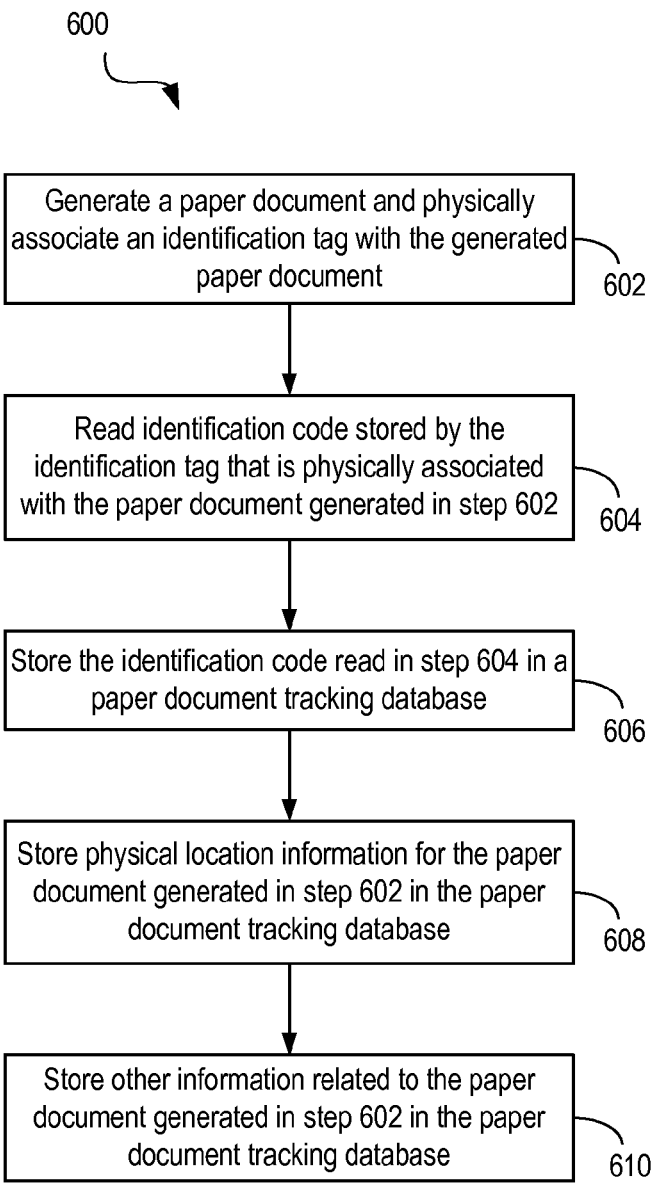
FIG. 6 is a simplified high-level flowchart depicting a method of generating a paper document according to an embodiment of the present invention.

FIG. 6 is a simplified high-level flowchart 600 depicting a method of generating a paper document according to an embodiment of the present invention. A paper document output device may perform the method. Flowchart 600 depicted in FIG. 6 is merely illustrative of an embodiment incorporating the present invention and does not limit the scope of the invention as recited in the claims. One of ordinary skill in the art would recognize variations, modifications, and alternatives.

As depicted in FIG. 6, a paper document output device generates a paper document and an identification tag is physically associated with the generated paper document (step 602). As described above, according to an embodiment of the present invention, the identification tag may be automatically (e.g., by using tagged paper, a staple with the identification tag embedded in it, ink containing the identification tag, etc.) physically associated with the paper document. In alternative embodiments, the paper document output device may dispense an identification tag (e.g., a label comprising an identification tag) and request a user to physically associate the dispensed identification tag with the paper document generated by the paper document output device.

The identification code stored by the identification tag that is physically associated with the paper document generated in step 602 is read by the paper document output device (step 604). As previously described, various different techniques may be used to read identification code information stored by the identification tag that is physically associated with the paper document generated in step 602. The type of technique used for reading information stored by the identification tag generally depends on the type of identification tag used by the paper document output device. The identification code read in step 604 is used to uniquely identify the paper document generated in step 602.

It should be understood that in alternative embodiments of the present invention, the identification code may be read from the identification tag before the identification tag is physically associated with the paper document. In these embodiments, the paper document output device may identify an identification tag to be physically associated with the paper document, read the identification code from the identified identification tag, and then physically associate the identification tag with the paper document.

The identification code read from the identification tag in step 604 is then stored in a paper document tracking database (step 606). The physical location information for the paper document generated in step 604 is also stored in the paper document tracking database (step 608). The physical location information is stored such that it is associated with the identification code information stored in the paper document tracking database in step 606. At the time when the paper document is generated by the paper document output device, the physical location of the paper document is the same as the physical location of the paper document output device. Accordingly, in step 608, the physical location information is initialized to the physical location of the paper document output device.

In specific embodiments of the present invention, other information related to the paper document may also be stored in the paper document tracking database (step 610). For example, electronic information representative of a paper document (e.g., electronic information that is used to generate the paper document) may also be stored in the paper document tracking database along with the identification code identifying the paper document. For example, a scanned image of the paper document, an electronic format (e.g., Postscript format, PDF format) that is received by the paper document output device and used to generate the paper document, etc. may be stored in the paper document tracking database.

Figure 7:
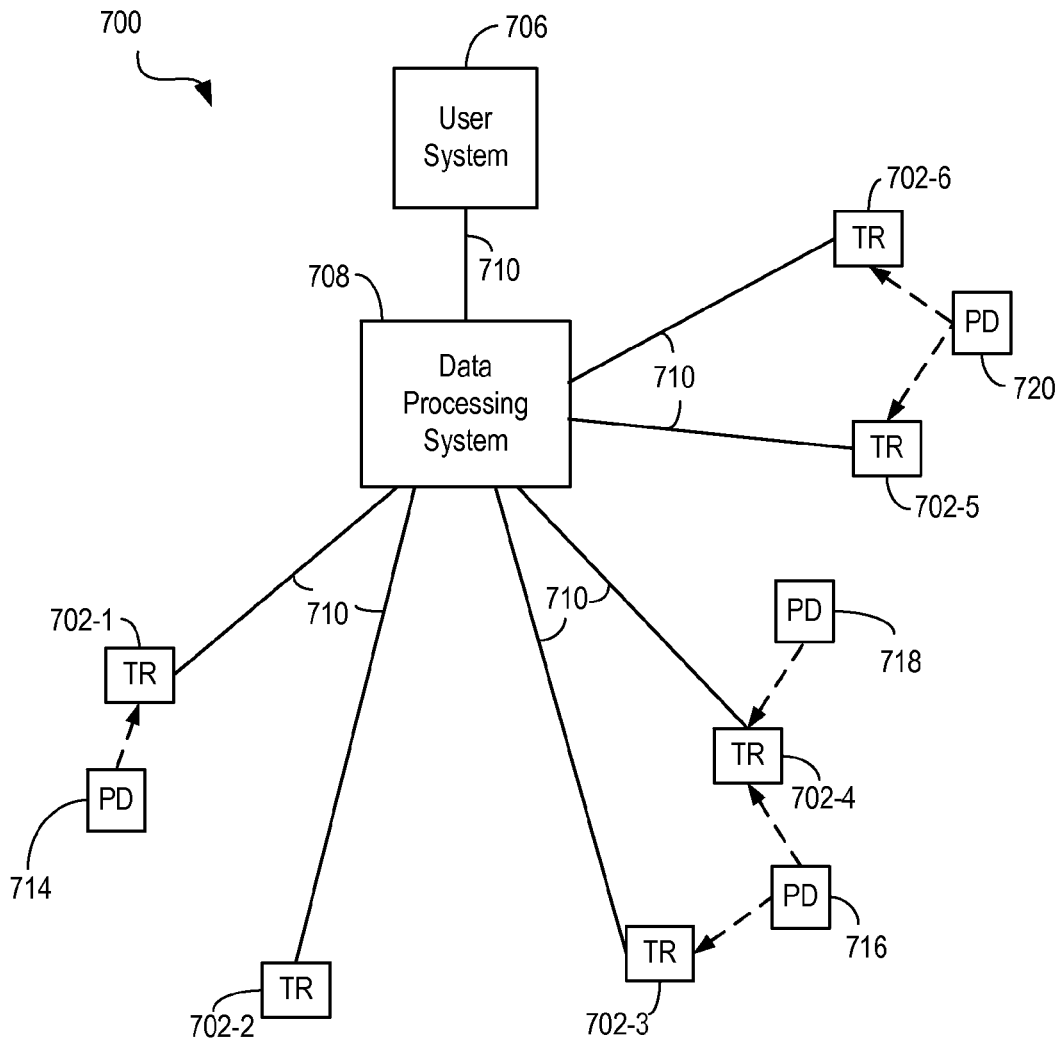
FIG. 7 is a simplified block diagram of a distributed system that may be used to track physical locations of paper documents according to an embodiment of the present invention.

According to the teachings of the present invention, the identification tags associated with the paper documents along with the information stored by the identification tags is used to determine physical locations of paper documents. FIG. 7 is a simplified block diagram of a distributed system 700 that may be used to track physical locations of paper documents according to an embodiment of the present invention. The configuration depicted in FIG. 7 is merely illustrative of an environment incorporating the present invention and does not limit the scope of the invention as recited in the claims. One of ordinary skill in the art would recognize other variations, modifications, and alternatives.

As depicted in FIG. 7, system 700 comprises a plurality of tag readers (TRs) 702, and a user system 706 coupled to a data processing system 708 via communication links 710. Communication links 710 depicted in FIG. 7 may be of various types including hardwire links, optical links, satellite or other wireless communication links, wave propagation links, or any other mechanisms for communication of information. Various communication protocols may be used to facilitate communication of information via the communication links. These communication protocols may include TCP/IP, HTTP protocols, extensible markup language (XML), wireless application protocol (WAP), protocols under development by industry standard organizations, vendor-specific protocols, customized protocols, and others.

Tag readers 702 are configured to facilitate determination of physical locations of one or more paper documents that have identification tags physically associated (either embedded or attached) with them by reading identification code information stored by the identification tags. Whether or not a particular tag reader 702 can read identification code from an identification tag physically associated with a paper document depends on the proximity of the particular tag reader to the identification tag. Since the identification tag is physically associated with a paper document, whether or not a tag reader 702 can read identification code from an identification tag depends on the proximity of the tag reader to the paper document with which the identification tag is physically associated.

If an identification tag has an on-board power supply (e.g., an on-board battery) and is capable of communicating information (including identification code information) stored in the memory of the identification tag, then a tag reader 702 can detect and read the identification code from the identification tag if the tag reader can detect the information (which could be in various formats) communicated by the identification tag (i.e., the distance from the identification tag to the tag reader is within the communication range of the identification tag and reception range of the tag reader).

If an identification tag does not have its own power supply and depends on a stimulus supplied by an external entity such as a tag reader, then a tag reader is able to read identification code information from the identification tag if the tag reader can expose the identification tag to the requisite stimulus and can read the information transmitted (or radiated) by the identification tag in response to the stimulus. For example, if a Hitachi Mu-chip is used as an identification tag, a tag reader can read the identification code from the Mu-chip if the tag reader is able to expose the Mu-chip to 2.45 GHz band microwaves and is able to read the radio waves that emanate from the irradiated Mu-chip identification tag.

The manner in which a tag reader reads the identification code from an identification tag depends on the type of tag reader and the type of identification tag used. Likewise, a tag reader's ability to detect and read identification code from an identification tag depends on the type of tag reader and the type of identification tag and the proximity of the identification tag to the tag reader. It should be understood that the identification code from a particular identification tag physically associated with a paper document may be detected and read by multiple tag readers that are proximal to the paper document.

For example, in the embodiment depicted in FIG. 7, tag reader 702-1 is able to read the identification code (and other information) from an identification tag physically associated with paper document (PD) 714. Tag readers 702-3 and 702-4 can read the identification code from the identification tag physically associated with paper document 716. Tag reader 702-4 is also able to read the identification code from an identification tag physically associated with paper document 718. Tag readers 702-5 and 702-6 can read the identification code from the identification tag physically associated with paper document 720.

If a particular tag reader is able to read the identification code from an identification tag physically associated with a particular paper document, it indicates that the particular paper document is physically located proximal to the particular tag reader. Accordingly, the physical location of the paper document can be determined from the physical location of the tag reader that is able to read the identification code. If multiple tag readers are able to read an identification code from an identification tag associated with a particular paper document, it indicates that the particular paper document is physically located in a location or zone proximal to the multiple tag readers.

Various different techniques may be used to read information from identification tags using tag readers 702. According to an embodiment of the present invention, a tag reader 702 may be configured to periodically send out a signal to interrogate and read identification code from identification tags that the tag reader can detect and read. In other embodiments, a tag reader 702 may be configured to interrogate identification tags in response to a signal received from an external system, device, or application, or in response to external stimuli. For example, a tag reader may interrogate identification tags upon receiving a signal from data processing system 708.

For each identification code information read by a tag reader 702, the tag reader may associate a timestamp with the identification code information indicating when (e.g., date and time) the tag reader read the identification code information. In addition to the identification code information, a tag reader may also be configured to read other information stored in an identification tag interrogated by the tag reader. The information read by a tag reader from an identification tag may be stored by the tag reader or may be forwarded by the tag reader to a central database or computer system (e.g., data processing system 708) that may store and/or process the information.

According to an embodiment of the present invention, information read by tag readers 702 is communicated to data processing system 708. Based upon the identification codes received from the individual tag readers and based upon the physical locations of the tag readers, data processing system 708 is able to determine the physical locations of paper documents corresponding to the identification codes received from the tag readers.

Figure 8:
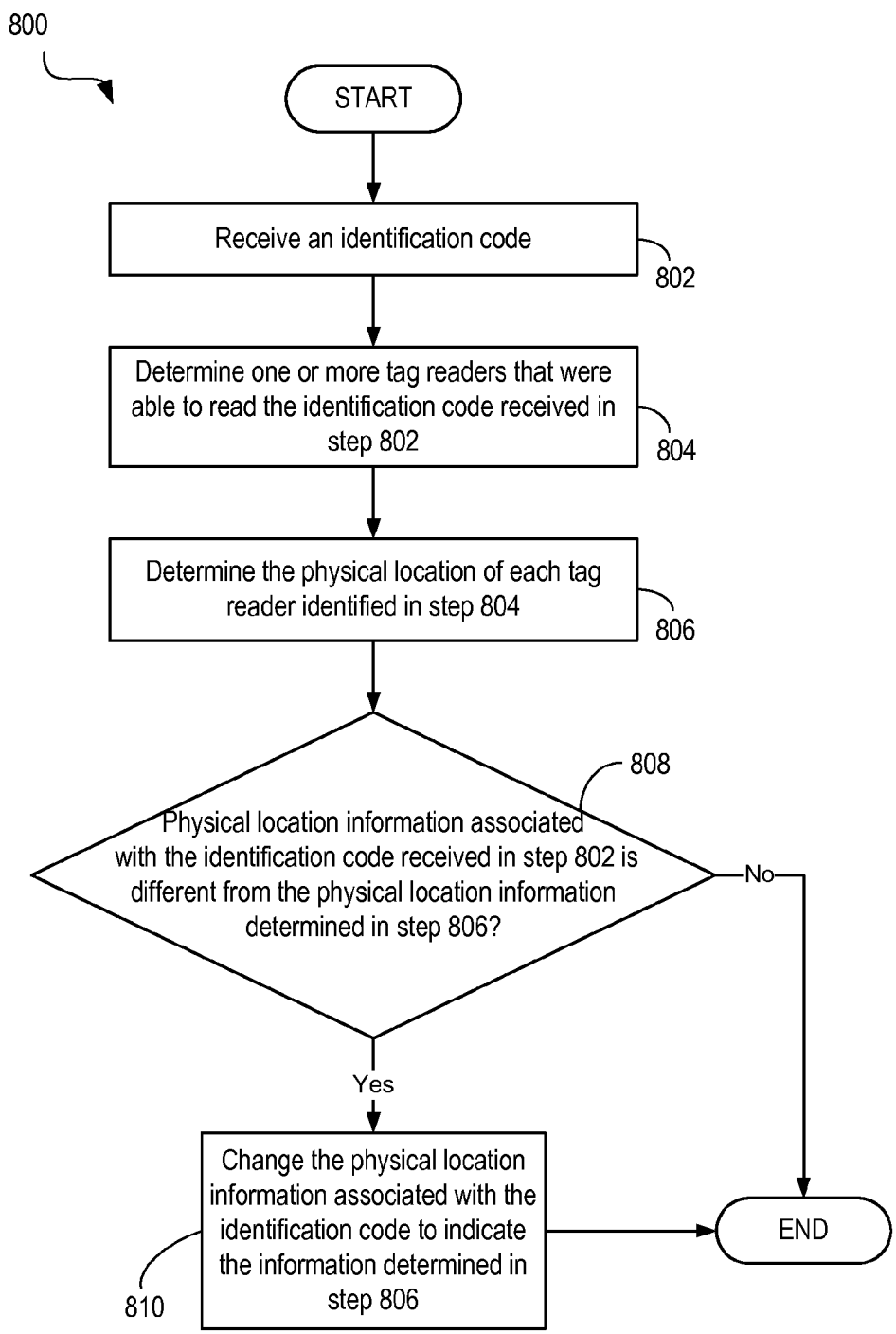
FIG. 8 is a simplified high-level flowchart depicting a method of determining the physical location of a paper document corresponding to an identification code read by a tag reader according to an embodiment of the present invention.

As described above, if a particular tag reader is able to read the identification code from an identification tag physically associated with a particular paper document, it indicates that the particular paper document is physically located proximal to the particular tag reader. The physical location of the paper document can be then determined based on the physical location of the tag reader. FIG. 8 is a simplified high-level flow-chart 800 depicting a method of determining the physical location of a paper document corresponding to an identification code read by a tag reader according to an embodiment of the present invention. The method may be performed by data processing system 708. For example, the method may be performed by software modules executed by processor(s) of data processing system 708, or by hardware modules of data processing system 708, or combinations thereof Flowchart 800 depicted in FIG. 8 is merely illustrative of an embodiment incorporating the present invention and does not limit the scope of the invention as recited in the claims. One of ordinary skill in the art would recognize variations, modifications, and alternatives.

According to an embodiment of the present invention, the processing depicted in FIG. 8 is performed for every identification code read by tag readers 702. The method is initiated when data processing system 708 receives an identification code from one or more tag readers 702 (step 802). As described above, data processing system 708 may periodically receive information regarding identification codes read by tag readers 702. In alternative embodiments, data processing system 708 may receive the information in response to a signal communicated by data processing system 708 to tag readers 702.

Data processing system 708 then determines the one or more tag readers that were able to read the identification code received in step 802 (step 804). As previously described, the identification code may be read by one or more tag readers. For example, as depicted in FIG. 7, an identification code read from an identification tag physically associated with document 716 is read by tag readers 702-3 and 702-4, whereas an identification code read from an identification tag physically associated with document 714 is only read by tag reader 702-1.

Data processing system 708 then determines the physical location of each tag reader identified in step 804 (step 806). According to an embodiment of the present invention, data processing system 708 stores or has access to information that identifies the various tag readers in distributed system 700 and the physical locations of the tag readers. For example, the information may indicate that tag reader 702-1 is located in John's office, tag reader 702-2 is located in John's briefcase, tag readers 702-3 and 702-4 are located in the conference room, tag reader 702-5 is located on Mr. Smith's office desk, tag reader 702-6 is located in Mr. Smith's in-box container in his office, and so on. According to an embodiment of the present invention, information identifying the physical locations of the tag readers is stored in a memory location (e.g., a file) accessible to data processing system 708.

In alternative embodiments, each tag reader 702 may be configured to provide information to data processing system 708 identifying the tag reader's physical location. A tag reader may communicate its physical location information to data processing system 708 along with information related to identification codes read by the tag reader.

Data processing system 708 then determines if the physical location information stored in the paper document tracking database and associated with the identification code received in step 802 is different from the physical location information determined in step 806 (step 808). If the physical location information associated with the identification code and stored in the paper document tracking database is different from the information determined in step 806, it indicates that the physical location of the paper document corresponding to the identification code has changed since the last time that information related to the identification code was stored in the paper document tracking database. In this case, data processing system 708 updates the physical location information associated with the identification code in the paper document tracking database to reflect the information determined in step 806 (step 810). A timestamp value corresponding to when the one or more tag readers read the identification code determined in step 804 might also be stored in the paper document tracking database.

If the physical location information for the identification code in the paper document tracking database is the same as the information determined in step 806, it indicates that the physical location of the paper document corresponding to the identification code has not changed since the last time that information related to the identification code was stored in the paper document tracking database. In this case, the physical location stored in the paper document tracking database corresponding to the identification code need not be changed. A timestamp value corresponding to when the one or more tag readers read the identification code determined in step 804 might be stored in the paper document tracking database.

In alternative embodiments of the present invention, if it is determined in step 808 that the physical location of the document has changed, instead of overwriting the previous physical location information associated with the identification code identifying the document per step 810, information identifying the new physical location of the document determined in step 806 may be appended to the physical location information associated with the identification code information. In this embodiment, for each identification code, the physical location information associated with an identification code comprises information identifying the various physical locations of the paper document over time. The physical tracking information associated with the identification code thus represents a log of the various physical locations where the paper document was detected. Each physical location entry in the log may be time stamped indicating when the document was detected to be in that location.

In the manner described above, the information stored in the paper document tracking database is continuously updated to reflect the latest physical location of a paper document that has an identification tag physically associated with it. A user may then query the paper document tracking database to determine the physical location of any specific paper document identified by an identification code. A user may also query the paper document tracking database to determine a log of the various physical locations where the paper document has been located.

According to an embodiment of the present invention, a user may use user system 706 depicted in FIG. 7 to query information stored in the paper document tracking database. A user interface may be provided on user system 706 that enables the user to configure a query to determine physical locations of one or more user-specified documents and to output results of the query. The documents may be specified using identification codes associated with the documents, or using other techniques. User system 706 may be a personal computer, a portable computer, a workstation, a computer terminal, a network computer, a kiosk, a personal digital assistant (PDA), a communication device such as a cell phone, or any other data processing system.

Techniques for Determining Electronic Document Information for Paper Documents

Certain embodiments of the present invention provide techniques for determining electronic document information for a paper document. The electronic document information determined for a paper document may include information identifying an electronic document corresponding to the paper document. The electronic document information may also include information identifying a location where the electronic document is stored or a pointer or reference to the electronic document. According to an embodiment of the present invention, the electronic document information determined for a paper document is stored along with identification code information read from an identification tag that is physically associated with the paper document. According to another embodiment of the present invention, the electronic document information for a paper document is stored in an identification tag that is physically associated with the paper document or physically associated with another paper document generated based upon the paper document.

For purposes of this invention, the term "paper document" is intended to refer to any document comprising one or more pages of any tangible medium on which information can be printed, written, drawn, imprinted, embossed, etc. For example, a paper document may refer to a document printed by a printer, a document output by a copier or scanner, a document output by a facsimile machine, a photograph, a book, a single page of paper, a document comprising a plurality of papers, and the like.

For purposes of this invention, the term "electronic document" is intended to refer to information stored in an electronic or digital form. Examples of electronic documents include files, documents created using application programs such as word processors, email programs, image editors, etc., scanned images of paper documents, documents stored in various formats such as PDF, Postscript, etc., and other types of documents stored in electronic form.

Figure 9A:
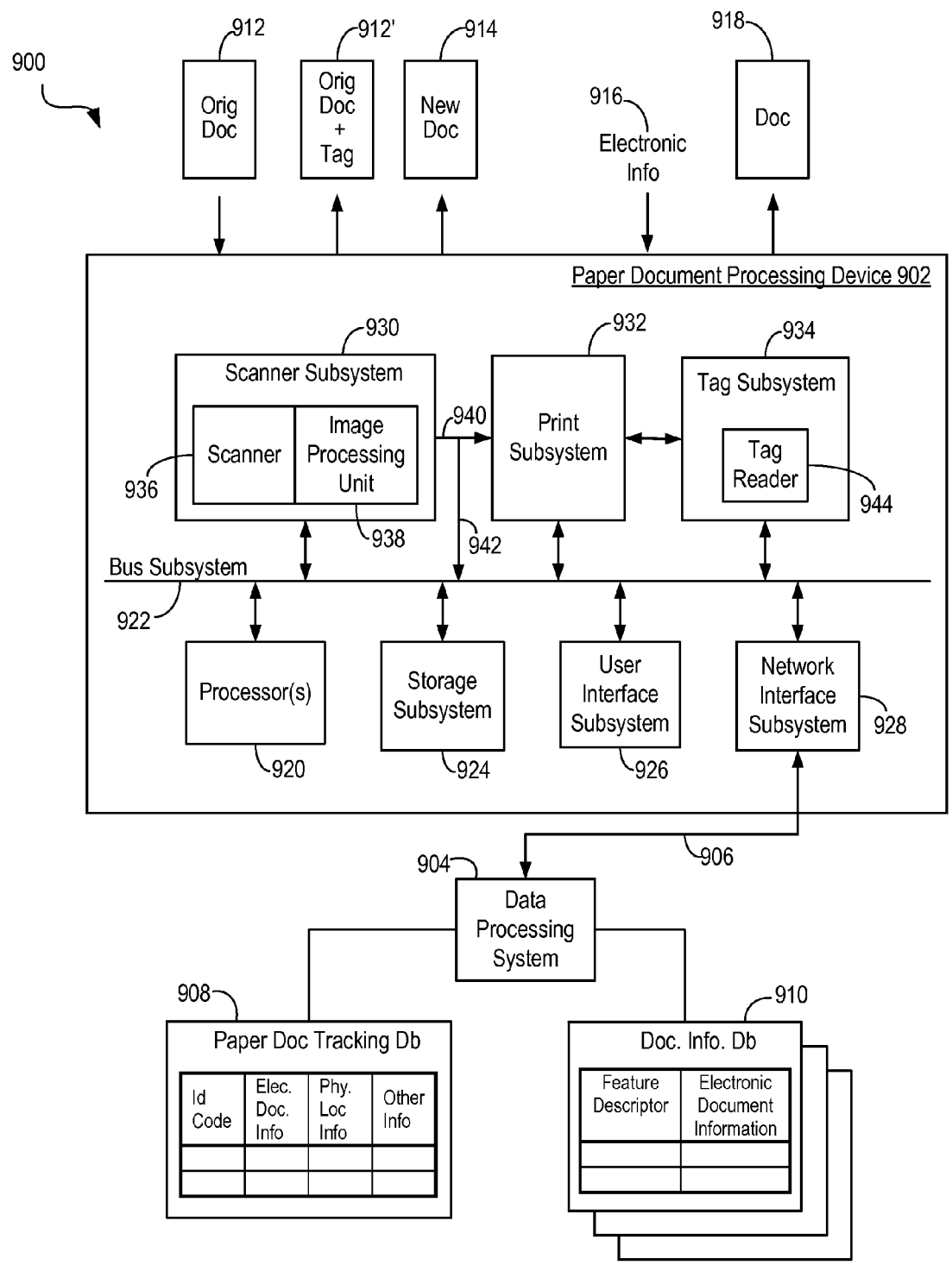
FIG. 9A is a simplified block diagram of a system that may incorporate an embodiment of the present invention.

FIG. 9A is a simplified block diagram of a system 900 that may incorporate an embodiment of the present invention. As depicted in FIG. 9A, system 900 comprises a paper document processing device 902 coupled to a data processing system 904 via communication links 906. Data processing system 904 is coupled to a paper document tracking database 908 and to one or more document information databases 910. It should be understood that the configuration depicted in FIG. 9A is merely illustrative of an embodiment incorporating the present invention and does not limit the scope of the invention as recited in the claims. One of ordinary skill in the art would recognize other variations, modifications, and alternatives.

Communication links 906 depicted in FIG. 9A may be of various types including hardwire links, optical links, satellite or other wireless communication links, wave propagation links, or any other mechanisms for communication of information. Various communication protocols may be used to facilitate communication of information via the communication links. These communication protocols may include TCP/IP, HTTP protocols, extensible markup language (XML), wireless application protocol (WAP), protocols under development by industry standard organizations, vendor-specific protocols, customized protocols, and others.

Communication links 906 may traverse one or more communication networks. These communication networks may include a LAN, a wide area network (WAN), a metropolitan area network (MAN), a wireless network, an Intranet, the Internet, a private network, a public network, a switched network, an optical network, or any other suitable communication network.

Paper document processing device 902 is configured to physically associate identification tags with paper documents. Paper document processing device 902, in cooperation with data processing system 904, also facilitates identification of electronic document information for a paper document. The electronic document information may include information identifying an electronic document corresponding to the paper document and information identifying a location where the electronic document is stored or from where the electronic document can be accessed or a pointer or reference to the electronic document. In the embodiment depicted in FIG. 9A, paper document processing device 902 provides information to data processing system 904 that is used by data processing system 904 to determine electronic document information for a paper document processed by paper document processing device 902. Paper document processing device 902 receives the electronic document information from data processing system 904 and may store the electronic document information or a portion thereof on the identification tag that is physically associated with the paper document. Paper document processing device 902 may be embodied as a printer, scanner, copier, facsimile machine, camera that are capable of printing photos, and the like.

According to an embodiment of the present invention, paper document processing device 902 is configured to receive a paper document 912 and physically associate an identification tag with document 912 to produce document 912'. For purposes of clarity, paper document 912 will be referred to as the "original paper document". Accordingly, in this embodiment, paper document 912' represents the original paper document with an identification tag physically associated with it. Original paper document 912 may be a single-page or a multi-page paper document.

In other embodiments, paper document processing device 902 may be configured to generate a new paper document 914 based upon original paper document 912 and physically associate an identification tag with new document 914. For example, if paper document processing device 902 is configured to function as a copier, paper document processing device 902 may generate a photocopy 914 for paper document 912 and physically associate an identification tag with photocopy 914.

In yet other embodiments, paper document processing device 902 may be configured to receive electronic information 916 and print the electronic information on a paper medium to generate paper document 918. In this embodiment, paper document processing device 902 is configured to physically associate an identification tag with paper document 918. For example, paper document processing device 902 may be configured to function as a printer or a facsimile machine. In a printer mode, paper document processing device 902 receives electronic information 916 and generates a printout 918 based upon the information. In a facsimile machine mode, paper document processing device 902 receives facsimile information 916 and generates a facsimile paper document 918. An identification tag is attached to the printout or facsimile paper document.

As shown in FIG. 9A, paper document processing device 902 includes a processor 920 that communicates with a number of peripheral subsystems via a bus subsystem 922. These peripheral subsystems may include a storage subsystem 924, a user interface subsystem 926, a network interface subsystem 928, a scanner subsystem 930, a print subsystem 932, and a tag subsystem 934.

Bus subsystem 922 provides a mechanism for letting the various components and subsystems of paper document processing device 902 communicate with each other as intended. Although bus subsystem 922 is shown schematically as a single bus, alternative embodiments of the bus subsystem may utilize multiple buses.

User interface subsystem 926 allows user interaction with paper document processing device 902. A user may be a human user, a device, a process, another computer, an application program, and the like. User interface subsystem 926 may be implemented using a touch pad, a touch screen, mechanical buttons, and the like. For example, when paper document processing device 902 is configured to function as a copier, interface 926 allows the user to select options for generating a photocopy 914 from original document 912. For example, interface 926 may allow the user to select the paper size to be used for generating the photocopy, the copy darkness, the copy contrast, number of copies to be produced, magnification/reduction ratio, and other like options known to those skilled in the art. Interface 926 may also provide a "Copy/Start" key that allows the user to initiate the copying function. Upon selection of the "Start/Copy" key, paper document processing device 902 prints a copy 914 (or photocopy) of original document 912.

According to an embodiment of the present invention, interface 926 allows a user to select if an identification tag is to be physically associated with documents 912', 914, or 918 generated by paper document processing device 902. For example, before photocopying an original document 912, interface 926 may prompt the user to select whether an identification tag is to be physically associated with the photocopy. An identification tag is then physically associated with the photocopy paper document only if the user indicates that an identification tag is to be physically associated with the photocopy.

In an alternative embodiment of the present invention, an identification tag may be physically associated with documents 912', 914, or 918 without prompting the user or without receiving the user's permission. For example, when functioning in a copier mode, activation of the "Copy/Start" key by the user is sufficient to initiate the photocopying function, cause paper document processing device 902 to physically associate an identification tag to the generated photocopy paper document, perform operations to determine electronic document information for the paper document, and store the electronic document information or a portion thereof on the identification tag that is physically associated with the generated paper document.

According to an embodiment of the present invention, selection of the an operation key such as "Copy/Start" key represents a single user command that is interpreted by paper document processing device 902 to request both performance of the operation (e.g., copying), physically associating an identification tag with the generated photocopy, performing operations to determine electronic document information for the paper document, and storing the electronic document information or a portion thereof on the identification tag that is physically associated with the generated paper document. In this embodiment, the user may not be aware that an identification tag has been applied to the paper document (912', 914, or 918) produced by paper document processing device 902 and that electronic document information corresponding to the paper document has been stored on the identification tag.

User interface subsystem 926 also serves as an interface for outputting information to the user. For example, information related to the status of paper document processing device 902 or information related to operations performed by paper document processing device 902 might be output to the user via interface 926.

Network interface 928 provides an interface to other computer systems, networks, and devices. As depicted in FIG. 9A, network interface subsystem 928 enables paper document processing device 902 to communicate and exchange information with data processing system 904. Embodiments of network interface subsystem 928 include an Ethernet card, a modem (telephone, satellite, cable, ISDN, etc.), (asynchronous) digital subscriber line (DSL) units, and the like. Network interface system 928 facilitates transfer of information to and from paper document processing device 902 in an appropriate format.

Processor 920 performs or controls the overall functioning of paper document processing device 902. For example, processor 920 may execute a program that controls the functions of the various subsystems of paper document processing device 902. These functions may include physically associating identification tags with documents 912', 914, or 918, facilitating identification of electronic document information for paper documents, and storing the electronic document information or a portion thereof or other information on the identification tags that are physically associated with paper documents 912', 914, or 918.

Storage subsystem 924 stores the basic programming and data constructs that provide the functionality of paper document processing device 902. For example, according to an embodiment of the present invention, software modules and control programs implementing the functionality of paper document processing device 902 may be stored in storage subsystem 924. Processor 920 may execute these software modules. Storage subsystem 924 may also provide a repository or database for storing information according to the teachings of the present invention.

Scanner subsystem 930 includes a scanner 936 and an image-processing unit 938. Scanner 936 is configured to capture an electronic representation (e.g., a scanned image) of original paper document 912. According to an embodiment of the present invention, the scanned image is transmitted to image processing unit 938 that operates to remove distortion inherent in the scanning process. The output of image-processing unit 938 is a scanned image of original paper document 912 with the distortion removed. The scanned image may then be forwarded to print subsystem 932 for further processing via video bus 940. The scanned image may be used to generate document 914.

According to an embodiment of the present invention, an image data tap 942 provides processor 920 with access to scanned image data transferred over video bus 940. In alternative embodiments of the present invention, the image scanned by scanner 936 may be provided to processor 920 by scanner subsystem 930.

According to an embodiment of the present invention, the electronic representation of original paper document 912 (e.g., the scanned image of original document 912) captured by paper document processing device 902 is communicated to data processing system 904 for further processing. Data processing system 904 uses the electronic representation of original paper document 912 received from paper document processing device 902 to determine electronic document information for the paper document. The electronic document information or a portion thereof is then communicated to paper document processing device 902 from data processing system 904.

Print subsystem 932 is used in embodiments where paper document processing device 902 is configured to generate a new paper document, for example, documents 914 or 918. For example, print subsystem 932 is used in embodiments where paper document processing device 902 is configured to operate as a copier, printer, facsimile machine, etc. Print subsystem 932 operates in accordance with well-known laser xerography principles. In a copier mode, print subsystem 932 is configured to receive scanned information from scanner subsystem 930 and produce a paper document photocopy 914 of original document 912. In a printer or facsimile machine mode, print subsystem 932 is configured to generate a paper document printout or facsimile document based on electronic information 916 or based upon scanned information from scanner subsystem 930. Print subsystem 932 operates in synchrony with tag subsystem 934 to ensure that an identification tag is appropriately physically associated with documents 912', 914, or 918.

Tag subsystem 934 is configured to physically associate identification tags with documents 912', 914, or 918 generated by paper document processing device 902. Various devices known to those skilled in the art may be used as identification tags. According to an embodiment of the present invention, each identification tag device includes an on-device memory that is capable of storing information.

According to an embodiment of the present invention, each identification tag stores information that can be used to uniquely identify the paper document with which the identification tag is physically associated. For example, an identification tag may store an identification code that may be used to uniquely identify a paper document with which the identification tag is physically associated. It should be understood that other types of information that can be used to identify documents might also be stored in an identification tag in alternative embodiments of the present invention.

Depending upon the type of identification tag used, the identification code information may be stored in the memory of the identification tag when the tag is manufactured, when the tag is activated, or at some later time using software or hardware techniques. For example, paper document processing device 902 may be configured to write a unique identification code in the memory of an identification tag that is selected to be physically associated with a paper document generated by paper document processing device 902.

According to an embodiment of the present invention, radio frequency identification devices (RFIDs) are used as identification tags. For example, the Mu-chip manufactured by Hitachi, Ltd. may be used as an identification tag. The Mu-chip is a radio recognition IC chip that measures 0.4-mm square and is 60 microns thick in its present embodiment. Due to its reduced size, the Mu-chip can be embedded in paper. The Mu-chip comprises an on-chip memory (presently a 128-bit ROM) that can be programmed to store information (e.g., an identification code, electronic document information).

According to an embodiment of the present invention, tag subsystem 934 is configured to read information (e.g., identification code) from an identification tag that is physically associated with a paper document. In order to facilitate reading of the identification code from the identification tag, one or more tag readers 944 may be incorporated into tag subsystem 934. If an identification tag is physically associated with original document 912, the tag readers of tag subsystem 934 may read the information stored from the identification tag physically associated with the original document. The tag readers are also configured to read information from identification tags that are either physically associated with or selected to be physically associated with documents 912', 914, or 918. The identification code information read by paper document processing device 902 from an identification tag is forwarded to data processing system 904 for further processing.

The type of tag reader used and the technique used by the tag reader for reading the information stored on an identification tag depends on the type of identification tags. According to an embodiment of the present invention, a tag reader may read information from an identification tag by scanning the identification tag. In other embodiments, a tag reader may read the information by receiving the information from the identification tag. A tag reader may receive the information from an identification tag in response to an external stimulus (e.g., electromagnetic energy) or signal provided to the identification tag. The external stimulus or signal may be provided by the tag reader or by some other device or application. If the identification tag is self-powered, the identification tag may be configured to communicate the information stored by the identification tag to the tag reader. A tag reader may read the information stored by a tag reader in various forms including electromagnetic waves, electronic signals, acoustic signals, etc.

For example, in its present embodiment, information stored by a Hitachi Mu-chip can be read by exposing the Mu-chip to 2.45 GHz band microwaves. The Mu-chip uses the microwave energy as a power source and communicates the information stored in the on-chip memory in the form of radio waves that can be detected and read by a tag reader. In alternative embodiments, the Mu-chip may also include an on-chip antenna to increase the communication distance range. In yet other embodiments, a power source may be provided on the Mu-chip and the Mu-chip may be programmed to communicate the information stored by the Mu-chip to a tag reader. Accordingly, if a Hitachi Mu-chip is used as an identification tag, tag reader 944 included in tag subsystem 934 may be constructed to expose the Mu-chip to 2.45 GHz band of microwaves and to detect and read radio waves emanating from the Mu-chip. Various other types of tag readers that are capable of detecting electromagnetic, optical, acoustical, or other signals may be used in alternative embodiments of the present invention using other forms of identification tags.

Paper document processing device 902 may use various different techniques to physically associate an identification tag with a paper document (document 912', 914, or 918) generated by paper document processing device 902. The identification tag may be permanently or temporarily attached to a paper document or a page of the paper document. The tag may be attached to the paper document using clips, staples, adhesives, ties, strings, rubber bands, labels with identification tags, and the like. The identification tag may be embedded in a page of the paper document. An identification tag may also be incorporated into an object such as a label, a staple, etc. that is attached to the paper document.

According to one technique, depending on the size of the identification tag, the identification tag is embedded in a page of the paper document. For example, a Mu-chip, due to its reduced size, can be embedded in a page of the paper document. A paper page that has an identification tag embedded in it may be referred to as "tagged paper". Accordingly, in an embodiment using Hitachi Mu-chips as identification tags, paper document processing device 902 may physically associate an identification tag with a paper document by using at least one tagged paper to generate the paper document. According to an embodiment of the present invention, if the paper document processing device 902 has access to tagged paper, paper document processing device 902 may use one or more of the tagged papers to generate the paper document. This technique may be used when paper document processing device 902 generates a new paper document (either paper document 914 or 918). In this embodiment, tag subsystem 934 in conjunction with print subsystem 932 ensures that at least one tagged page is used to generate paper document 914 or 918. If the generated new paper document consists of multiple pages, then normal paper pages (i.e., paper pages without the embedded identification tag) may be used for other pages of the document. The selection of one or more tagged papers for generating paper documents 914 or 918 may be performed by tag subsystem 924, by print subsystem 922, or by the two in conjunction.

An identification tag may also be physically associated with a paper document by physically applying or attaching the identification tag to the paper document. If the size of the identification tag permits, the identification tag may be attached to the paper document such that it is not directly visible to the unaided observer or user of the paper document. For example, the identification tag may be embedded or mounted on a staple, and paper document processing device 902 may attach the staple to the paper document. Such a technique may be used to generate document 912' by applying an identification tag to original document 912. Such a technique may also be used to generate documents 914 or 918.

According to an embodiment of the present invention, an identification tag may be attached to a paper document by mixing the identification tag in the ink that is printed on one or more pages of the paper document. Such a technique may be used when paper document processing device 902 generates a new document (i.e., document 914 or 918). An identification tag may also be physically associated with a paper document generated by paper document processing device 902 using an adhesive, a clip, or other like mechanism.

In alternative embodiments, paper document processing device 902 may dispense a sticker or label comprising an identification tag. The identification tag may be physically associated with a paper document (either document 912', 914, or 918) generated by paper document processing device 902 by applying the sticker or label to the paper document. For example, paper document processing device 902 may dispense a label comprising an identification tag and a user may be requested to apply the dispensed label to a paper document. For example, the label may be applied to original document 912 to generate document 912'. Various other techniques may also be used to physically associate an identification tag with a paper document.

As indicated above, according to an embodiment of the present invention, each identification tag stores identification code information that is used to uniquely identify the paper document with which the identification tag is physically associated. According to an embodiment of the present invention, paper document processing device 902 may be configured to store the identification code information in an identification tag. Paper document processing device 902 may also be configured to store electronic document information or a portion thereof in an identification tag that is physically associated with a paper document. In the embodiment depicted in FIG. 9A, paper document processing device 902 receives the electronic document information from data processing system 904. The electronic document information may include information identifying an electronic document for the paper document, information identifying a storage location of the electronic document or a pointer or reference to the electronic document.

In addition to identification code information and electronic document information, other type of information related to a paper document may also be stored in an identification tag that is physically associated with the paper document. For example, the information stored in an identification tag may include an electronic representation of the contents of the paper document (e.g., a scanned image of the paper document, a Postscript format file or Portable Document Format (PDF) or image format or other file format, etc.), information identifying the author of the paper document, the date when the paper document was created, the number of pages in the paper document, and other like information.

Other information that can be stored in an identification tag is described in U.S. application Ser. Nos. 10/235,035, 10/235,032, 10/235,028, 10/235,030, and 10/234,414, the entire disclosures of which are herein incorporated by reference for all purposes. As described in U.S. application Ser. No. 10/235,035, the information stored in an identification tag may be used to track the physical location of the paper document with which the identification tag is physically associated.

The various subsystems of paper document processing device 902 function in synchrony to ensure proper functioning of paper document processing device 902. Various synchronization signals known to those skilled in the art may be used to achieve this synchronization. It should be understood that various other configurations of paper document processing device 902 are possible having more or fewer components than the system depicted in FIG. 9A.

Data processing system 904 depicted in FIG. 9A is configured to determine electronic document information for a paper document based upon information related to the paper document received from paper document processing device 902 and based upon information stored in one or more document information databases 910. Data processing system 904 may be any computer system known to those skilled in the art.

As indicated above, for a paper document processed by paper document processing device 902, data processing system 904 receives, from paper document processing device 902, identification code information used to identify the paper document and an electronic representation (e.g., a scanned image) of the paper document captured by paper document processing device 902. According to an embodiment of the present invention, data processing system 904 extracts a feature descriptor from the scanned image received from paper document processing device 902. Based upon the feature descriptor determined from the electronic representation of the paper document and based upon information stored in document information databases 910, data processing system 904 determines electronic document information for the paper document. Further details related to processing performed by data processing system 904 for determining electronic document information for a paper document are described below.

A feature descriptor extracted from an electronic representation of a paper document represents information extracted from electronic representation (e.g., a scanned image). The feature descriptor can be used to uniquely identify the document. The extracted feature descriptor can be matched to other feature descriptors if the feature descriptors are consistently extracted from a similarly located section (e.g., a small rectangular patch such as a 1 inch by 1 inch patch) of the scanned image. If feature descriptors are extracted from consistent portions of the electronic representations (e.g., a scanned image) of paper documents, then if two feature descriptors match then there is a high likelihood that the scanned images from which the feature descriptors were extracted also match. Alternatively, if two feature descriptors do not match, then there is a high likelihood that the scanned images used for extracting the feature descriptors do not match, which in turn implies that the documents corresponding to the scanned images are different. One technique used by data processing system 904 for extracting a feature descriptor from an electronic representation of a paper document is described below. Various other feature extraction techniques known to those skilled in the art may also be used by data processing system 904. For example, various feature extraction techniques described in U.S. Pat. No. 6,104,834 may also be used by the present invention. The entire contents of U.S. Pat. No. 6,104,834 are incorporated herein by reference for all purposes.

According to an embodiment of the present invention, the electronic document information determined by data processing system 904 is communicated to paper document processing device 902. Paper document processing device 902 may then store the electronic document information or a portion thereof in the identification tag that is physically associated with the paper document.

According to an embodiment of the present invention, each document information database 910 stores feature descriptors that have been previously determined for a plurality of documents. For each feature descriptor, electronic document information corresponding to the feature descriptor is also stored. As depicted in FIG. 9A, the information may be stored in the form of a table wherein each row of the table stores information related to a particular feature descriptor. As shown in FIG. 9A, each row stores information identifying a feature descriptor and electronic document information corresponding to the feature descriptor.

The electronic document information may comprise information identifying an electronic document and a storage location for the electronic document represented by the feature descriptor (or a pointer of reference to the electronic document). For example, electronic document information for a particular feature descriptor may identify a uniform resource identifier or locator (URI or URL) pointing to an electronic document corresponding to the particular feature descriptor, a file corresponding to the particular feature descriptor and a directory location where the file is stored, and other like information. According to an embodiment of the present invention, the information in a document information database 910 is indexed by the feature descriptors information. Accordingly, for a particular feature descriptor extracted by data processing system 904 for a particular paper document processed by paper document processing device 902, data processing system 904 may use the feature descriptor to search document information databases 910 to find one or more matching feature descriptors.

Data processing system 904 is also configured to store information received from paper document processing device 902 and the electronic document information determined by data processing system 904. According to an embodiment of the present invention, for each identification code for a paper document received from paper document processing device 902, data processing system 904 stores the identification code information and the corresponding electronic document information determined from the electronic representation corresponding to the paper document identified by the identification code. The electronic document information determined for a document is associated with the identification code corresponding to the document and stored in a manner such that the electronic document information for a particular paper document can be determined given the identification code for the paper document.

Other information received by data processing system 904 from paper document processing device 902 for the particular identification code may also be stored such that the other information can be retrieved given the identification code information. For example, as described in U.S. patent application Ser. No. 10/235,035, information identifying physical locations of paper documents may also be stored. Other information related to the paper document that is received by data processing system 904 from paper document processing device 902 such as an electronic representation of the paper document may also be stored and associated with a particular identification code.

According to an embodiment of the present invention, the identification code information, the electronic document information, and other information is stored in paper document tracking database 908. Paper document tracking database 908 may be indexed by the identification code information. As depicted in FIG. 9A, paper document tracking database 908 may be implemented as a table wherein each row of the table stores information related to a particular identification code. As shown in FIG. 9A, each row stores information identifying an identification code, electronic document information determined by data processing system 904 for a paper document corresponding to the identification code, physical location information for the paper document identified by the identification code, and other information related to the paper document identified by the identification code.

Figure 9B:
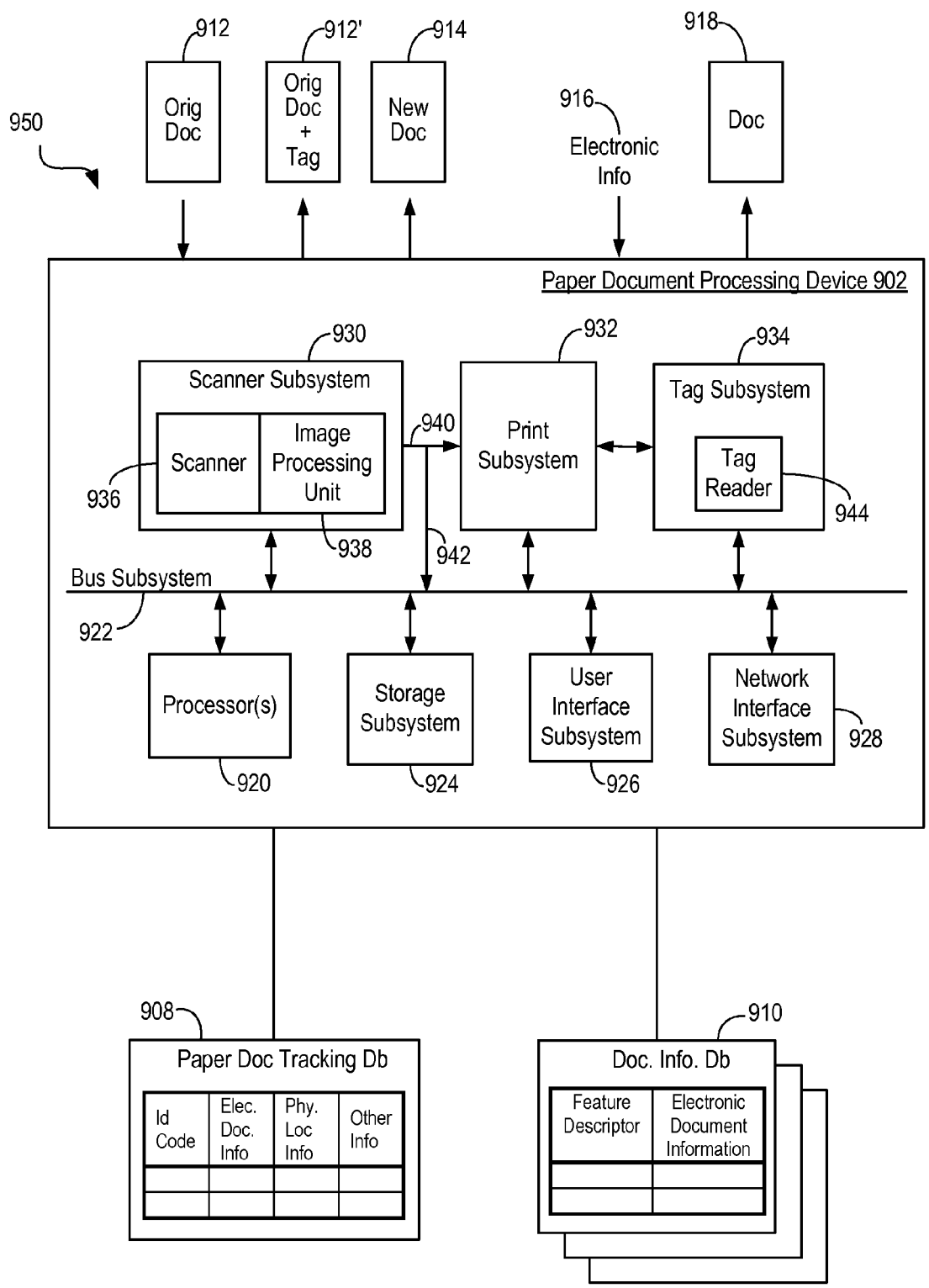
FIG. 9B is a simplified block diagram of another system that may incorporate an embodiment of the present invention.

FIG. 9B is a simplified block diagram of another system 950 that may incorporate an embodiment of the present invention. The embodiment depicted in FIG. 9B is similar to the embodiment depicted in FIG. 9A with data processing system 904 removed. In the embodiment depicted in FIG. 9B, paper document processing device 902 is configured to perform the functions that were performed by data processing system 904 depicted in FIG. 9A. It should be understood that the configuration depicted in FIG. 9B is merely illustrative of an embodiment incorporating the present invention and does not limit the scope of the invention as recited in the claims. One of ordinary skill in the art would recognize other variations, modifications, and alternatives.

Figure 10:
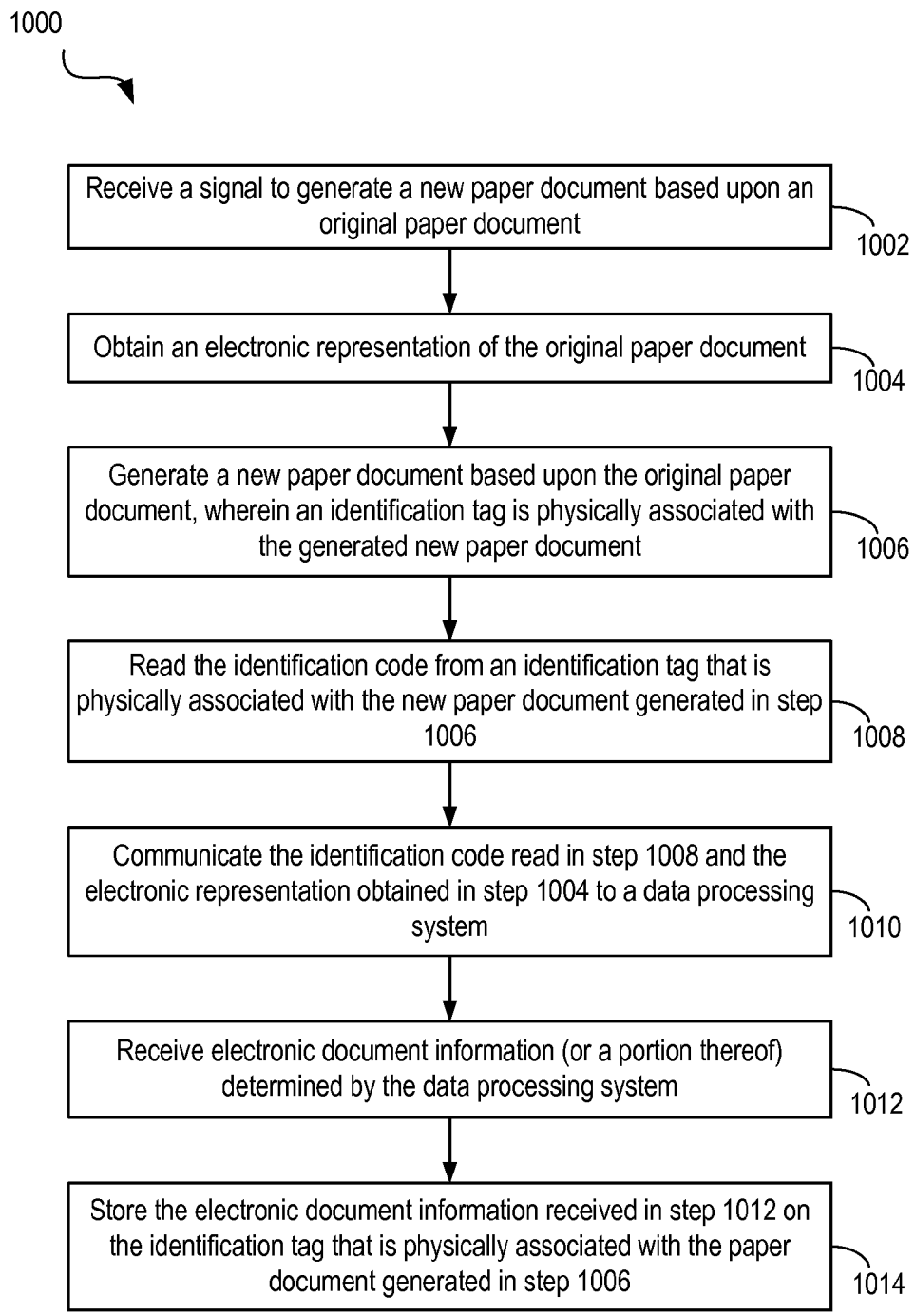
FIG. 10 is a simplified high-level flowchart depicting a method performed by a paper document processing device for generating a paper document according to an embodiment of the present invention.

FIG. 10 is a simplified high-level flowchart 1000 depicting a method performed by paper document processing device 902 for generating a paper document (either document 912', 914, or 918) according to an embodiment of the present invention. The flowchart depicted in FIG. 10 assumes that a paper document processing device 902 is coupled to a data processing system 904 (similar to the embodiment shown in FIG. 9A). However, it should be understood that the general processing depicted in FIG. 10 may also be applied to other embodiments of the present invention. Further, flowchart 1000 depicted in FIG. 10 assumes that a new paper document 914 is to be generated based upon original paper document 912. It should however be understood that the processing depicted in FIG. 10 may also be applied to generate documents 912' or 918. Accordingly, flowchart 1000 depicted in FIG. 10 is merely illustrative of an embodiment incorporating the present invention and does not limit the scope of the invention as recited in the claims. One of ordinary skill in the art would recognize variations, modifications, and alternatives. The processing depicted in FIG. 10 may be performed by software modules executed by a processor of paper document processing device 902, by hardware modules of paper document processing device 902, or a combination thereof.

As depicted in FIG. 10, processing is initiated when paper document processing device 902 receives a signal to generate a new paper document based upon an original document 912 provided to paper document processing device 902 (step 1002). The signal may be received from various sources. For example, if paper document processing device 902 is configured to function as a copier, the signal may be received when a user selects a "Copy/Start" key provided by the user interface of paper document processing device 902. The signal may also be received from various applications and devices.

Paper document processing device 902 then obtains an electronic representation of the original paper document (step 1004). According to an embodiment of the present invention, paper document processing device 902 captures a scanned image of the original paper document in step 1004. As described above, scanner subsystem 930 of paper document processing device 902 may be configured to capture and generate a scanned image of the original paper document.

Paper document processing device 902 then generates a new paper document based upon the original paper document and an identification tag is physically associated with the generated new paper document (step 1006). As described above, various techniques may be used to physically associate an identification tag with the new generated paper document. According to an embodiment of the present invention, the identification tag may be automatically physically associated with the paper document, for example, by using tagged paper to generate the new paper document, applying an object such as a staple with the identification tag embedded in it to the new generated paper document, using ink containing the identification tag to print the paper document, etc. In alternative embodiments, paper document processing device 902 may dispense an identification tag (e.g., a label comprising an identification tag) and request a user to physically associate the dispensed identification tag with the new paper document generated by paper document processing device 902.

Paper document processing device 902 then reads the identification code stored by the identification tag that is physically associated with the new paper document generated in step 1006 (step 1008). Tag readers 944 of tag subsystem 934 may be used to read the identification code information from the identification tag. As previously described, various different techniques may be used to read identification code information stored by the identification tag. The type of technique used for reading information stored by the identification tag generally depends on the type of identification tag used by the paper document output device. The identification code read in step 1008 is used to uniquely identify the paper document generated in step 1006.

The identification code read in step 1008 and the electronic representation of the original paper document obtained in step 1004 is then communicated to data processing system 904 for further processing (step 1010). Other information related to the new paper document may also be communicated to data processing system 904. For example, information identifying the physical location of the new paper document may be communicated to data processing system 904.

Paper document processing device 902 then receives electronic document information (or a portion thereof) from data processing system 904 (step 1012). According to an embodiment of the present invention, the electronic document information is determined by data processing system 904 based upon the electronic representation communicated to data processing system 904 in step 1010.

Paper document processing device 902 then stores the electronic document information (or a portion thereof) received in step 1012 on the identification tag that is physically associated with the new paper document generated in step 1006 (step 1014). Various techniques known to those skilled in the art may be used for storing the information in the memory of the identification tag. Steps 1012 and 1014 may not be performed in certain embodiments of the present invention.

Figure 11:
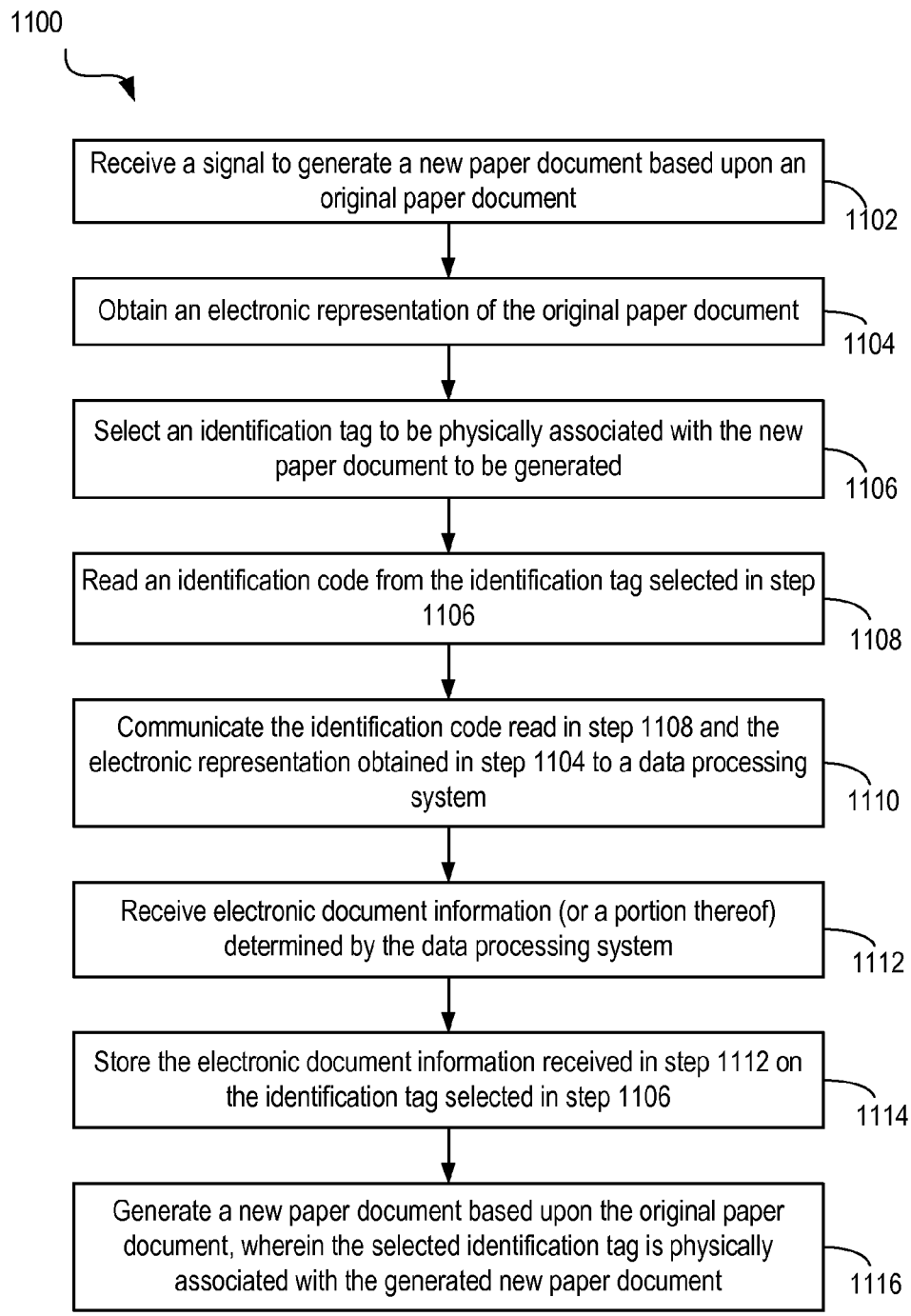
FIG. 11 is a simplified high-level flowchart depicting a method performed by a paper document processing device for generating a paper document according to another embodiment of the present invention.

FIG. 11 is a simplified high-level flowchart 1100 depicting a method performed by paper document processing device 902 for generating a paper document (either document 912', 914, or 918) according to another embodiment of the present invention. The flowchart depicted in FIG. 11 assumes that a paper document processing device 902 is coupled to a data processing system 904 (similar to the embodiment shown in FIG. 9A). However, it should be understood that the general processing depicted in FIG. 11 may also be applied to other embodiments of the present invention. Further, flowchart 1100 depicted in FIG. 11 assumes that a new paper document 914 is to be generated based upon original paper document 912. It should however be understood that the processing depicted in FIG. 11 may also be applied to generate documents 912' or 918. Accordingly, flowchart 1100 depicted in FIG. 11 is merely illustrative of an embodiment incorporating the present invention and does not limit the scope of the invention as recited in the claims. One of ordinary skill in the art would recognize variations, modifications, and alternatives. The processing depicted in FIG. 11 may be performed by software modules executed by a processor of paper document processing device 902, by hardware modules of paper document processing device 902, or a combination thereof.

As depicted in FIG. 11, processing is initiated when paper document processing device 902 receives a signal to generate a new paper document based upon an original document 912 provided to paper document processing device 902 (step 1102). The signal may be received from various sources. For example, if paper document processing device 902 is configured to function as a copier, the signal may be received when a user selects a "Copy/Start" key provided by the user interface of paper document processing device 902. The signal may also be received from various applications and devices.

Paper document processing device 902 then obtains an electronic representation of the original paper document (step 1104). According to an embodiment of the present invention, paper document processing device 902 captures a scanned image of the original paper document. As described above, scanner subsystem 930 of paper document processing device 902 may be configured to capture and generate a scanned image of the original paper document.

An identification tag that is to be physically associated with the new paper document is then selected (step 1106). The identification tag may be selected from a plurality of identification tags available to paper document processing device 902. Alternatively, the selected identification tag may represent an identification tag embedded in a tagged paper to be used for generating the new paper document. The selected identification tag may also represent an identification tag that is attached to an object (e.g., a staple, a clip) that is to be physically associated with the new paper document.

Paper document processing device 902 then reads the identification code stored by the identification tag selected in step 1106 (step 1108). Tag readers 944 of tag subsystem 934 may be used to read the identification code information from the selected identification tag. As previously described, various different techniques may be used to read identification code information stored by the identification tag. The type of technique used for reading information stored by the selected identification tag generally depends on the type of identification tag used by the paper document output device. The identification code read in step 1108 is used to uniquely identify the new paper document to be generated.

The identification code read in step 1108 and the electronic representation of the original paper document obtained in step 1104 is then communicated to data processing system 904 for further processing (step 1110). Other information related to the new paper document may also be communicated to data processing system 904. For example, information identifying the physical location of the new paper document may be communicated to data processing system 904.

Paper document processing device 902 then receives electronic document information (or a portion thereof) from data processing system 904 (step 1112). According to an embodiment of the present invention, the electronic document information is determined by data processing system 904 based upon the electronic representation communicated to data processing system 904 in step 1110.

Paper document processing device 902 then stores the electronic document information (or a portion thereof) received in step 1112 on the identification tag selected in step 1106 (step 1114). Various techniques known to those skilled in the art may be used for storing the information in the memory of the identification tag. Steps 1112 and 1114 may not be performed in certain embodiments of the present invention.

Paper document processing device 902 then generates a new paper document based upon the original paper document and the selected identification tag is physically associated with the generated new paper document (step 1116). As described above, various techniques may be used to physically associate an identification tag with the new generated paper document. According to an embodiment of the present invention, the identification tag may be automatically physically associated with the paper document, for example, by using tagged paper to generate the new paper document, applying an object such as a staple with the identification tag embedded in it to the new generated paper document, using ink containing the identification tag to print the paper document, etc. In alternative embodiments, paper document processing device 902 may dispense an identification tag (e.g., a label comprising an identification tag) and request a user to physically associate the dispensed identification tag with the new paper document generated by paper document processing device 902.

Figure 12:
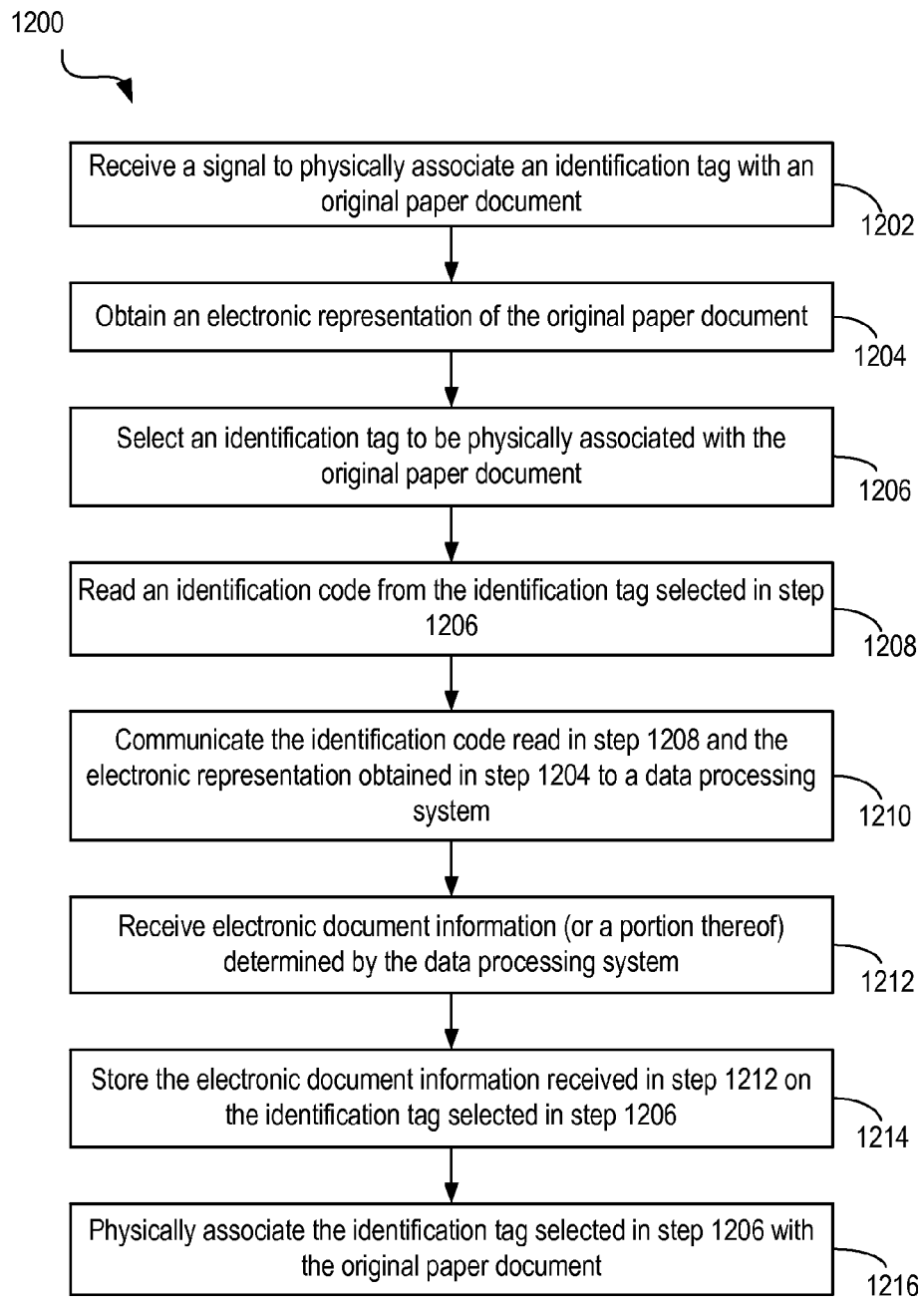
FIG. 12 is a simplified high-level flowchart depicting a method performed by a paper document processing device for physically associating an identification tag with original document 112 to produce document 112' according to another embodiment of the present invention.

Although flowcharts 1000 and 1100 depict methods for generating a new paper document 914, the flowcharts steps may also be used to physically associate an identification tag with original paper document 912 to produce document 912'. FIG. 12 is a simplified high-level flowchart 1200 depicting a method performed by paper document processing device 902 for physically associating an identification tag with original document 912 to produce document 912' according to another embodiment of the present invention. Flowchart 1200 depicted in FIG. 12 assumes that a paper document processing device 902 is coupled to a data processing system 904 (similar to the embodiment shown in FIG. 9A). However, it should be understood that the general processing depicted in FIG. 9 may also be applied to other embodiments of the present invention. Accordingly, flowchart 1200 depicted in FIG. 12 is merely illustrative of an embodiment incorporating the present invention and does not limit the scope of the invention as recited in the claims. One of ordinary skill in the art would recognize variations, modifications, and alternatives. The processing depicted in FIG. 12 may be performed by software modules executed by a processor of paper document processing device 902, by hardware modules of paper document processing device 902, or a combination thereof.

As depicted in FIG. 12, processing is initiated when paper document processing device 902 receives a signal to physically associate an identification tag with an original document 912 (step 1202). The signal may be received from various sources. For example, the signal may be received via a user interface of paper document processing device 902. The signal may also be received from various applications and devices.

Paper document processing device 902 then obtains an electronic representation of the original paper document (step 1204). According to an embodiment of the present invention, paper document processing device 902 captures a scanned image of the original paper document in step 1204. As described above, scanner subsystem 930 of paper document processing device 902 may be configured to capture and generate a scanned image of the original paper document.

An identification tag that is to be physically associated with the original paper document is then selected (step 1206). The identification tag may be selected from a plurality of identification tags available to paper document processing device 902. Alternatively, the selected identification tag may represent an identification tag attached to an object (e.g., a staple, a clip) that is to be physically associated with the original paper document, etc.

Paper document processing device 902 then reads the identification code stored by the identification tag selected in step 1206 (step 1208). Tag readers 944 of tag subsystem 934 may be used to read the identification code information from the identification tag. As previously described, various different techniques may be used to read identification code information stored by the identification tag. The type of technique used for reading information stored by the identification tag generally depends on the type of identification tag used by the paper document output device. The identification code read in step 1208 is used to identify the new paper document to be generated.

The identification code read in step 908 and the electronic representation of the original paper document obtained in step 1204 is then communicated to data processing system 904 for further processing (step 1210). Other information related to the original paper document may also be communicated to data processing system 904. For example, information identifying the physical location of the original paper document may be communicated to data processing system 904.

Paper document processing device 902 then receives electronic document information (or a portion thereof) from data processing system 904 (step 1212). The electronic document information is determined by data processing system 904 based upon the electronic representation communicated to data processing system 904 in step 1210.

Paper document processing device 902 then stores the electronic document information (or a portion thereof) received in step 1212 on the identification tag selected in step 1206 (step 1214). Various techniques known to those skilled in the art may be used for storing the information in the memory of the identification tag. Steps 1212 and 1214 may not be performed in certain embodiments of the present invention.

Paper document processing device 902 then physically associates the identification tag selected in step 1206 with the original paper document (step 1216). As described above, various techniques may be used to physically associate an identification tag with the original paper document. According to an embodiment of the present invention, the identification tag may be automatically physically associated with the paper document, for example, by applying an object such as a staple with the identification tag embedded in it to the original paper document. In alternative embodiments, paper document processing device 902 may dispense an identification tag (e.g., a label comprising an identification tag) and request a user to physically associate the dispensed identification tag with the original paper document.

Figure 13:
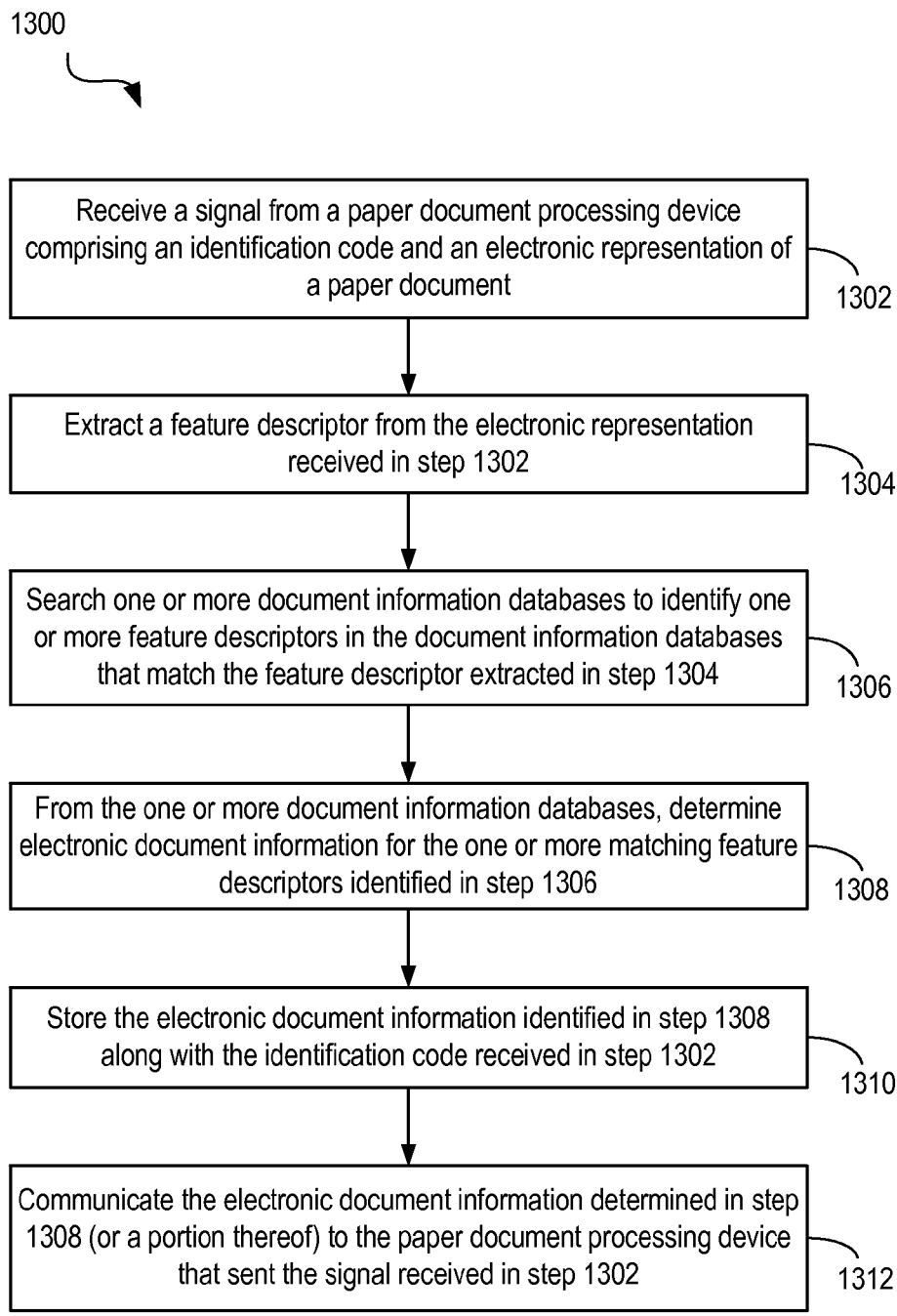
FIG. 13 is a simplified high-level flowchart depicting a method performed by a data processing system for determining electronic document information according to an embodiment of the present invention.

As described above, according to an embodiment of the present invention, data processing system 904 determines electronic document information for a paper document based upon information received from paper document processing device 902. FIG. 13 is a simplified high-level flowchart 1300 depicting a method performed by data processing system 904 for determining electronic document information according to an embodiment of the present invention. The flowchart depicted in FIG. 13 assumes that a paper document processing device 902 is coupled to a data processing system 904 (similar to the embodiment shown in FIG. 9A). However, it should be understood that the general processing depicted in FIG. 13 may also be applied to other embodiments of the present invention. For example, for the embodiment of the present invention depicted in FIG. 9B, the processing depicted in FIG. 13 is performed by paper document processing device 902. Accordingly, flowchart 1300 depicted in FIG. 13 is merely illustrative of an embodiment incorporating the present invention and does not limit the scope of the invention as recited in the claims. One of ordinary skill in the art would recognize variations, modifications, and alternatives. The processing depicted in FIG. 13 may be performed by software modules executed by a processor of data processing system 904, by hardware modules of data processing system 904, or a combination thereof As depicted in FIG. 13, processing is initiated when data processing system 904 receives a signal from a paper document processing device 902 (step 1302). The signal may comprise information identifying an identification code corresponding to an identification tag and electronic representation of a paper document. Other types of information such as the physical location of a paper document may also be included in alternative embodiments of the present invention.

Data processing system 904 then extracts a feature descriptor from the electronic representation received in step 1302 (step 1304). A feature descriptor extracted from an electronic representation of a paper document represents information extracted from the electronic representation (e.g., a scanned image). The feature descriptor can be used to uniquely identify the document. The extracted feature descriptor can be matched to other feature descriptors if the feature descriptors are consistently extracted from a similarly located section of the electronic representation. For example, a small rectangular patch from the upper left hand corner of the first page of a document may be selected for extracting a feature descriptor. One technique used by data processing system 904 for extracting a feature descriptor from an electronic representation is described below. Various other feature extraction techniques known to those skilled in the art may also be used by data processing system 904. For example, the various feature extraction techniques described in U.S. Pat. No. 6,104,834 may also be used by the present invention. The entire contents of U.S. Pat. No. 6,104,834 are incorporated herein by reference for all purposes.

Data processing system 904 then searches the one or more document information databases 910 to identify one or more feature descriptors that match the feature descriptor extracted in step 1304 (step 1306). If the feature descriptor extracted in step 1304 and the feature descriptors stored in document information databases 910 are extracted from a consistent location of an electronic representation (e.g., a scanned image) of a paper document, then if two feature descriptors match, it implies that there is a high likelihood that the scanned images from which the feature descriptors were extracted also match. Alternatively, if two feature descriptors do not match, then there is a high likelihood that the scanned images used for extracting the feature descriptors are different, and as a result the documents are different. Accordingly, in step 1306 data processing system 904 identifies one or more feature descriptors in document information databases 910 that match the feature descriptor extracted in step 1304.

As described above, according to an embodiment of the present invention, each document information database 910 stores feature descriptors that have been previously determined for a plurality of documents. For each feature descriptor, electronic document information corresponding to the feature descriptor is also stored. The electronic document information may comprise information identifying an electronic document, information specifying a storage location for the electronic document represented by the feature descriptor or a pointer or reference to the electronic document. For example, electronic document information for a particular feature descriptor may identify a file corresponding to the particular feature descriptor and a directory location where the file is stored, a uniform resource identifier or locator (URI or URL) pointing to an electronic document represented by the particular feature descriptor, and other like information. The information in a document information database 910 may be indexed by the feature descriptors information. Accordingly, for the feature descriptor extracted in step 1304, data processing system 904 may use the feature descriptor to search document information databases 910 to find one or more matching feature descriptors. Since a set of matching feature descriptors implies that there is a high likelihood that the scanned images corresponding to the feature descriptors match, it further implies that the electronic document from which a matching feature descriptor was extracted corresponds to the paper document from whose electronic representation the other feature descriptor was extracted.

Data processing system 904 then determines, from document information databases 910, electronic document information corresponding to each matching feature descriptor determined in step 1306 (step 1308). Data processing system 904 may then store the electronic document information determined in step 1308 along with the identification code received in step 1302 in paper document tracking database 908 (step 1310). The electronic document information is associated with the identification code and stored in a manner such that the electronic document information for a particular identification code can be determined given the identification code.

Other information received by data processing system 904 from paper document processing device 902 in step 1302 for the particular identification code may also be stored such that the other information can be retrieved given the identification code information. For example, as described in U.S. patent application Ser. No. 10/235,035, information identifying physical location of a paper document corresponding to the identification code may also be stored in paper document tracking database 908. The information stored in paper document tracking database 908 may be indexed by the identification code information. As depicted in FIG. 9A, paper document tracking database 908 may be implemented as a table wherein each row of the table stores information related to a particular identification code. As shown in FIG. 9A, each row stores information identifying an identification code, electronic document information determined by data processing system 904 for a paper document corresponding to the identification code, physical location information for the paper document identified by the identification code, and other information related to the paper document corresponding to the identification code.

The electronic document information determined in step 1308, or a portion thereof, may then be communicated to the paper document processing device 902 that was the source of the signal received in step 1302 (step 1312). As described above, paper document processing device 902 may then store the information in an identification tag.

Figure 14:
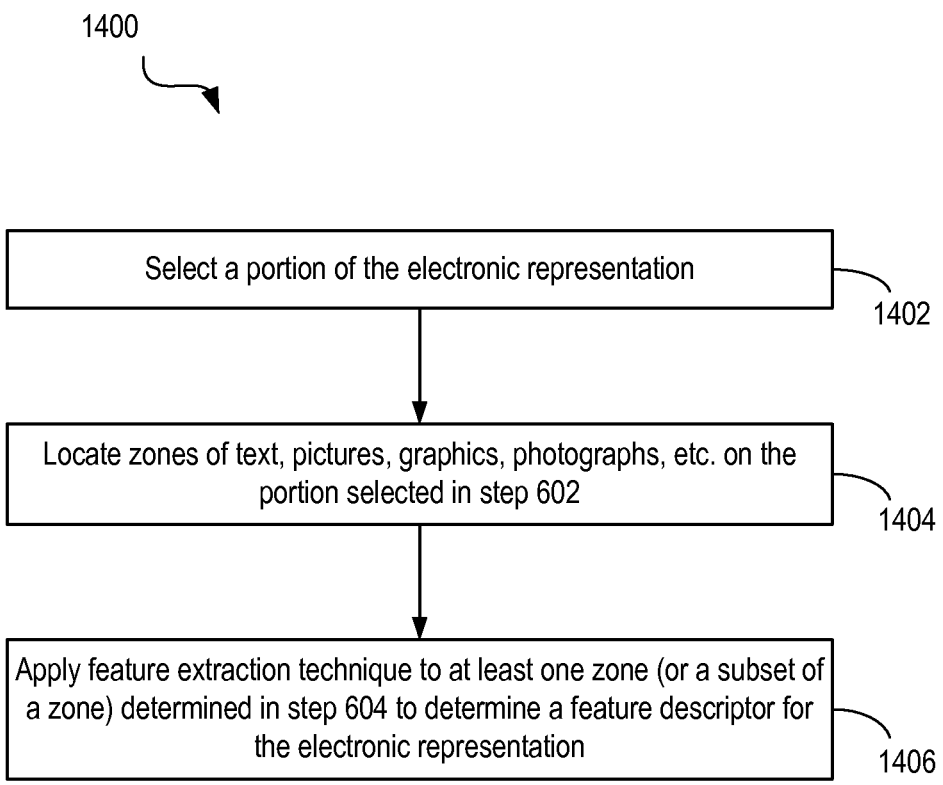
FIG. 14 is a simplified high-level flowchart depicting a method of extracting a feature descriptor from an electronic representation of a paper document according to an embodiment of the present invention.

FIG. 14 is a simplified high-level flowchart 1400 depicting a method of extracting a feature descriptor from an electronic representation of a paper document according to an embodiment of the present invention. The processing depicted in FIG. 14 may be performed by data processing system 904 (for embodiment depicted in FIG. 9A) or by paper document processing device 902 (for the embodiment depicted in FIG. 9B). Flowchart 1400 depicted in FIG. 14 is merely illustrative of an embodiment incorporating the present invention and does not limit the scope of the invention as recited in the claims. One of ordinary skill in the art would recognize variations, modifications, and alternatives. The processing depicted in FIG. 14 may be performed by software modules executed by a processor, by hardware modules, or a combination thereof. According to an embodiment of the present invention, the processing depicted in FIG. 14 is performed in step 1304 of flowchart 1300 depicted in FIG. 13.

As depicted in FIG. 14, a portion of the electronic representation is selected (step 1402). The selected portion may represent, for example, a section of the electronic representation corresponding to a particular page of a document. Zones of text, pictures, graphics, photographs, etc. are then located on the portion selected in step 1402 (step 1404). The coordinates (e.g., X-coordinates and Y-coordinates) and extent of each zone may be calculated in step 1404.

A feature extraction technique is then applied to at least one zone (or a subset of a zone) determined in step 1404 to determine a feature descriptor for the electronic representation (step 1406). To enable matching of the feature descriptor extracted for the electronic representation and feature descriptors stored in document information databases 910, the location of the one or more zones used for feature extraction are the same as those selected for extracting feature descriptors stored in document information databases 910.

Several different feature extraction techniques known to those skilled in the art may be applied. According to one technique, optical character recognition (OCR) may be applied to one or more zones and the results of the OCR analysis represent the feature descriptor for the electronic representation of the paper document. Various other techniques known to those skilled in the art may be used in alternative embodiments of the present invention.

The feature descriptor extracted in step 1406 may then be used to search one or more document information databases 910 as indicated in step 1306 of flowchart 1300 in FIG. 13. According to an embodiment of the present invention, a search query may be constructed using the extracted feature descriptor. The search query may then be used to search the document information databases 910 to locate matching feature descriptors per step 1306 of flowchart 1300 depicted in FIG. 13.

Figure 15:
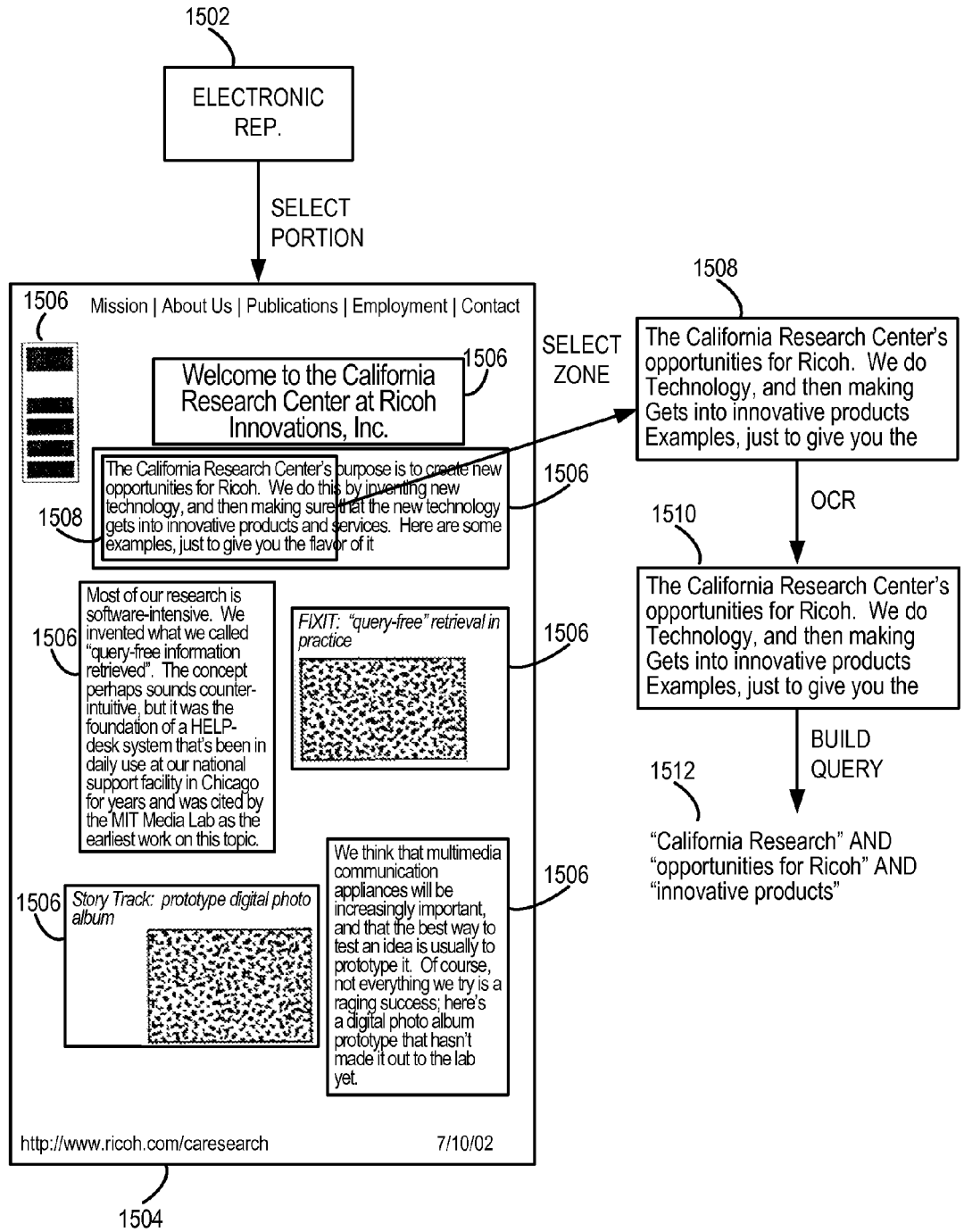
FIG. 15 depicts an example of applying the method depicted in FIG. 14 according to an embodiment of the present invention.

FIG. 15 depicts an example of applying the method depicted in FIG. 14 according to an embodiment of the present invention. As shown in FIG. 15, a portion 1504 of electronic representation (e.g., scanned image) 1502 representing a first page of a document is selected. Various zones 1506 are then identified on the selected portion. A subset 1508 of a text zone is then selected for extracting the feature descriptor. OCR feature extraction techniques are then applied to subset zone 1508 and the result of the OCR analysis represents the feature descriptor 1510 for electronic representation 1502. A search query 1512 is then configured based upon the feature descriptor. Search query 1512 may then be used to search document information databases 910.

As described above, according to an embodiment of the present invention, electronic document information for a paper document is located and stored along with the identification code read from an identification tag that is physically associated with the paper document. For example, the information may be stored in a paper document tracking database 908. According to an embodiment of the present invention, the electronic document information may also be stored in the identification tag that is physically associated with the paper document. The information stored in paper document tracking database 908 and/or the information stored in the identification tag may be used in various applications for various purposes.

According to one application, the stored information for a paper document may be used to generate a "perfect" copy of the paper document. A well known inherent problem with photocopying a document is that the quality of the photocopy degrades as successive copies are made. For example, if the original paper document is referred to as the "0th generation," all copies are first generation, at best. Degradation of copy quality is inevitable as copies are made from successive (i.e., first, second, third, etc.) generation copies wherein the cumulative degradation can ultimately result in an unrecognizable document. The present invention resolves this problem and can be used to generate photocopies that are as good as the original paper document, i.e. a "perfect" photocopy.

Various techniques may be used to generate a "perfect" photocopy of a paper document that has an identification tag physically associated with it. As described above, according to an embodiment of the present invention, the identification tag stores electronic document information for the paper document which specifies an electronic document corresponding to the paper document and the storage location of the electronic document. When a photocopy of the paper document is to be generated, the copier may be configured to read the electronic document information for the paper document from the identification tag that is physically associated with the paper document, access the electronic document corresponding to the paper document, and use the electronic document to generate the photocopy. In this manner, the copier is able to generate a "0th generation" photocopy on a continuous basis.

If the electronic document information is not stored in the identification tag that is physically associated with the paper document, the copier may be configured to read the identification code from the identification tag, use the identification code to locate a record (e.g., a row in a table) in paper document tracking database 908, find electronic document information for the paper document corresponding to the identification code from the paper document tracking database, and then use the electronic document information to generate the photocopy. In this manner, the copier is able to generate a "0th generation" photocopy for the paper document.

Various other operations, besides photocopying, may also be performed on an electronic document corresponding to a paper document using the paper document. For example, a facsimile machine may be configured to read information stored in an identification tag that is physically associated with a paper document, use the information to locate an electronic document corresponding to the paper document, and use the electronic document to communicate information via facsimile. A printer may be configured to read information stored in an identification tag that is physically associated with a paper document, use the information to locate an electronic document corresponding to the paper document, and generate a printout based upon the electronic document. Various other operations that can be performed on electronic documents are also envisioned within the scope of the present invention.

According to an embodiment of the present invention, the physical location of a paper document that has an identification tag physically associated with it can be tracked. Please refer to U.S. patent application Ser. No. 10/235,035 for further details.

Container for Storing Objects

Certain embodiments of the present invention provide a container that is capable of outputting information related to objects stored in the container. The container is able to output information for objects that are stored by the container and that have identification tags physically associated with them.

For purposes of this application, the term "container" is intended to refer to any area, receptacle or holder capable of containing, holding, or storing one or more objects. Examples of a container include a box, a briefcase, a bag, a case, a basket, a cabinet, a cupboard, portable containers, a shelf, a desk, and the like. Examples of objects that can be stored in a container include paper documents, books, magazines, pens, cups, and other physical objects.

As indicated above, for objects that are stored (or contained) in a container and have identification tags physically associated with them, the container is capable of outputting information related to the objects. According to an embodiment of the present invention, each identification tag that is physically associated with an object stores information related to the object. The information may include information that can be used to uniquely identify the object with which the identification tag is physically associated. For example, an identification tag may store an identification code that may be used to uniquely identify the object with which the identification tag is physically associated. It should be understood that other types of information that can be used to identify objects may also be stored in an identification tag in alternative embodiments of the present invention.

In addition to identification code information, other types of information related to an object may also be stored in an identification tag that is physically associated with the object. For example, if the object is a paper document, information that may be stored in an identification tag that is physically associated with the paper document may include an electronic representation of the contents of the paper document (e.g., a scanned image of the paper document, a Postscript format file or Portable Document Format (PDF) or image format or other file format, etc.), information identifying the author of the paper document, the date when the paper document was created, the number of pages in the paper document, and other like information. Other information that can be stored in an identification tag that is physically associated with a paper document is described in U.S. application Ser. Nos. 10/235,035, 10/235,042, 10/235,028, 10/235,030, and 10/234,414, the entire disclosures of which are herein incorporated by reference for all purposes.

According to the teachings of the present invention, a container may output information read from identification tags that are physically associated with one or more objects stored by the container. For example, the container may output identification code information read from the identification tags. For example, if the object is a paper document and the information read from an identification tag physically associated with the paper document includes an electronic representation (e.g., a scanned image) of the paper document, then the container may be configured to output the electronic representation.

Alternatively, the container may use the information read from the identification tags to determine additional information related to the objects stored by the container and output the additional information. For example, a container may use the identification code information read from an identification tag that is physically associated with a paper document to determine information identifying a storage location (e.g., a directory and filename) for an electronic representation of the paper document. The container may then output the storage location information.

In certain embodiments, a container may be configured to communicate the information read from identification tags physically associated with objects in the container to a data processing system. The data processing system may then output the information received from the container. The data processing system may also determine additional information based on the information received from a container and output the additional information. Depending upon the type of identification tag used, the information may be stored in the memory of the identification tag when the tag is manufactured, when the tag is activated, or at some later time using software or hardware techniques. For example, a paper document output device (e.g., a printer, copier, scanner, facsimile machine, etc.) may be configured to store a unique identification code in the memory of an identification tag that is physically associated with a paper document generated by paper document output device. Other information related to the paper document may also be stored in the identification tag by the paper document output device.

Various devices known to those skilled in the art may be used as identification tags. According to an embodiment of the present invention, each identification tag device includes an on-device memory that is capable of storing information. According to an embodiment of the present invention, radio frequency identification devices (RFIDs) are used as identification tags. For example, the Mu-chip manufactured by Hitachi, Ltd. may be used as an identification tag. The Mu-chip is a radio recognition IC chip that measures 0.4-mm square and is 60 microns thick in its present embodiment. The Mu-chip comprises an on-chip memory (presently a 128-bit ROM) that can be programmed to store information.

Various different techniques, including manual and automated techniques, may be used to physically associate an identification tag with an object. The identification tag may be permanently or temporarily attached to an object. Depending on the size of the identification tag, the identification tag may be embedded in the object. For example, due to its reduced size, a Mu-chip can be embedded in an object. For example, for a paper document object, a Mu-chip identification tag may be embedded in a paper page of the paper document. A paper page that has an identification tag embedded in it may be referred to as "tagged paper". Similarly, an identification tag may be embedded in other objects.

An identification tag may also be physically associated with an object by physically applying or attaching the identification tag to the object. For example, the tag may be attached to the object using clips, staples, adhesives, ties, strings, rubber bands, etc. The identification tag may also be incorporated into another object such as a staple, a clip, a label, etc. that is then attached to the object.

An identification tag may be physically associated with an object such that it is not directly visible to the unaided observer or user of the object. For example, as described above, an identification tag may be embedded in the object (e.g., a paper document comprising a tagged paper). If the object is a paper document, an identification tag may be mixed in the ink that is printed on the paper document.

Figure 16:
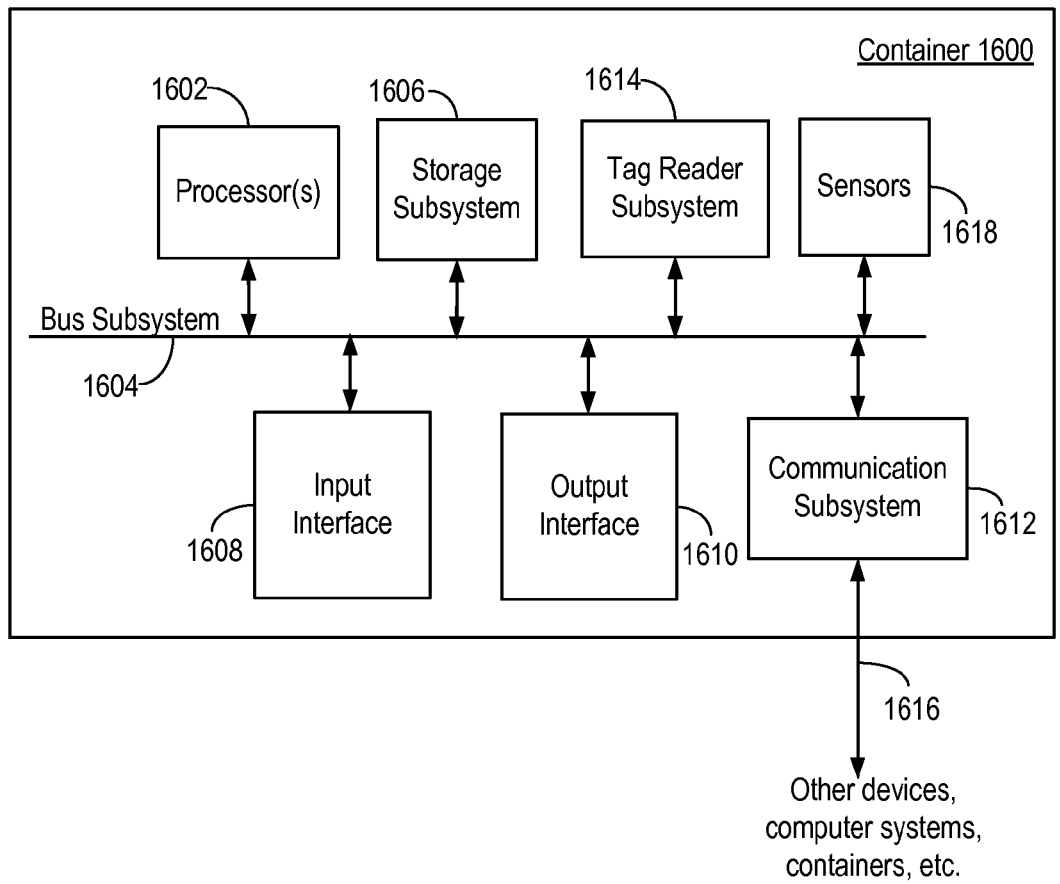
FIG. 16 is a simplified block diagram of a container according to an embodiment of the present invention.

FIG. 16 is a simplified block diagram of a container 1600 according to an embodiment of the present invention. As shown in FIG. 16, container 1600 includes a processor 1602 that communicates with a number of peripheral subsystems via a bus subsystem 1604. These peripheral subsystems may include a storage subsystem 1606, an input interface 1608, an output interface 1610, a communication subsystem 1612, a tag reader subsystem 1614, and sensors 1618. It should be understood that container 1600 depicted in FIG. 16 is merely illustrative of an embodiment of the present invention and does not limit the scope of the present invention. One of ordinary skill in the art would recognize other variations, modifications, and alternatives.

Bus subsystem 1604 provides a mechanism for letting the various components and subsystems of container 1600 communicate with each other as intended. Although bus subsystem 1604 is shown schematically as a single bus, alternative embodiments of the bus subsystem may utilize multiple buses.

Input interface 1608 allows user interaction with container 1600. A user may be a human user, a device, a process, a computer, another container, and the like. Input interface 1608 may be implemented using a touch pad, a touch screen, mechanical buttons, audio input devices such as voice recognition systems, microphones, and other types of input devices. In general, input interface 1608 includes all possible techniques to input information to container 1600.

Output interface subsystem 1610 provides an interface for outputting information from container 1600. Output interface subsystem 1610 may include a display subsystem such as a flat-panel device (e.g., a liquid crystal display (LCD), non-visual display devices such as audio output devices, and the like. According to the teachings of the present invention, information related to the objects contained in container 1600 may be output via output interface 1610.

Communication subsystem 1612 facilitates transfer of information to and from container 1600. Communication subsystem 1612 thus provides an interface to computer systems, other containers, and devices that may be coupled to container 1600 via communication link 1616. Embodiments of communication subsystem 1612 include an Ethernet card, a modem (telephone, satellite, cable, ISDN, etc.), (asynchronous) digital subscriber line (DSL) units, a jack, and the like.

Communication links 1616 depicted in FIG. 16 may be of various types including hardwire links, optical links, satellite or other wireless communication links, wave propagation links, or any other mechanisms for communication of information. Various communication protocols may be used to facilitate communication of information via the communication links. These communication protocols may include TCP/IP, HTTP protocols, extensible markup language (XML), wireless application protocol (WAP), protocols under development by industry standard organizations, vendor-specific protocols, customized protocols, and others.

Tag reader subsystem 1614 comprises one or more tag readers that are configured to read information from identification tags physically associated with objects stored or contained in container 1600. The information that is read by the tag readers from the identification tags may include identification code information and other information related to objects contained in container 1600. The tag readers are appropriately positioned in container 1600 such that they can detect and read (or obtain) information stored by identification tags physically associated with objects contained in container 1600.

The type of tag readers used and the technique used by the tag readers to read the information stored on an identification tag depends on the type of identification tag used. According to an embodiment of the present invention, a tag reader may read information from an identification tag by scanning the identification tag. In other embodiments, a tag reader may read the information by receiving the information from the identification tag. A tag reader may receive the information from an identification tag in response to an external stimulus (e.g., electromagnetic energy) or signal provided to the identification tag. The external stimulus or signal may be provided by the tag reader or by some other device or application. If the identification tag is self-powered, the identification tag may be configured to communicate the information stored by the identification tag to the tag reader. A tag reader may read the information stored by a tag reader in various forms including electromagnetic waves, electronic signals, acoustic signals, etc.

For example, in its present embodiment, information stored by a Hitachi Mu-chip can be read by exposing the Mu-chip to 2.45 GHz band microwaves. The Mu-chip uses the microwave energy as a power source and communicates the information stored in the on-chip memory in the form of radio waves that can be detected and read by a tag reader. In alternative embodiments, the Mu-chip may also include an on-chip antenna to increase the communication distance range. In yet other embodiments, a power source may be provided on the Mu-chip and the Mu-chip may be programmed to communicate the information stored by the Mu-chip to a tag reader. Accordingly, if a Hitachi Mu-chip is used as an identification tag, tag readers included in tag subsystem 1614 may be constructed to expose the Mu-chip to 2.45 GHz band of microwaves and to detect and read radio waves emanating from the Mu-chip. Various other types of tag readers that are capable of detecting electromagnetic, optical, acoustical, or other signals may be used in alternative embodiments of the present invention using other forms of identification tags.

Processor 1602 is configured to execute software modules that control and coordinate functioning of the various subsystems of container 1600. Processor 1602 is also configured to execute software code modules and control programs that control operation of container 1600 in accordance with the teachings of the present invention. For example, software modules executed by processor 1602 may determine additional information related to the objects based upon identification code information read by the tag readers from identification tags physically associated with one or more objects contained in container 1600. The software code modules and control programs executed by processor 1602 may be stored in storage subsystem 1606.

Storage subsystem 1606 is configured to store the basic programming and data constructs that provide the functionality of container 1600. For example, software modules and control programs implementing the functionality of container 1600 may be stored in storage subsystem 1606. Storage subsystem 1606 may also provide a repository for storing information used or generated by container 1600 according to the teachings of the present invention. For example, information used to determine additional information about the objects may be stored in storage subsystem 1606.

Sensors 1618 may include one or more sensors that can sense or detect environment events and conditions associated with container 1600. For example, sensors 1618 may include Global Positioning System (GPS) sensors that can detect the location of container 1600, sensors (e.g., solid state gyroscopes) that can detect motion of container 1600, sensors that can detect physical pressure applied to container 1600 (e.g., to determine if something is stacked onto container 1600), sensors that can detect humidity, temperature sensors, photoelectric sensors, MEMS (Micro Electro Mechanical Systems) sensors (such as sensors provided by Systron Donner Inertial Division (SDID), a BEI Sensors & Systems Company) and other sensors known to those skilled in the art. These sensors are available from various suppliers such as Honeywell, Inc., and others.

The data collected from sensors 1618 over time may be used to build an environmental profile of container 1600. The environmental data may be stored by container 1600. The environmental data can be accessed and/or queried by a user of container 1600. A remote user may access the environmental data via communication subsystem 1612. According to an embodiment of the present invention, the environmental data (or portions thereof) may be stored in identification tags physically associated with objects contained in container

1600. A subsystem of container 1600 may be configured to store the data in the identification tags.

Container 1600 itself can be of various types including a box, a briefcase, a bag, a case, a basket, a cabinet, a cupboard, and the like. The description of container 1600 depicted in FIG. 16 is intended only as a specific example for purposes of illustrating an embodiment of the computer system. Many other configurations of container 1600 having more or fewer components than that depicted in FIG. 16 are possible.

Figure 17:
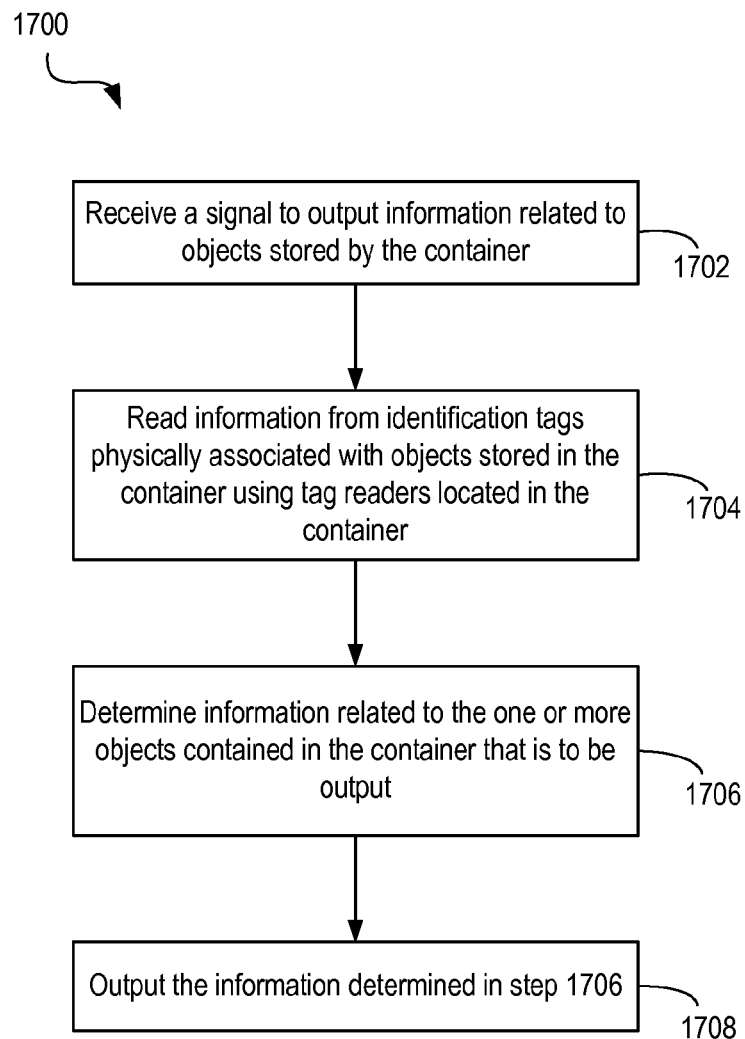
FIG. 17 is a simplified high-level flowchart depicting a method of outputting information related to objects stored or contained in a container according to an embodiment of the present invention.

According to the teachings of the present invention, container 1600 is configured to output information related to objects stored or contained in container 1600. FIG. 17 is a simplified high-level flowchart 1700 depicting a method of outputting information related to objects stored or contained in container 1600 according to an embodiment of the present invention. The method depicted in FIG. 17 may be performed by software modules executed by processor(s) of container 1600, by hardware modules coupled to container 1600, or combinations thereof. Flowchart 1700 depicted in FIG. 17 is merely illustrative of an embodiment incorporating the present invention and does not limit the scope of the invention. One of ordinary skill in the art would recognize variations, modifications, and alternatives.

As depicted in FIG. 17, the method is initiated when container 1600 receives a signal to output information related to objects stored by container 1600 (step 1702). The signal may be received from a variety of different sources. According to an embodiment of the present invention, the signal may be received from input interface 1608 of the container. For example, input interface 1608 may provide an input device (e.g., a button) that a user may select (e.g., user may activate or press a button) to generate a signal causing container 1600 to output information related to objects stored by container 1600. The signal may also be received from devices, computer systems, or other containers remotely situated from container 1600 and that may be coupled to container 1600 via communication link 1616. Container 1600 may receive the signal from these remote devices via communication link 1616.

The signal in step 1702 may also be received from applications or programs executed by container 1600. For example, container 1600 may execute a timer application that is configured to generate the signal at periodic time intervals. The signal received in step 1702 may also be generated when a software program executing on container 1600 detects the occurrence of a particular event. For example, container 1600 may be configured to execute a calendar program or a scheduling software program. These programs may be configured to generate the signal upon the occurrence of a particular date, at a particular time, upon the occurrence of a user-configurable event, etc.

Information from identification tags physically associated with objects stored in container 1600 is then read using the tag readers included in tag reader subsystem 1614 (step 1704). The information read from each identification tag physically associated with an object may include identification code information and other information related to the object. The other information related to the object may include information descriptive of the object. For example, the other information may include information identifying the object, information describing characteristics of the object such as the color of the object, the manufacturer of the object, the user of the object, and other like information.

For example, if the object is a paper document, the information stored in an identification tag physically associated with the paper document may comprise a representation of the contents of the particular paper document (e.g., scanned images of the paper document, electronic document corresponding to the paper document), information identifying the paper document (e.g., title of the paper document, etc.), information identifying an electronic representation of the paper document (e.g., a filename, directory location, etc.), information identifying another document related to the paper document, and the like. It should be understood that based upon the type of an object, various different kinds of information may be stored in the identification tag physically associated with the object and read by tag subsystem 1614 in step 1704.

Container 1600 then determines the information related to the one or more objects contained in container 1600 that is to be output (step 1706). According to an embodiment of the present invention, for an object contained in container 1600, the object-related information to be output includes information read from an identification tag physically associated with the object in step 1704 or a portion thereof. For example, if the information read from the identification tag includes an identification code, the identification code may be selected to be output.

In alternative embodiments, the information read in step 1704 from an identification tag physically associated with an object contained in container 1600 may be used to find additional information related to the object. For example, according to an embodiment of the present invention, if the information read in step 1704 from an identification tag physically associated with an object contained in container 1600 includes a unique identification code associated with object, the identification code may be used to determine additional information related to the object.

The additional information may be determined from a plurality of sources including databases, tables, data structures, etc. As described in the applications that have been incorporated by reference, for paper document objects, information identifying a plurality of identification codes identifying paper documents and information associated with the plurality of identification codes may be stored in a paper document tracking database. The information associated with each identification code in the paper document tracking database may include information indicating a storage location of an electronic representation of the paper document, information identifying a physical location of the paper document, information identifying actions that have been performed on the paper document, electronic representation of the paper document, information identifying attributes (e.g., author, number of pages, etc, title, etc.) of the paper document, and other information. Likewise, other databases may store information associated with identification codes identifying other types of objects.

Container 1600 may use information stored in databases such as the paper document tracking database to determine additional information related to the objects. Based upon the identification code read from an identification tag physically associated with an object in step 1704, container 1600 may determine the information corresponding to the identification code from the databases. The additional information determined by container 1600 or a portion thereof may be included in the object-related information that is selected in step 1706 to be output by container 1600.

The databases (e.g., paper document tracking database) storing additional information related to the objects may be stored by container 1600 (e.g., in storage subsystem 1606). Alternatively, container 1600 may access information stored in these databases via communication link 1616.

Container 1600 then outputs the information determined in step 1706 (step 1708). According to an embodiment of the present invention, the information is output via output interface 1610. For example, the information may be output via a flat screen on the container.

In alternative embodiments, container 1600 may communicate the information determined in step 1706 to an external device, system, or to another container via communication link 1616. The external device, system, or the other container may then output the information.

In alternative embodiments, after reading the information from identification tags in step 1704, container 1600 may be configured to communicate the information to a data processing system using communication subsystem 1612. The data processing system may then determine the information to be output to the user (i.e., step 1706 may be performed by the data processing system). The data processing system may then output the information per step 1708. In these embodiments, the data processing system may determine additional information related to the objects based upon the information received from a container. The additional information or portions thereof may be output to the user.

According to an embodiment of the present invention, the information output by container 1600 may enable a user of container 1600 to find out information related to objects stored in container 1600 in a convenient and simple manner. The information enables a user of the present invention to determine identity of objects stored in the container. For example, as described above, according to an embodiment of the present invention, a user may press a button provided by input interface 1608 of container 1600, and in response descriptive information related to objects stored by the container is output to the user via output interface 1610.

A user located at a remote location may also receive information related to the contents of container 1600. The remote user may send a signal to container 1600 via communication link 1616 and in response information related to objects stored by the container is communicated to the remote user by the container via communication link 1616. In this manner, a remotely located user can search and determine information related to objects stored by a container 1600 in a convenient manner.

Figure 18:
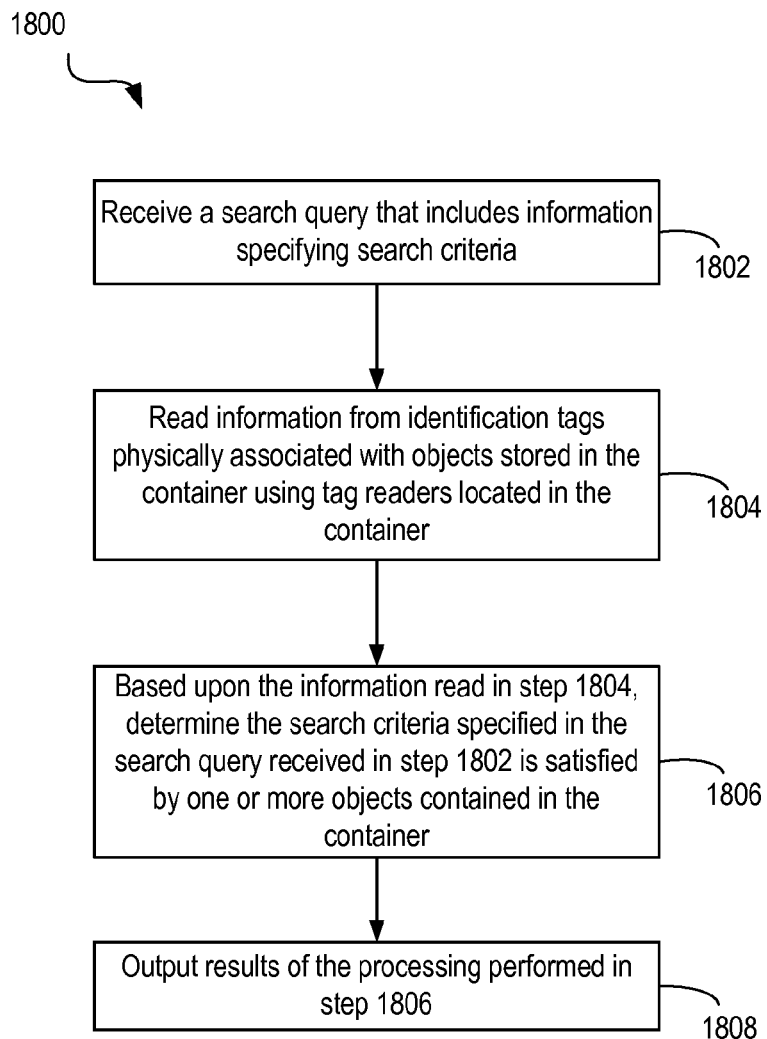
FIG. 18 is a simplified high-level flowchart depicting a method of responding to a search query according to an embodiment of the present invention.

Container 1600 may also respond to search queries received from users. According to an embodiment of the present invention, a search query received by container 1600 comprises information identifying search criteria related to one or more objects. Container 1600 is configured to respond to the search query by outputting information indicating whether or not the search criteria specified in the search query is satisfied based upon objects stored by the container. FIG. 18 is a simplified high-level flowchart 1800 depicting a method of responding to a search query according to an embodiment of the present invention. The method may be performed by software modules executed by processor 1602 of container 1600, by hardware modules coupled to container 1600, or combinations thereof. Flowchart 1800 depicted in FIG. 18 is merely illustrative of an embodiment incorporating the present invention and does not limit the scope of the invention. One of ordinary skill in the art would recognize variations, modifications, and alternatives.

As depicted in FIG. 18, processing is initiated when container 1600 receives a search query that includes information specifying search criteria (step 1802). The search query may be received from various different sources. According to an embodiment of the present invention, a user of container 1600 may configure the search query using input interface 1608. The search query may also be received from devices, computer systems, or other containers remotely situated from container 1600 and coupled to container 1600 via communication link 1616. The search query may also be received from applications or programs executed by container 1600.

Search criteria of different types may be specified in a search query. According to an embodiment of the present invention, the search criteria identifies an object and the search query requests container 1600 to determine if the specified object is stored in container 1600. For example, the search query may request container 1600 to determine if container 1600 contains "a calculator". The search criteria may also specify one or more characteristics of an object and the search query may request container 1600 to determine if container 1600 contains one or more objects satisfying the specified characteristics. For example, the search query may request container 1600 to determine if container 1600 contains a paper document entitled "Company Re-organization Plan".

Information from identification tags physically associated with objects stored in container 1600 is then read using tag reader subsystem 1614 (step 1804). As described above, the information read from each identification tag physically associated with an object contained in container 1600 may include identification code information and other information related to the object.

Based upon the information read in step 1804, container 1600 then determines if one or more objects stored in container 1600 satisfy the search criteria specified in the search query received in step 1802 (step 1806). According to an embodiment of the present invention, the information read in step 1804 is used to determine if the search criteria is satisfied by one or more objects stored by the container. In alternative embodiments, the information read in step 1804 is used to determine additional information related to the objects. The additional information may be used to determine if one or more objects stored in container 1600 satisfy the search criteria specified in the search query received in step 1802.

Container 1600 may employ various types of processing in step 1806 to determine if an object stored in container 1600 satisfies the search criteria. For example, if the search query requests if "a calculator" is contained in container 1600, container 1600 may determine if the information read from the identification tags physically associated with objects in container 1600 or the additional information determined based on the identification codes information indicates that an object in the container is a calculator.

If the search query identifies a characteristic of an object (e.g., the title of a paper document), container 1600 may determine if the information read from the identification tags physically associated with objects in container 1600 or the additional information indicates if an object in container 1600 possesses the specified characteristic. For example, if the search query specifies a title of a paper document, and the information read from the identification tags physically associated with objects in container 1600 or the additional information determined by container 1600 includes one or more scanned images of paper documents, then image processing techniques may be applied to the scanned images to determine if any of the scanned images has the specified title.

Results of the processing performed in step 1806 are then output to the user (step 1808). The information that is output may indicate whether or not the search criteria were satisfied. The information that is output may also identify the one or more objects that satisfied the search criteria. For example, if the search query specifies a title of a paper document, the information output in step 1808 may indicate if a paper document with the specified title is contained in container 1600. Information related to the document with the specified title may also be output.

The information in step 1808 may be output via output interface 1610 of container 1600. Alternatively, container 1600 may communicate the information to a data processing system that was the origination point of the search query via communication link 1616.

According to an embodiment of the present invention, container 1600 may also be configured to track objects that are inserted or removed from container 1600 relative to a baseline list of objects. A user may provide information specifying the baseline list of objects to container 1600. For example, a user may provide information related to the baseline list of objects using input interface 1608 of container 1600. The baseline list information may also be communicated to container 1600 via communication link 1616.

Objects in the baseline list may be identified using various techniques. According to an embodiment of the present invention, the objects may be identified using identification codes stored in identification tags that are physically associated with the objects. For example, a list of identification codes identifying the baseline list of objects may be provided to container 1600.

Figure 19:
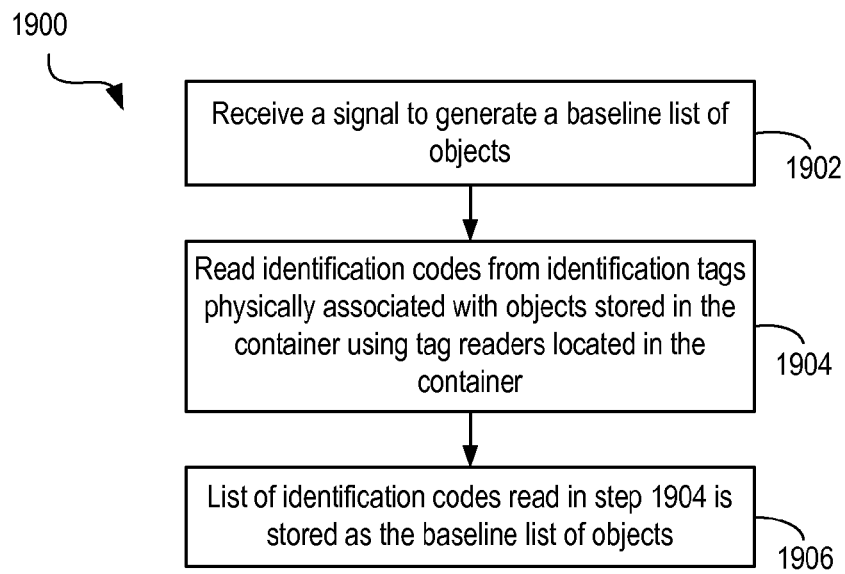
FIG. 19 is a simplified high-level flowchart depicting a method of generating a baseline list of objects stored by a container according to an embodiment of the present invention.

In alternative embodiments of the present invention, container 1600 may be configured to automatically generate the baseline list of objects based upon objects stored by the container. FIG. 19 is a simplified high-level flowchart 1900 depicting a method of automatically generating a baseline list of objects stored by container 1600 according to an embodiment of the present invention. The method may be performed by software modules executed by processor 1602 of container 1600, by hardware modules coupled to container 1600, or combinations thereof. Flowchart 1900 depicted in FIG. 19 is merely illustrative of an embodiment incorporating the present invention and does not limit the scope of the invention as recited in the claims. One of ordinary skill in the art would recognize variations, modifications, and alternatives.

As depicted in FIG. 19, processing is initiated when container 1600 receives a signal to generate a baseline list of objects (step 1902). The signal may be received from a variety of different sources. According to an embodiment of the present invention, the signal may be received from a user using input interface 1608. For example, input interface 1608 may provide an input device (e.g., a button) that a user may select (e.g., user may activate or press a button) instructing container 1600 to generate a baseline list of objects based upon objects contained in container 1600. The signal in step 1902 may also be received from devices, computer systems, or other containers remotely situated from container 1600 and coupled to container 1600 via communication link 1616. The signal may also be received from applications or programs executed by container 1600.

In response to the signal, tag readers included in tag reader subsystem 1614 of container 1600 are used to read or obtain identification code information from identification tags physically associated with objects contained in container 1600 (step 1904). According to an embodiment of the present invention, each identification code read from an identification tag uniquely identifies the object with which the identification tag is physically associated. The list of one or more identification codes read in step 1904 thus represents a list of objects stored by container 1600.

The list of identification codes is then stored as the baseline list of objects (step 1906). The baseline list information may be stored by container 1600 (e.g., stored in storage subsystem 1606 of container 1600) or may be communicated by container 1600 to a remote system coupled to container 1600 via communication link 1616. The remote system may then store the baseline list information.

Figure 20:
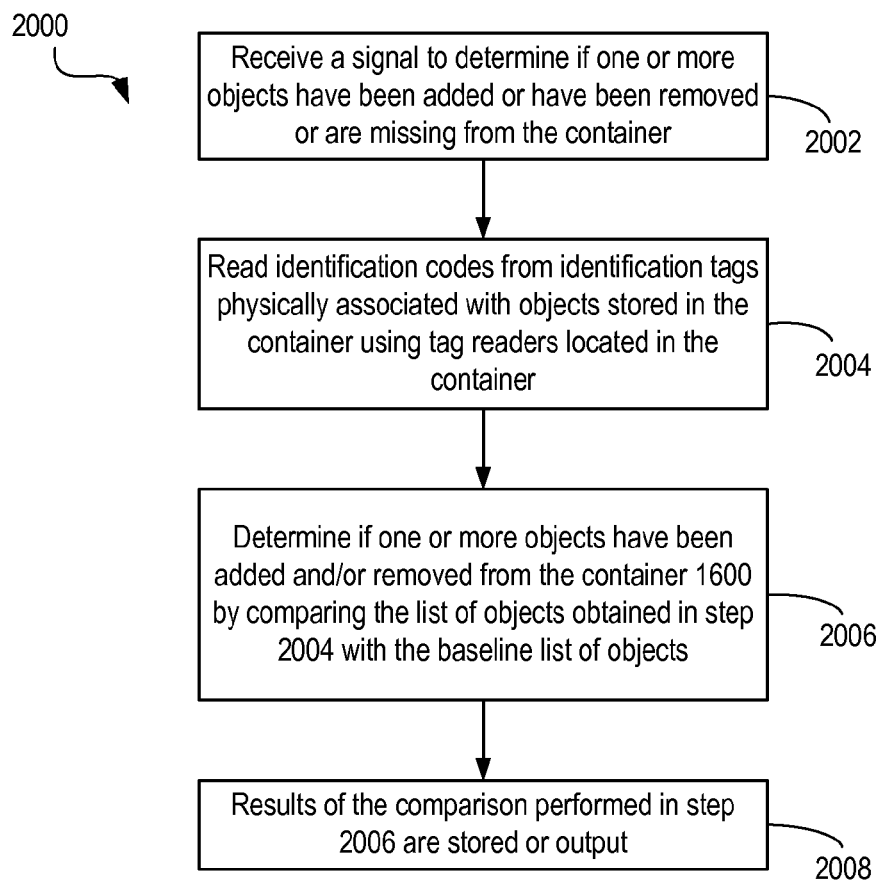
FIG. 20 is a simplified high-level flowchart depicting a method of determining if one or more objects have been added, removed, or are missing from a container according to an embodiment of the present invention.

The baseline list of objects is then used by container 1600 to determine if one or more objects have been added or have been removed (or are missing) from container 1600. FIG. 20 is a simplified high-level flowchart 2000 depicting a method of determining if one or more objects have been added, removed, or are missing from container 1600 according to an embodiment of the present invention. The method may be performed by software modules executed by processor 1602 of container 1600, by hardware modules coupled to container 1600, or combinations thereof. Flowchart 2000 depicted in FIG. 20 is merely illustrative of an embodiment incorporating the present invention and does not limit the scope of the invention as recited in the claims. One of ordinary skill in the art would recognize variations, modifications, and alternatives.

As depicted in FIG. 20, processing is initiated when container 1600 receives a signal to determine if one or more objects have been added or have been removed or are missing from container 1600 (step 2002). The signal may be received from a variety of different sources. According to an embodiment of the present invention, the signal may be received from a user using input interface 1608. For example, input interface 1608 may provide an input device (e.g., a button) that a user may select (e.g., user may activate or press a button) to generate a signal instructing container 1600 to determine if one or more objects have been added or have been removed or are missing from container 1600 relative to the baseline list of objects. The signal in step 2002 may also be received from devices, computer systems, or other container remotely situated from container 1600 and coupled to container 1600 via communication link 1616. The signal may also be received from applications or programs executed by container 1600. For example, an application executed by processor 1602 may generate the signal at periodic time intervals.

In response to the signal, the tag readers that are included in tag reader subsystem 1614 are used to read identification code information from identification tags physically associated with objects contained in container 1600 (step 2004). The list of one or more identification codes read in step 2004 represents a list of objects presently stored by container 1600.

The list of objects obtained in step 2004 is then compared with the baseline list of objects to determine if one or more objects have been added to container 1600 or are missing from container 1600 relative to the baseline list of objects (step 2006). If a particular identification code is included in the baseline list but is not included in the list of identification codes obtained in step 2004, it indicates that an object corresponding to the particular identification code has been removed or is missing from container 1600 relative to the baseline list of objects. If a particular identification code is not included in the baseline list but is included in the list obtained in step 2004, it indicates that an object corresponding to the particular identification code has been added to container 1600 relative to the baseline list of objects. If the identification codes read in step 2004 and the identification codes listed in the baseline list of objects are the same, it indicates that no object has been added or removed from container 1600.

The results of the comparison performed in step 2006 are then either stored or output to the user (step 2008). According to an embodiment of the present invention, if it is determined in step 2006 that one or more objects have been added or removed (or are missing) from container 1600 relative to the baseline list of objects, then identification codes corresponding to the added or removed objects may be output to the user. Other information related to or descriptive of the added or removed objects may also be output along with the identification codes information. The other object-related information may be read from the identification tags or may be determined from object databases accessible to container 1600.

As described above, container 1600 can be configured to output information indicating whether one or more objects have been added and/or are missing from a container relative to a baseline list of objects. For example, if container 1600 is embodied as a briefcase, the user of the briefcase may, before leaving for work, push a button on the briefcase that causes the briefcase to generate a baseline list of objects (e.g., pens, pencils, paper documents, PDAs, etc.) contained in the briefcase. Later, before coming back home from work, the user may push another button on the briefcase that causes the briefcase to automatically output information about objects that have been added or removed from the briefcase relative to the baseline list of objects. An alert may be output if an object is missing. In this manner, the user can easily and conveniently determine if any objects are missing or have been added to the user's briefcase.

As another example, if container 1600 is embodied as a toolbox, a user of the toolbox may push a button on the toolbox that causes generation of a baseline list of objects (e.g., tools, etc.) contained in the toolbox. The user may then push another button on the toolbox at some later time to automatically receive information about objects that have been added or removed from the toolbox relative to the baseline list of objects. In this manner, the user can easily and conveniently determine if any objects are missing from the toolbox.

According to an embodiment of the present invention, container 1600 maintains a running history log of object additions and/or removals from container 1600. In this embodiment, container 1600 periodically reads identification code information from identification tags physically associated with objects contained in container 1600 and uses the information read at periodic time intervals to determine when objects were added or removed from container 1600.

Figure 21:
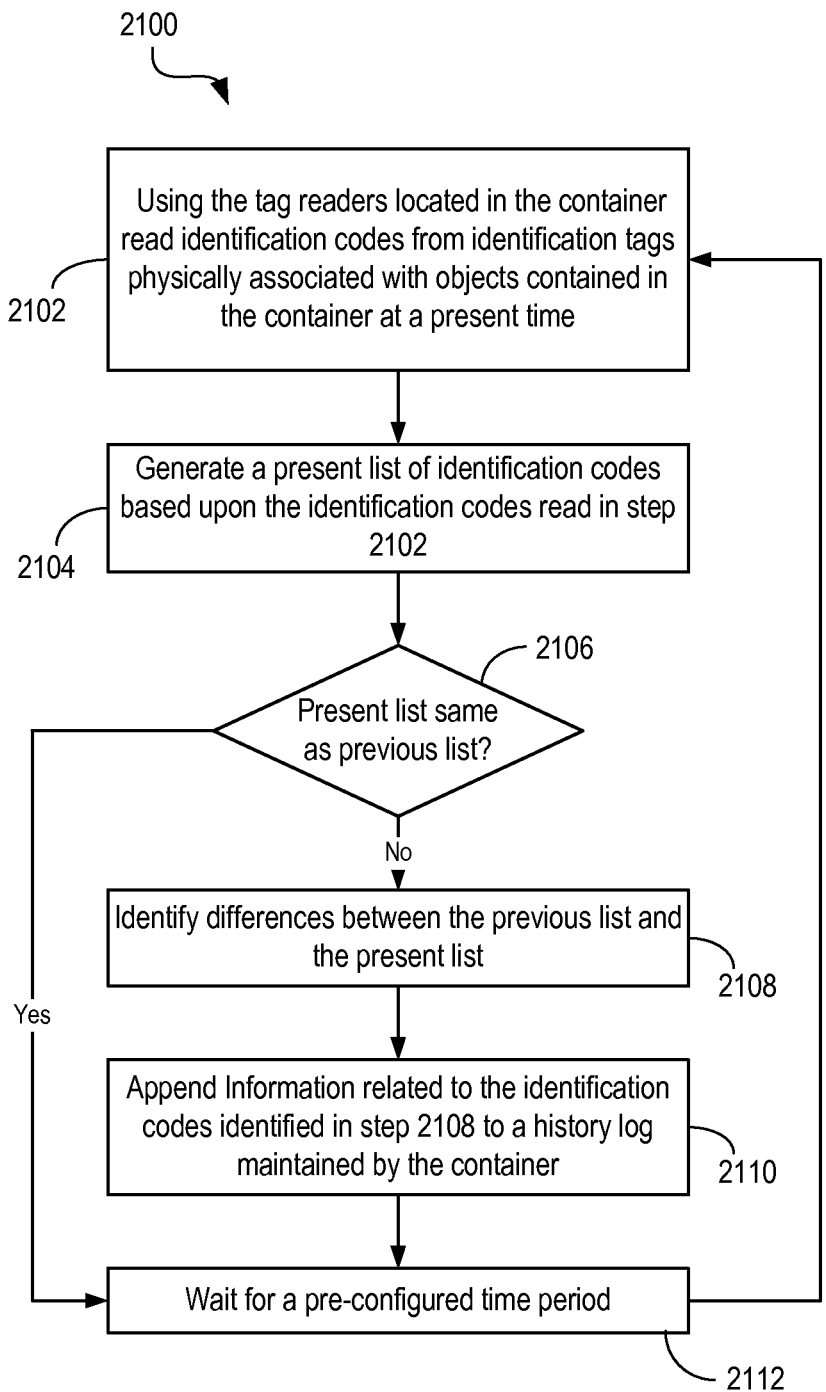
FIG. 21 is a simplified high-level flowchart depicting a method of determining when an object was added or removed from a container by periodically reading identification code information from identification tags physically associated with objects contained in the container according to an embodiment of the present invention.

FIG. 21 is a simplified high-level flowchart 2100 depicting a method of determining when an object was added or removed from container 1600 by periodically reading identification code information from identification tags physically associated with objects contained in container 1600 according to an embodiment of the present invention. The method may be performed by software modules executed by processor 1602 of container 1600, by hardware modules coupled to container 1600, or combinations thereof Flowchart 2100 depicted in FIG. 21 is merely illustrative of an embodiment incorporating the present invention and does not limit the scope of the invention as recited in the claims. One of ordinary skill in the art would recognize variations, modifications, and alternatives.

As depicted in FIG. 21, tag readers included in tag reader subsystem 1614 are used to read identification code information from identification tags physically associated with objects contained in container 1600 at a present time (step 2102). A list of identification codes is then generated based upon the information read in step 2102 (step 2104). The list (referred to as the "present list") of one or more identification codes represents a list of objects stored by container 1600 at the present time. A time stamp corresponding to the present time may be associated with the list generated in step 2104.

The list of identification codes generated in step 2104 is then compared with a previously generated list of identification codes to determine if there are any differences between the present list and the previous list (step 2106). The previously generated list is a list generated at a previous time when the identification tags were scanned (referred to as the "previous list", where "previous time"="present time"−Δt, for some user-configurable Δt). If there is no difference between the identification codes listed in the previous list and identification codes listed in the present list, it indicates that no object has been added and/or removed from container 1600 in the time interval between when the previous list was generated (the "previous time") and the time when the present list was generated (the "present time") (i.e., during the time interval from "previous time" to "present time"). In such a scenario processing continues with step 2112.

If there is a difference between the identification codes listed in the previous list and identification codes listed in the present list, it indicates that one or more objects have been added and/or removed from container 1600 in the time interval between the present time and the previous time. The differences between the previous list and the present list are identified (step 2108). Accordingly, in step 2108, container 1600 identifies identification codes that are included in the previous list but not in the present list and identification codes that are included in the present list but are not included in the previous list. If a particular identification code is included in the previous list but is not included in the present list, it indicates that an object corresponding to the particular identification code has been removed from container 1600 in the time interval between when the previous list was generated and the time when the present list was generated. If a particular identification code is not included in the previous list but is included in the present list, it indicates that an object corresponding to the particular identification code has been added to container 1600 in the time interval between when the previous list was generated and the time when the present list was generated.

Information related to the identification codes identified in step 2108 is then appended to a history log maintained by container 1600 (step 2110). For each identification code, information indicating whether an object corresponding to the identification code was removed or added to container 1600 and the time interval (i.e., the time interval between the present time and previous time) when the addition or removal occurred is also stored in the history log.

After updating the history log according to step 2110 and after waiting for a pre-configured time period (step 2112), processing continues with step 2102 wherein the next periodic scan of the identification tags contained in container 1600 is performed. The method depicted in FIG. 21 is then repeated. The time period (Δt) between successive reads of the identification tags may be user-configurable.

In the manner described above, container 1600 maintains a running history log of additions and removals of objects from container 1600. Information from the history log or portions thereof can be output to the user. For example, a user of container 1600 may specify a particular time period (e.g., an hour, a day, a week, etc.), and information from the history log indicating additions and removals of objects from container 1600 for the user-specified time period may be output to the user.

Information from the history log may also be used to augment the information output to the user in step 2008 of flowchart 2000 depicted in FIG. 20. For example, for each object that has been added or removed from container 1600 relative to the baseline list of objects, information indicating when the object was added or removed from container 1600 may also be output to the user based upon information stored in the history log.

In other embodiments, container 1600 may be configured to output an alarm signal to the user whenever container 1600 senses than an object has been removed from container 1600. The alarm signal may be output to the user via output interface 1610. The alarm signal may comprise information identifying the object that is missing from container 1600. In alternative embodiments, container 1600 may be configured to output the alarm signal only when container 1600 senses that certain user-specified objects have been removed from container 1600.

According to an embodiment of the present invention, information regarding additions and removals of objects from container 1600 may be written to the identification tags that are physically associated with the objects. For example, every time that a scan of the objects in container 1600 is performed, information may be stored in the identification tags of the objects in container 1600 indicating the time the scan was performed and information indicating that the object was sensed to be contained in container 1600. In this manner a history of when the object was in container 1600 is stored on the object's identification tag. A user can then determine when an object was added or removed from container 1600 from information stored in the object's identification tag—no network connection or retrieval from a central database is required.

In alternative embodiments of the present invention, container 1600 may comprise an object motion sensing subsystem that can sense when an object is added or removed from container 1600. By detecting motion of an object, the object motion sensing subsystem can determine when an object is removed from container 1600 or added to container 1600. When removal or addition of an object to container 1600 is sensed, information may be stored in the identification tag that is physically associated with the object indicating the time and date when the addition or removal takes place, and indicating whether the object was added or removed. For example, an information such as the following may be stored in the identification tag that is physically associated with an object.

"Object removed from the container at 12:45 pm on Aug. 22, 2001"

The addition/removal information for an object detected by the object motion sensing subsystem may also be stored by container 1600. In this manner a history of additions and removals of objects from container 1600 is maintained. This history information may be accessed and/or queried by a user of container 1600.

Container 1600 may also be equipped with a camera that is capable of capturing an image of a user who removes or adds an object to container 1600. The camera may be configured to capture a photo of a user every time an object is added or removed from container 1600. In this embodiment, each entry in the addition/removal history log may be augmented with information identifying a user responsible for removing or adding an object to container 1600. The camera may be included in sensors 1618 of container 1600.

Various other types of information related to objects contained in container 100 may also be stored by container 100 and/or written to identification tags physically associated with the objects. For example, security information as described in U.S. application Ser. No. 10/235,030 may be stored.

Document Security System

Figure 22:
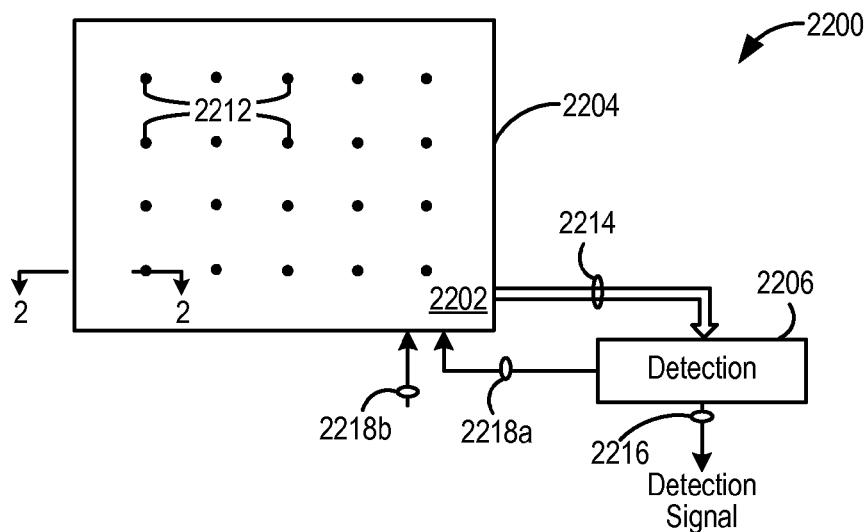
FIG. 22 is a simplified block diagram of a sensor arrangement for monitoring documents in accordance with an embodiment of the present invention.

FIG. 22 is a schematized representation illustrating by way of example an embodiment of a document monitoring device according to the present invention. The document monitoring device 2200 includes a structure 2204 that is suitable for placement of one or more documents. The structure can be a desktop, for example, or other similar work surface. The structure can be a shelf in a bookcase, or perhaps a document bin of a document processing apparatus such as a copier or printer, and so on.

The document monitoring device further includes an arrangement of sensors 2212 disposed about an area of the structure 2204. As can be seen in the figure, the sensors are arrayed in a regular pattern. It will be appreciated that the sensors can be arranged in any regular pattern other than the rectangular pattern shown. Moreover, it will be appreciated that the sensors can be arranged in an irregular or otherwise random pattern.

A detection module 2206 receives an output signal 2214 that represents a collection of the signals produced by the sensors 2212. The detection module produces a detection signal 2216 based on the output signal. The detection module can be an appropriately configured computer processor or an analog device, depending on the nature of the output signal 2214. As will be seen below, in a particular implementation of an embodiment of the invention, the output signal is digital, and so the detection module can be a digital processing device.

A control signal 2218A is coupled to the sensors 2212 to control their action. In one embodiment of the invention, the control signal is produced by the detection module 2206. This configuration might be appropriate for providing synchronous operation between the sensors 2212 and the detection module. Alternatively, as can be seen in FIG. 22, a control signal 2218B can be provided from a source other than the detection module.

Figure 23A:
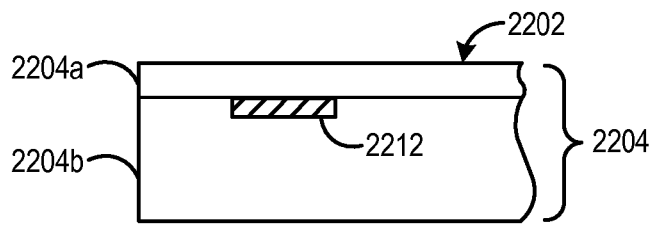
FIGS. 23A-23C illustrate typical examples of incorporating sensors in a surface.
Figure 23B:
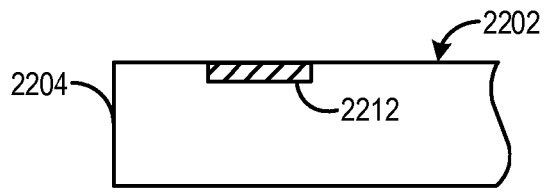
Figure 23C:
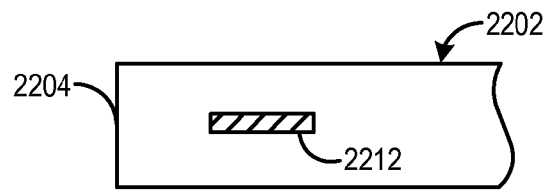

FIGS. 23A-23C show alternative embodiments of the incorporation of sensors 2212 in the structure 2204, as seen from the cross-sectional view taken along view line 2-2 shown in FIG. 22. The embodiment shown in FIG. 23A illustrates the structure 2204 having one or more laminations 2204a, 2204b, showing the sensor 2212 disposed within the material of the lamination 2204b. An example of this construction can be a desktop having a protective layer of glass 2204a, where the sensors might be embedded in the material (e.g., wood) of the desktop 2204b. FIG. 23B shows an embodiment in which the sensors are simply embedded in the structure, flush with the surface 2202 of the structure. FIG. 23C shows yet another embodiment in which the sensors are embedded below the surface 2202 of the structure. It can be appreciated from these example embodiments that the sensors can be incorporated with the structure 2204 in a variety of ways.

Figure 24A:
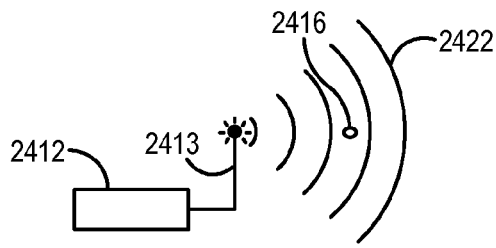
FIGS. 24A and 24B show a typical radio frequency identification system.
Figure 24B:
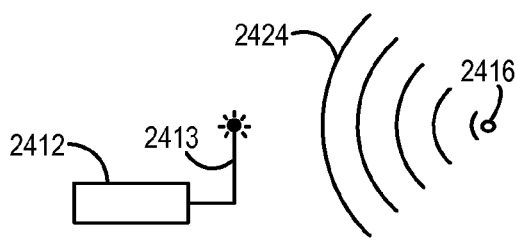

The components of a radio frequency identification system (RFID) are used in a particular implementation of this embodiment of the invention. RFID is a versatile wireless solution for identification. It has a wide range of applications, from tracking books in a library to monitoring the movement of cattle on a ranch. FIGS. 24A and 24B show that a basic RFID system comprises three components: an antenna component (coil) 2413, a transceiver component 2412, and a transponder (commonly called an RFID tag) 2416.

The antenna component 2413 emits radio signals to activate the tag 2416. Antennas are available in a variety of shapes and sizes. Thus, it can be appreciated that antennas can constitute the sensors 2212 shown in FIGS. 22 and 23A-23C, in this particular implementation of the invention.

Often, the antenna component 2413 is packaged with a transceiver component 2412 which typically includes a decoder module. This combination is referred to variously as a reader, an interrogator, and so on. In operation, the reader can emit radio waves 2422 (interrogation signal) in ranges of anywhere from one inch to several feet or more, depending upon its power output and the radio frequency used. The transceiver component produces the interrogation signal which is then propagated by the antenna component.

When an RFID tag passes through the electromagnetic zone of the interrogation signal, it responds to that signal and produces a response signal 2416 which is picked up by the antenna component 2413 and fed to the transceiver component 2412. The decoder module in the transceiver decodes the response signal to extract the data encoded in the tag and the data is passed to a host computer for subsequent processing.

RFID tags come in a wide variety of shapes and sizes. Some tags can only be read, while other tags can be read and written. For example, a product called the MU-chip by Hitachi, Ltd., is a 0.4 mm$^2$ chip that is thin enough (about 60 μm) to be embedded in paper, and contains a read-only memory (ROM) of 128 bits.

RFID tags are categorized as either active or passive. Active RFID tags are powered by an internal battery and are typically read/write, i.e., tag data can be rewritten and/or modified. The battery-supplied power of an active tag generally gives it a longer read range. The trade off of course is greater size, greater cost, and a limited operational life due to the limited life of the battery. Nonetheless, it can be appreciated that active tags can be useful in the present invention under appropriate operational requirements.

Passive RFID tags operate without a separate external power source and obtain operating power generated from the interrogation signal transmitted from the reader. Passive tags are consequently much lighter than active tags, less expensive, and offer a virtually unlimited operational lifetime. The trade off is that they have shorter read ranges than active tags and require a higher-powered reader. Read-only tags are typically passive and are programmed with a unique set of data (usually 32 to 128 bits) that cannot be modified. For example, the Hitachi MU-chip comes preprogrammed with a 128 bit data word.

In accordance with the present invention, physical documents have one or more RFID tags physically associated with them. A plethora of attachment processes are possible. An RFID tag can be attached by the use of adhesives. A clip which gathers together a multi-page document can be provided with an RFID tag. For example, a paper clip may incorporate a tag, or a staple can be incorporated with a tag.

The attachment can be manual, or by automation. For example, a copying machine can be outfitted with RFID tagged staples or a dispenser of adhesive tags, so that stapled copies can be tagged by way of the staple, or single-page copies can be tagged with an adhesive tag. RFID tags (e.g., Hitachi MU-chip) can be embedded in the paper medium itself ("tagged paper").

In accordance with this particular implementation of an embodiment of the invention, each RFID tag is associated with a unique identification, referred to herein as a "tag identifier." Furthermore, when a tag is physically associated with a physical document, there is an association between the tag identifier and "document information" relating to the physical document. The document information might comprise an electronic copy of the physical document, an image of the document, a reference which identifies the physical or an electronic form of document, a reference identifying where an electronic copy of the physical document can be found, references to other documents, and so on. The document information might include information indicative of permissions, for example, whether a document can be copied or not. The document information might include ownership information, document modification history information. In general, one can appreciate that any kind of information may constitute "document information."

The document information can be collected at the time of creation of the document; e.g., when the document is printed, copied, faxed, or otherwise processed. The document information can be an accumulation of information collected during the lifetime of the document such as when modifications are made, or when copies are made, for example. A database system (not shown) can be provided to store such information, or other suitable information management system. The database or information management system can be used to provide the mapping between tag identifier and document information.

Figure 25:
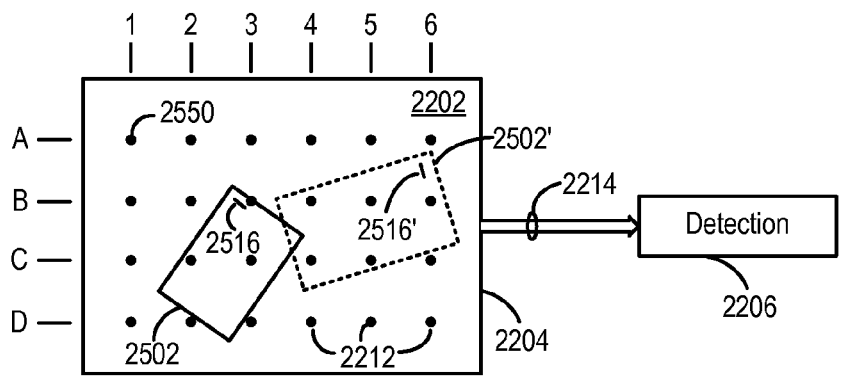
FIGS. 25 and 25A illustrate document monitoring in accordance with an embodiment of the present invention.

FIG. 25 illustrates how document monitoring in accordance with an embodiment of the present invention can be provided. On the surface 2202 of the structure 2204 is a document having associated therewith an RFID tag 2516. As can be seen in the figure, the document has a first position 2502 on the surface, and a second position 2502' shown in phantom.

In the particular embodiment shown in FIG. 25, the sensors 2212 are interrogation circuits comprising a transceiver circuit 2412 (FIG. 24A) to produce an interrogation signal 2422. The response signal picked up by the antenna component 2413 of each sensor is detected by the transceiver circuit. However, not all of the sensors will detect the response signal. Since the response signal is typically weak, especially in the case of a passive RFID tag, only those sensors within the transmission range of the response signal generated by the tag 2516 will be able to detect the signal.

Figure 27A:
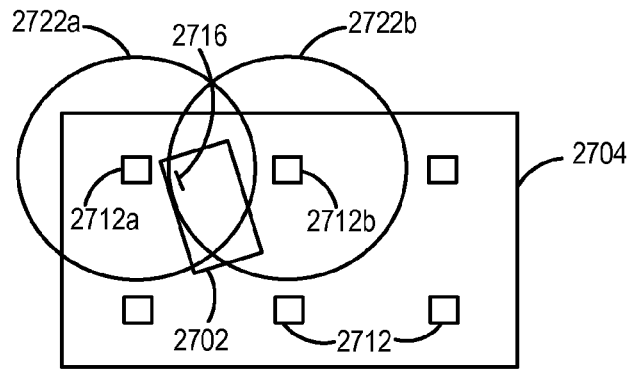
FIGS. 27A and 27B show the transmission range characteristics of an RFID system.
Figure 27B:
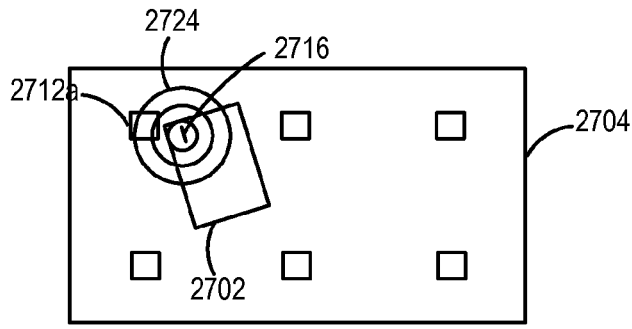

The limited transmission range of an RFID tag is illustrated in FIGS. 27A and 27B. In FIG. 27A, all of the interrogators 2712 transmit an interrogation signal 2722 (though, for clarity, only the signals 2722a and 2722b for two interrogators 2712a and 2712b, respectively, are shown). A document 2702 having an associated RFID tag 2716 is exposed to the electromagnetic radiation. FIG. 27B shows the response signal 2724 produced by the tag 2716. However, since the signal strength of the response signal is low, its range is limited and is therefore not detected by all of the interrogators. Rather, (in this case) the response signal is detected only by the interrogator 2712a.

Figure 25A:
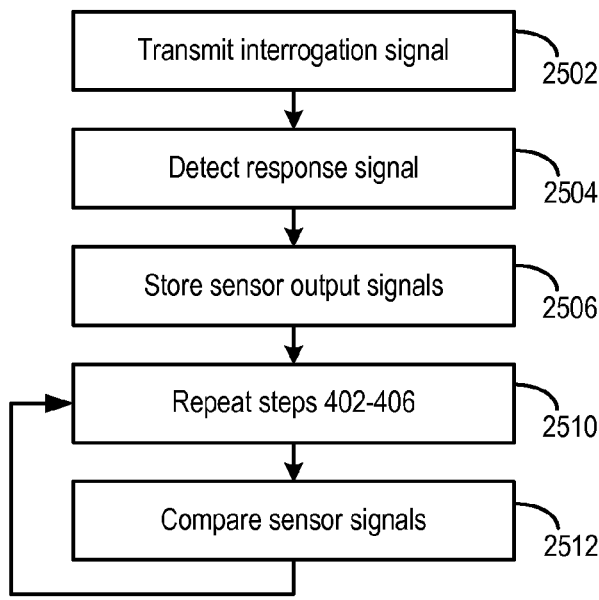

FIG. 25A shows a high level flowchart for the processing which occurs for the arrangement shown in FIG. 25. Consider that each sensor 2212 transmits an interrogation signal, at a time $t_0$, in a step 2502. As discussed above, the response signal of the tag 2516 will be detected (step 2504) only by those sensors that are within the transmission range of the tag. Those sensors which detect the response signal each will produce a sensor output signal, which typically comprises some information that is stored in the tag 2516; e.g., an identification code. The collection of sensor output signals is collectively represented by the output signal 2214 (FIG. 22). The detection module 2206 receives a first set of sensor output signals and stores them (step 2506) as first information indicative of the first position 2502 of the document.

Now, consider a time $t_1$ ($>t_0$) when the document has been moved. This is indicated by the document (in phantom) shown in position 2502'. At a time $t_2$ ($>t_1$), a second interrogation signal is transmitted by the transceiver circuits of the sensors 2212 (step 2502), another set of sensors will detect the response signal produced by the tag 2516 (step 2504). A second set of sensor output signals is produced as output signal 2214 and stored in the detection module 2206 (step 2506) as second information indicative of the second position 2502' of the document. Movement of the document can then be determined (step 2512) based on the first sensor output signals and the second sensor output signals.

In one particular implementation of an embodiment of the invention, the detection module 2206 can process the sensor output signals by associating each signal with information indicating the location of the sensor. For example, the sensor output signal received from the sensor 2550 might be associated with a location identified by the coordinate (A,1). Thus, movement of the document is determined from the point of view of comparing the locations of those sensors which detected the tag's 2516 response signal at time $t_o$ with the location of those sensors which detected the response signal at time $t_2$.

Alternatively, the detection module 2206 can process the sensor output signals by associating the sensor output signals with the sensors 2212 themselves. For example, the sensor output signal can contain information indicative of a tag identifier, thus identifying the tag. Document movement can be detected by comparing the tag identifiers obtained from the first set of sensor output signals against the tag identifiers obtained from the second set of sensor output signals.

Figure 26A:
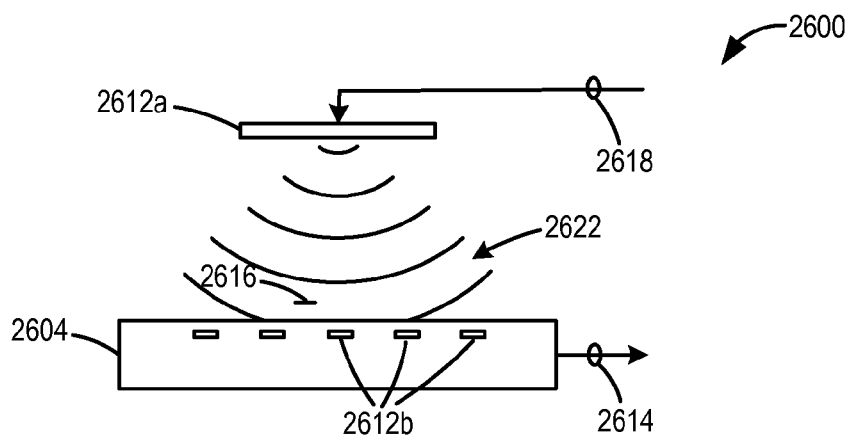
FIGS. 26A-26C illustrate in block diagram form a sensor arrangement according to another embodiment of the invention.
Figure 26B:
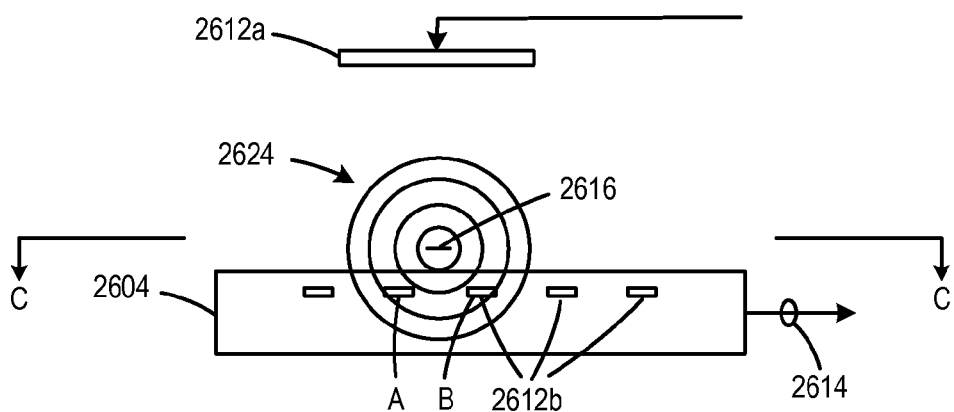
Figure 26C:
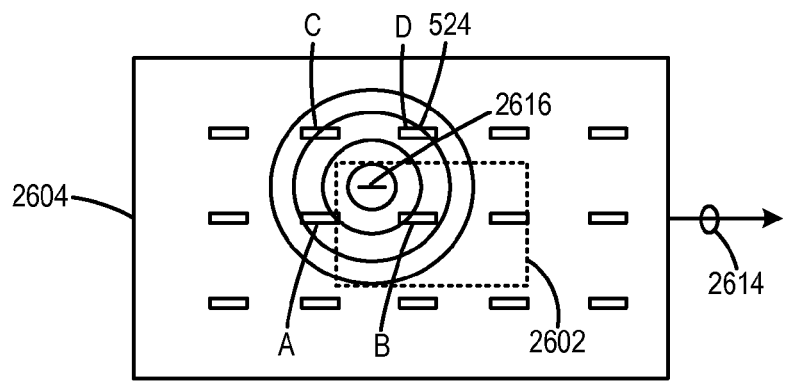

FIGS. 26A-26C show a document monitoring apparatus in accordance with another embodiment of the present invention. The apparatus 2600 includes a structure 2604 suitable for placement of documents. A plurality of receiver components 2612*b* are disposed about an area of the structure. FIGS. 23A-23C illustrate examples of how the receiver components can be incorporated with the structure 2604. Outputs of the receiver components are collected and provided as output signal 2214. In this particular embodiment of the present invention, a single transmitter circuit 2612*a* is provided for transmitting an interrogation signal 2622 in response to a control signal 2618. An RFID tag 2616 is shown disposed on the surface of the structure 2604.

The receiver component 2612*b* comprises an antenna component (e.g. 2413 in FIG. 24A) for sensing the a response signal from the tag 2616. The receiver component further includes circuitry (not shown) for detecting a response signal picked up by the antenna. The receiver component constitutes a portion of the conventional interrogator device such as the one shown in FIGS. 24A and 24B. In this particular embodiment of the invention, the transceiver component of a conventional interrogator is separated into a transmitter circuit component 2612*a* and plural receiver circuit components 2612*b*. The plural receiver components are disposed about the structure 2604.

FIGS. 26B and 26C show the propagation of a response signal 2624 from the tag 2616 after irradiation by the interrogation signal 2622. FIG. 26C is a top view taken along view line C-C in FIG. 26B. The figures illustrate the limited range of the response signal, and the consequent detection of the signal by less than all of the receiver components 2612*b*; in this case, receiver components A-D are shown having sensed the response signal. The tag 2616 is shown physically associated with a document 2602 illustrated in phantom.

Figure 28:
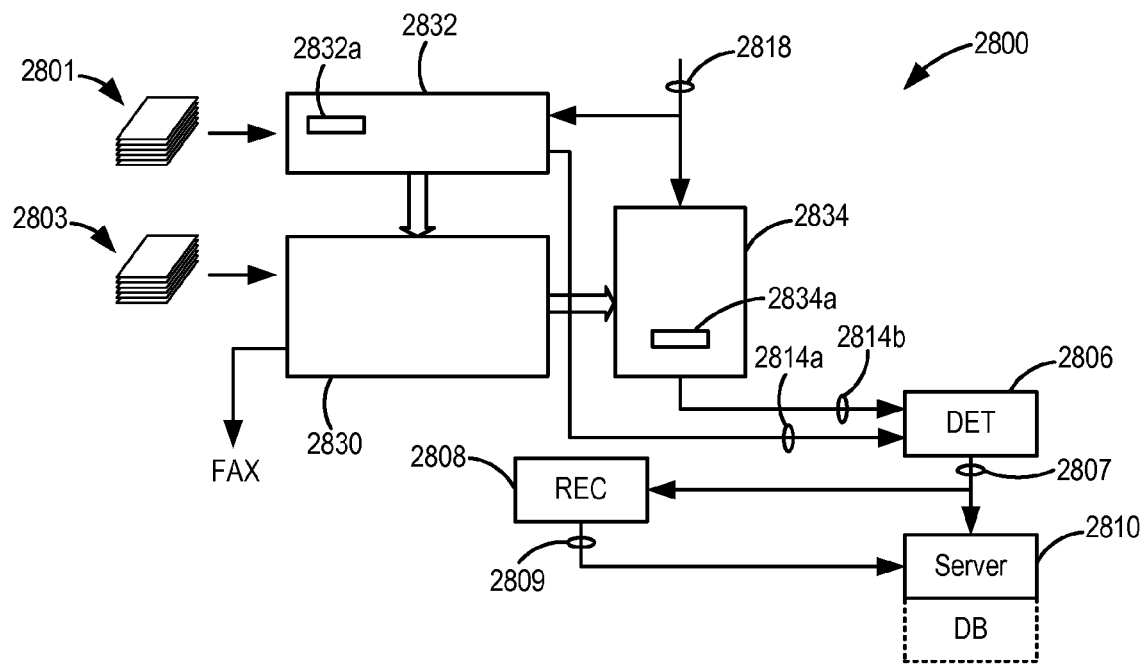
FIG. 28 shows a block diagram of a document processing system incorporating various aspects of the present invention.

FIG. 28 is a block diagram illustrating document monitoring in accordance with yet another embodiment of the present invention. The figure shows a document processing apparatus 2800. For example, this might be a copier machine, or a facsimile transmission device, or a printer, and so on. The document processing apparatus comprises a document source 2801, abstractly represented by a stack of documents. An input component 2832 processes the document source. For example, in the case of a copier or facsimile transmission device (fax), the document source might be the physical documents being copied and the input component is an imaging device. The document source could even be a data connection to a data processing device, where the document is electronically provided to the copier or fax. In the case of a printer, the document source 2801 is likely to be a network connection to a document server or some data processing device, and the input component might be a network interface component to receive the electronic data constituting the document.

The input component 2832 is coupled to a document production component 2830 to produce copies or printout. A paper source 2803 feeds paper stock to the document production component. In this embodiment of the invention, the RFID tags can be physically associated with the produced document by the document production component. For example, a feeder mechanism for adhesive tags can be incorporated into the document production component that attaches tags to the paper stock as it passes during a copying operation or a printing operation. As another example, a stapling mechanism having a magazine of staples comprising RFID tags can bind and tag multi-page documents. Alternatively, the paper stock itself may be "tagged paper", having RFID tags incorporated directly in the paper.

In the case of a facsimile transmission device, the document production component 2830 might comprise data communication circuitry for connecting to a remote facsimile transmission device and communicating an electronic copy (FAX) of the document to the remote device.

The document processing device 2800 includes a suitable output tray 2834, provided for receiving the copy; e.g., copied document, printed document, or the originals.

A detection module 2806 includes a signal connection 2814*a*, 2814*b* to either or both the input component 2832 and the output tray 2834. As will be discussed below, the signal connection provides information about the document(s) present in the input component and/or the output tray. The detection module feeds a signal 2807 to a recording component 2808 and to an appropriate server system 2810.

A recording component 2808 is provided to record information that identifies an individual. The recording component can include an input device for users to key in or otherwise provide information indicating their identity, which can then be use to activate the document processing device 2800. The recording component can include a video recording device which produce an image 2809 of the individual. The image can then be fed to the server 2810 which can perform appropriate image analysis to determine the individual's identity.

In one embodiment, the input component 2832 may include an RFID interrogation device 2832*a* for sensing source documents 2801 which contain RFID tags. A control signal 2818 is coupled to the input component to control the interrogation device; e.g. to produce the interrogation signal. In the case of a copier, the recording component 2808 can obtain information indicating of the user. The information can be an identification code or an image of the user. When source documents 2801 are fed to the copier, the input component 2832 can sense tags in the source documents and send appropriate signals 2814*a* to the detection module 2806. The signals fed to the detection module might include tag identifiers. The identification information supplied by the recording component and the tag information supplied by the detection module can be processed by the server 2810. The server can then enable (by way of suitable control signals, 2818 for example) the copying function based on the information received.

For example, the tag information can be mapped to some information that identifies the document. As discussed above, this information can be anything, such as a document identifier, an image of the document, and so on. The tag information, also can be mapped to corresponding permission information dictating what actions (copy, fax to a specific destination, etc.) are permitted for the particular user for the particular document. In general, a requested action of the document processing device 2800 can be enabled or disabled based on information collected by the recording component and on the information received by an RFID interrogation device 2832a contained in the input component 2832.

In yet another embodiment according to the present invention is the incorporation of a hash code in a re-writable RFID chip (tag). The hash code (see, for example, the web site at "http://userpages.umbc.edu/~mabzug1/cs/md5/md5.html" for a discussion of the md5 hash algorithm) can be applied to a digital representation of the document (e.g., post-script (ps), or scanned image) before it is printed. The md5 hash is supposed to produce a unique 128 bit output for every unique document. The hash code can be stored in the RFID chip. Later, a user needing to verify that two physical documents have exactly the same content can merely scan the RFID chip and compare the hash codes. Note that a visual side-by-side comparison of two document can be difficult, especially if there are only small differences between the two versions of the document (e.g., just a few words are different). However, the comparison is extremely easy if the hash codes are used. Also, note that the two documents being compared might have been printed at different times by different people in different locations, according to different formatting rules (e.g., single column format or double column format). The use of hash codes to compare two such documents would be extremely accurate. Also, note that the comparison could be made at different locations by different people, but sharing a common communication channel. This could be part of a contract signing process in which the same contract is printed at different locations by different people. The md5 hash code could be read from the chip and printed (i.e., handwritten) on the contract near the signature line. Images of the signed contract could be exchanged between the signatories. Each would be guaranteed that the content of the contract was exactly the same.

In accordance with still another embodiment of the invention, the output tray 2834 may be provided with one or more interrogation devices 2834a disposed as illustrated, for example, in FIG. 22. In this embodiment, any documents having physically associated RFID tags can be monitored for movement in the output tray. This can include monitoring for a change in position of the document, or its removal. When sensitive material is left in the output tray, it might be desirable to detect a change in position which can indicate that someone moved some documents to have a look at the sensitive information.

When movement is detected, an appropriate signal from the interrogation device(s) is produced as discussed above. The interrogation output signals 2814b can be sent to the detection module 2806. The detection module can then signal the recording device 2808 to capture audio and/or visual information of the vicinity to record the event and the individual who caused the event. This information can then be sent to the server 2810 along with information obtained by the detection module from the output tray to record what document was moved (or removed), when the event occurred, and the individual who caused the event.

The server 2810 can act as a central database to store the document history mentioned above. Document history can be accumulated in numerous ways. For example, "unconscious capture" of documents is a technique whereby automatic document capture occurs without being initiated by the user. Such techniques are disclosed in commonly owned U.S. Pat. No. 5,978,477 and U.S. patent application Ser. No. 09/347,953, filed Jul. 6, 1999, the entire contents of which are herein incorporated by reference for all purposes. Other document capture schemes, of course, can be used to create the document history database. The history that is accumulated can then be searched based on content to retrieve documents and to view their security histories.

A desirable characteristic of the document security system of the present invention would be for the documents to carry their security histories in the RFID chips. This can be accomplished by using re-writable RFID chips. Thus, in accordance with another embodiment of the present invention, a re-writable RFID tag can be used to store portions of the document history. Referring back to FIG. 28, the RFID interrogation devices 2832a and/or 2834a can be configured to produce signals suitable to effect storage of information on re-writable RFID tags disposed in the documents.

Re-writable RFIDs allow users to easily determine information like when the document was printed, when it was removed from the output tray, who removed it, when it was moved on a desktop, etc. Storing the security history on the chip simplifies later access to that information since a network connection or retrieval from a central database are not required. It is can be appreciated that similar history information could be computed for documents that do not have re-writable chips (i.e., simple read-only chips). Such information would be stored in a central database (e.g., component 2810 in FIG. 28) for storage and retrieval of that information.

In an implementation of this embodiment of the invention, the security history of a document includes information representative of the locations where a document was present, when it was present at those locations, when it was moved while at those locations, and when it was removed from those locations. An example of an entry in such a history might be:

"15 page document 215624" printed Printer_8780 "Aug. 12, 1998" 15:47

This identifies the document generically as a 15 page document and associates that with a unique identification number that can be used to retrieve the contents of the document from a central database. It also identifies the device it was printed on (Printer_8780) and the date and time when it was printed. Of course, this information could be compressed with generally well known techniques such as zip to reduce the storage space required on the chip.

The next entry in the history list would show the date and time when the document was removed from the output tray of the printer:

"15 page document 215624" removed Printer_8780 "Aug. 12, 1998" 16:08

This could be performed by the interrogation devices 2832a and/or 2834a that monitor the motion of the RFID chip attached to this document. The device(s) could include circuitry that writes the memory of the chip at the instant when the document is removed from the output tray.

However, it is possible that the speed of the physical removal from the tray may exceed the speed of operation of that circuitry. In an alternative embodiment, the device(s) could include rewriting circuitry that constantly rewrites the last history entry (the "removed" record) in a chip. This can be done while the document is present in the output tray but before it is moved. In this way, no matter how fast the document is removed, the time of that removal can be recorded.

Figure 29:
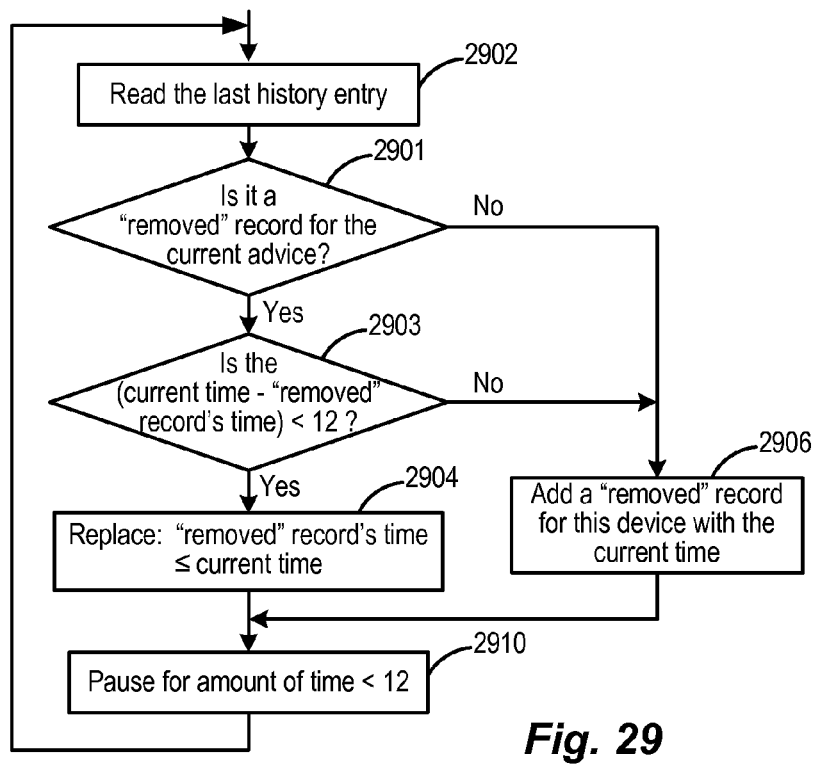
FIG. 29 is a flowchart highlighting the steps for writing to a re-writable RFID tag.

FIG. 29 is a flowchart highlighting the steps for the rewriting process of the rewriting circuitry. When a document comes into contact with the document security system, it reads the entry in the RFID tag in a step 2902. If it is determined in a step 2901 that the tag does not contain a "removed" record, then it is added in a step 2906. If there is a "removed" record in the tag, then the history rewriting circuitry, in a step

2903, will determine whether the amount of time since the last history update exceeds a threshold, t2. If any of these conditions are satisfied, a new "removed" record is added to the history list (step 2906) and the updating process begins again (step 2910). If the threshold t2 is not exceeded in step 2903, then the stored recorded time record is simply replaced in a step 2904 by a record with the current time. It can be appreciated that this same updating algorithm could be used for an output tray monitoring application, a desktop security implementation, or other similar document tracking system. However, the time threshold value might be different.

Figure 30:
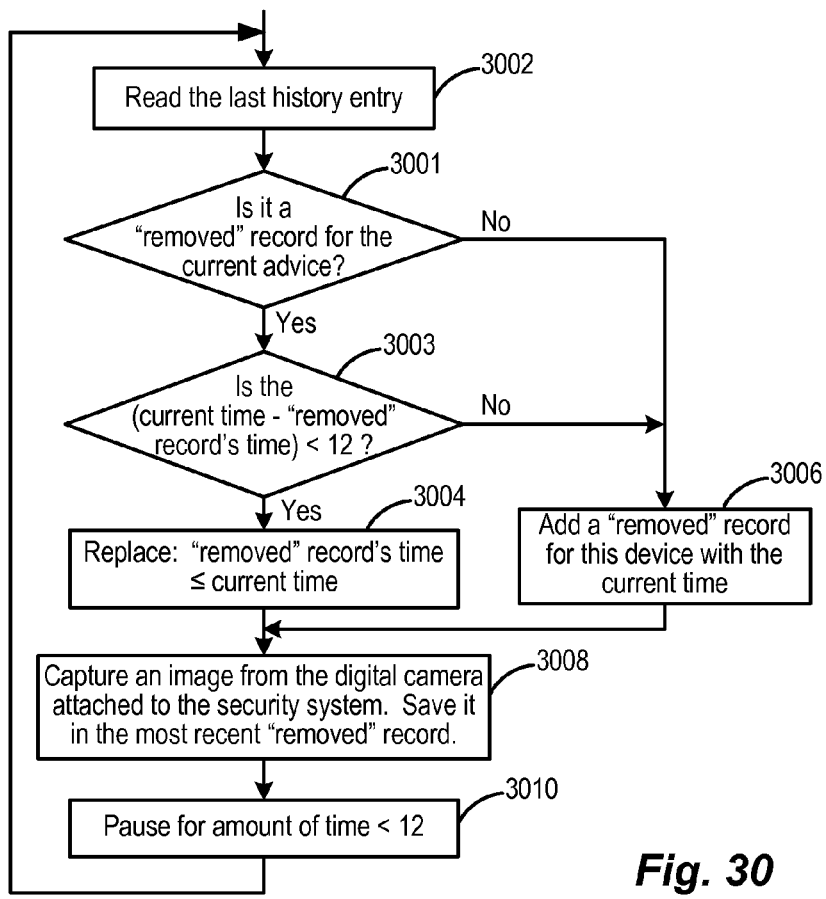
FIG. 30 is a flowchart highlighting the steps for an algorithm for writing to a re-writable RFID tag which includes image capture.

A modified version of this algorithm (shown in FIG. 30) could also store an image in the "removed" record captured by a camera attached to the security system, step 3002. Even though many irrelevant images might be captured, the algorithm would guarantee that the image finally stored in the "removed" record would be of the person who removed the document from the device.

Method and Apparatus for Tracking Documents in a Workflow

Figure 31:
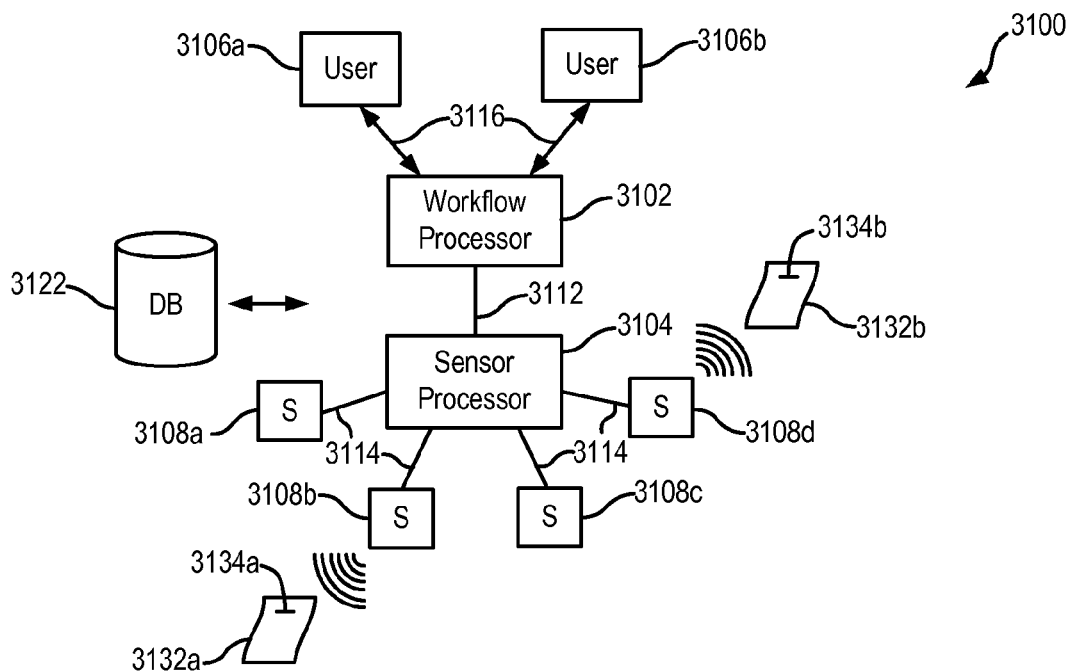
FIG. 31 is a simplified block diagram of a sensor arrangement for monitoring documents in accordance with an embodiment of the present invention.

FIG. 31 is a highly generalized block diagram of a document workflow system in accordance with an embodiment of the present invention. A workflow processor 3102 represents the component that provides the functionality commonly found in typical workflow systems. Typically, this includes a computer component, such as a personal computer, running appropriate software. It can be appreciated that the workflow processor can be any appropriate computing configuration or platform. Some functions provided by a workflow system include identifying documents to be routed in the workflow. The workflow includes a workflow graph which identifies the paths along which the participating documents are to be routed.

Figure 32A:
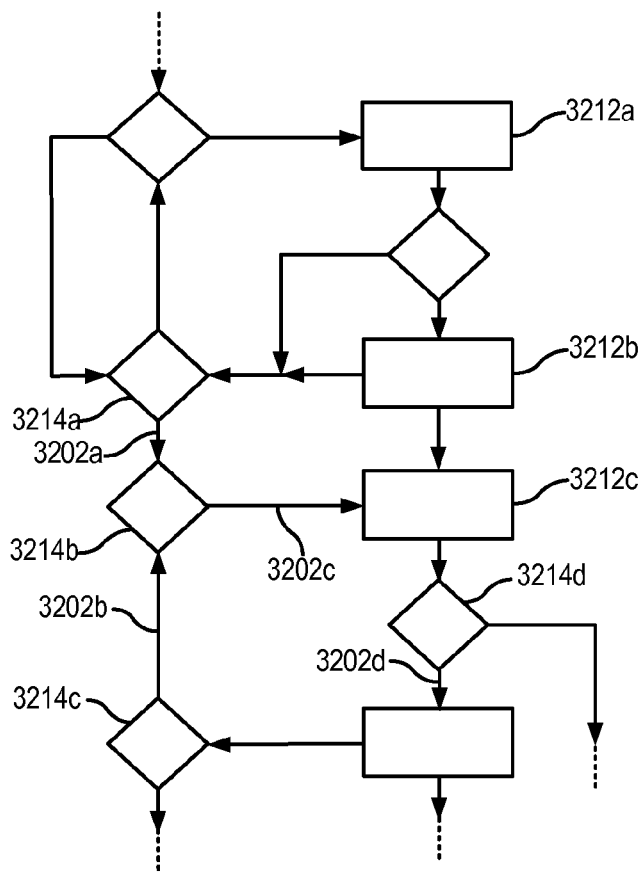
FIG. 32A illustrates an example of workflow.

Referring to FIG. 32A for a moment, a portion of a typical workflow is illustrated. This representation is an exemplar of a graphical representation of a workflow, used to illustrate aspects of embodiments of the present invention. It can be appreciated that actual workflow systems will include additional tools for the user.

A workflow comprises a plurality of stages (nodes of the graph) 3212a-3212c and 3214a-3214c, for example, at which an action is performed on the document(s). Each stage represents a location in the operation where the document can be routed; e.g. someone's office, or some other appropriate location for a particular given operation. The action may be a simple acknowledgment of having received the document, or the action may be something more interactive such as a review and/or editing or other annotation made to the document. The action may be a copy operation, a fax operation, or the like. There can be different kinds of stages. For example, stages 3212a-3212c are examples of simple store and forward stages where a document is received, an action might be performed on the document, and the document is then passed on. Stages 3214a-3214c, for example, are branching stages where the document flow can proceed along alternate paths. The workflow is further defined by edges 3202a-3202d, for example, which connect the stages together to complete the flow graph.

In the particular example shown in FIG. 32A, a graphical representation of a workflow is illustrated. It can be appreciated, however, that other representational forms are possible. For example, it may be more appropriate under certain situations to represent a workflow in a textual format. A machine interface may use a representational form more suitable for communication among computing equipment.

Returning to FIG. 31, the workflow processor 3102 may be provided with appropriate user interfaces 3106a, 3106b. As noted above, the user interface can be a graphical user interface (GUI) presented on a suitable display device and having appropriate input devices (e.g., keyboard, voice input, mouse, and other commonly used input devices) to facilitate creating and editing workflows. While a GUI is an appropriate interface, a textual interface can also be used. Each user interface is in communication with the workflow processor via an appropriate communication channel 3116, such as a network-type of connection, a direct connection to the processor, a modem connection, and so on.

The workflow system shown in FIG. 31 further includes a sensor processing component 3104. This component can comprise a single computer device, or other appropriate configuration. Sensors 3108a-3108d are disposed about the plurality of locations which can be included in a workflow. In one particular implementation of an embodiment of the invention, the location of each sensor is known to the sensor processing component. In another particular implementation, each sensor can provide information about its location to the sensor processing component. Each sensor can communicate information to the sensor processing component over a channel 3114.

It can be appreciated that in a large enterprise, the sensors might very well be distributed over a large geographic area. In such a case, the sensor processing component 3104 might comprise a network of local computers where each local computer handles sensors local to that computer. For example, a set of sensors in an office in Paris might be linked to a local computer in that office, while a second local computer might be used to link together the sensors in an office in Tokyo. In such cases, it is understood that an element (e.g., sensor 3108c shown in FIG. 31) can be viewed as a logical, recursively defined, representation of a local sensor group, comprising a plurality of local sensors and a local computer communicating. The local computer communicates sensor data from its local sensors to the sensor processor 3104.

In accordance with this embodiment of the invention, each sensor $3108_i$ is sensitive to proximity of one or more documents being routed in a workflow. In a particular implementation of this embodiment of the invention, a radio frequency identification (RFID) system constitutes the sensor subsystem. RFID is a versatile wireless solution for identification. It has a wide range of applications, from tracking books in a library to monitoring the movement of cattle on a ranch.

Figure 33A:
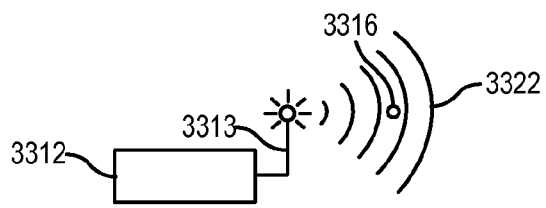
FIGS. 33A and 33B show a radio identification system as used in an implementation of an embodiment of the present invention.
Figure 33B:
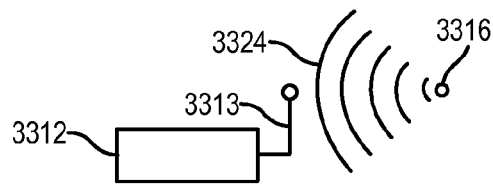

Referring for a moment to FIGS. 33A and 33B, a basic RFID system comprises three components: an antenna component (coil) 3313, a transceiver component 3312, and a transponder (commonly called an RFID tag) 3316. The antenna component 3313 emits radio signals to activate the tag 3316. Antennas are available in a variety of shapes and sizes.

Often, the antenna component 3313 is packaged with a transceiver component 3312 which typically includes a decoder module. This combination is referred to variously as a reader, an interrogator, and so on. In operation, the reader can emit radio waves 3322 (interrogation signal) in ranges of anywhere from one inch to several feet or more, depending upon its power output and the radio frequency used. The transceiver component produces the interrogation signal which is then propagated by the antenna component.

When an RFID tag passes through the electromagnetic zone of the interrogation signal, it responds to that signal and produces a response signal 3316 which is picked up by the antenna component 3313 and fed to the transceiver component 3312. The decoder module in the transceiver decodes the response signal to extract the data encoded in the tag and the data is passed to a host computer for subsequent processing.

RFID tags come in a wide variety of shapes and sizes. Some tags can only be read, while other tags can be read and written. For example, a product called the MU-chip by Hitachi, Ltd., is a 0.4 mm$^2$ chip that is thin enough (about 60 μm) to be embedded in paper, and contains a read-only memory (ROM) of 128 bits.

RFID tags are categorized as either active or passive. Active RFID tags are powered by an internal battery and are typically read/write, i.e., tag data can be rewritten and/or modified. The battery-supplied power of an active tag generally gives it a longer read range. The trade off of course is greater size, greater cost, and a limited operational life due to the limited life of the battery. Nonetheless, it can be appreciated that active tags can be useful in the present invention under appropriate operational requirements.

Passive RFID tags operate without a separate external power source and obtain operating power generated from the interrogation signal transmitted from the reader. Passive tags are consequently much lighter than active tags, less expensive, and offer a virtually unlimited operational lifetime. The trade off is that they have shorter read ranges than active tags and require a higher-powered reader. Read-only tags are typically passive and are programmed with a unique set of data (usually 32A to 128 bits) that cannot be modified. For example, the Hitachi MU-chip comes preprogrammed with a 128 bit data word.

In accordance with the present invention, physical documents have one or more RFID tags physically associated with them. Such documents can be referred to as "tagged documents." A plethora of attachment processes are possible. An RFID tag can be attached by the use of adhesives. A clip which gathers together a multi-page document can be provided with an RFID tag. For example, a paper clip may incorporate a tag, or a staple can be incorporated with a tag.

The attachment can be manual, or by automation. For example, a copying machine can be outfitted with RFID tagged staples or a dispenser of adhesive tags, so that stapled copies can be tagged by way of the staple, or single-page copies can be tagged with an adhesive tag. RFID tags (e.g., Hitachi MU-chip) can be embedded in the paper medium itself ("tagged paper").

In accordance with this particular implementation of an embodiment of the invention, each RFID tag is associated with a unique identification, referred to herein as a "tag identifier." Furthermore, when a tag is physically associated with a physical document, there is an association between the tag identifier and "document information" relating to the physical document. The document information might comprise an electronic copy of the physical document, an image of the document, a reference which identifies the physical or an electronic form of document, a reference identifying where an electronic copy of the physical document can be found, references to other documents, and so on. The document information might include information indicative of permissions, for example, whether a document can be copied or not. The document information might include ownership information, document modification history information. In general, one can appreciate that any kind of information may constitute "document information."

The document information can be collected at the time of creation of the document; e.g., when the document is printed, copied, faxed, or otherwise processed. The document information can be an accumulation of information collected during the lifetime of the document such as when modifications are made, or when copies are made, for example. A database system (not shown) can be provided to store such information, or other suitable information management system. The database or information management system can be used to provide the mapping between tag identifier and document information.

Returning to FIG. 31, it can be appreciated from FIGS. 33A and 33B that the plurality of sensors 3108a-3108d can comprise the transceiver and antenna component of an RFID system. Each sensor 3108, includes a transceiver circuit and an antenna for transmitting an interrogation signal and for receiving a response signal from a document 3132a. Each sensor further includes a communication component for communicating information received from the tag 3134a embedded in a sensed document (i.e., the tag identifier) to the sensor processing component 3104. The sensor processor then associates the tag identifier with the particular sensor that transmitted the information. In an implementation of an embodiment of the invention, the location of each sensor is known a priori. Consequently, the sensor processor can make the further association of tag identifier with location of the tag and its associated physical document. Finally, the database system can provide to the sensor processor a mapping of the tag identifier with an identity of the sensed document. Thus, it can be seen that the location of a document is known, insofar as the sensors can detect the document.

The workflow processing component 3102 is in data communication with the sensor processing component 3104 via communication channel 3112. Communication between the workflow processor and the sensor processor can be provided by any of a number of known communication techniques. In one embodiment of the invention, the two processing components could be subsystems in the same computer system. On the other hand, in a large enterprise where a distributed architecture may be more appropriate, the sensor processing component may comprise a plurality of local computer systems, each receiving tag information from its associated RFID tags.

The sensor processing component 3104 transmits to the workflow processor 3102 information indicative of the sensed (detected) document(s) and information representative of the location where the document(s) were sensed. Alternatively, the sensor processing component might transmit to the workflow processor the tag identifier along with information indicative of the sensor 3108, that received the information. The workflow processor can then make the necessary mappings to obtain a document identifier and its physical location. In a distributed environment comprising plural sensor processing computers, some of the sensor processors may provide the mapped information to the workflow processor, while other sensor processors might transmit the "raw" data to the workflow processor.

Figure 32B:
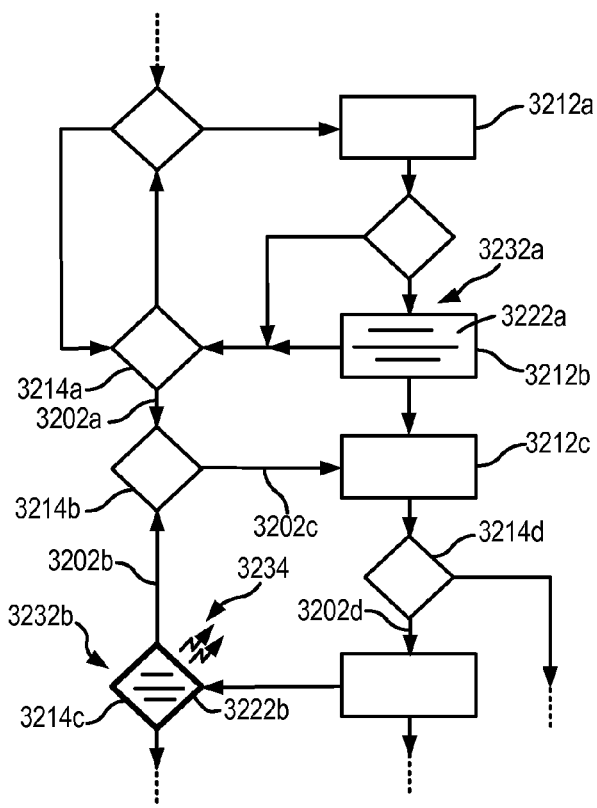
FIGS. 32B and 32C show enhancements to a conventional workflow according to an embodiment of the present invention.

Assuming the workflow processor 3102 is in possession of information relating to a document and information indicative of its location, the information can be used to enhance the workflow graph. Referring to FIG. 32B, the workflow segment illustrated in FIG. 32A is shown as it might appear in a GUI. The figure illustrates a tracking feature of document flow wherein the physical location of a document can be tracked without information provided by a user, sometimes referred to as "unconscious" tracking, automated tracking, and so on. Upon receiving an appropriate display command from the user, the workflow graph presented to the user (on a display, for example, as shown in FIG. 32A) can be enhanced with information from the sensors 3108, received from the sensor processing component 3104.

As an example, in FIG. 32B the current location 3232a of a document is indicated by highlighting (or some otherwise visually indicating) the node (stage, 3212b) in the workflow which corresponds to that current location. It can be appreciated, of course, that other indicating techniques can be used. Additional information 3222a can be presented as well. For example, information indicating an action taken on the document might be displayed, if available. The additional information can be another document(s) that has become associated with the document; for example, a reviewer of the document might attach, or otherwise associate, a related document to the document in the workflow.

FIG. 32B further illustrates that a document can be routed electronically. Thus, for example, stage 3214c is the current location 3232b of a second document. Here, the document is in electronic form. This can be indicated by a suitable graphic such as the "lighting bolts" 3234 intended to illustrate that the second document exists in electronic form.

Figure 32C:
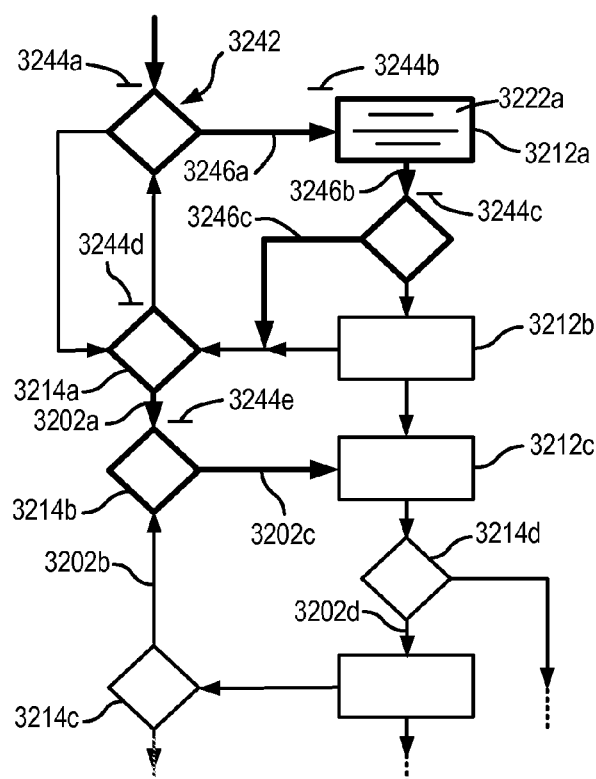

FIG. 32C illustrates another feature of the workflow system of the present invention. The tracking information collected by the sensor processing component 3104 can be used to compile a tracking history of a document in the workflow. The figure shows an example of such a display. A tracking history 3242 comprises highlighted portions of the workflow indicating the stages and edges which constitute movement of the document in the workflow. Thus, for example, the edges 3246a-3246c and others are indicated by highlighting, or some equivalent visual indication. The stages where the document was sensed are also shown highlighted. Collectively, the highlighted portions pictorially show the flow of the document. It might be useful to have additional information 3244a-3244e associated with each stage in the tracking history. For example, a time stamp indicating the time of detection at each stage can be stored and displayed. Other additional information 3222a can be associated with each stage as discussed above; e.g., action taken on a document, related documents can be associated with the document being tracked, and so on.

Figure 34:
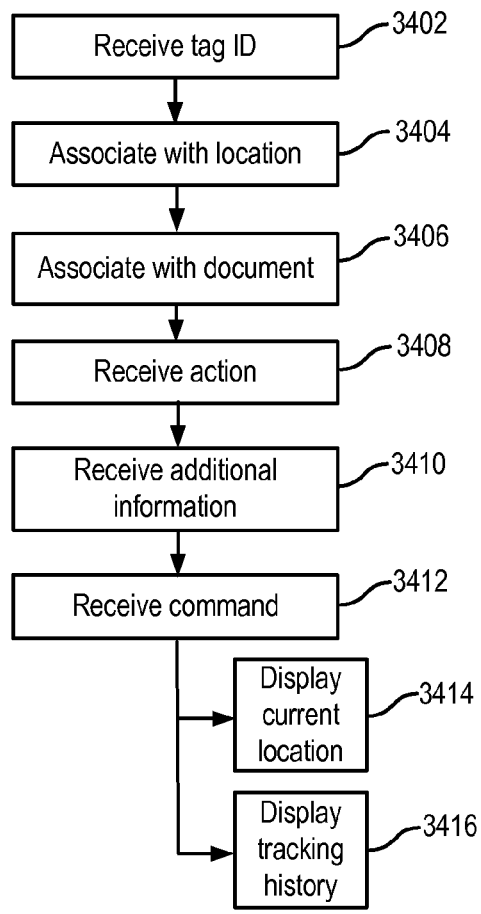
FIG. 34 illustrates high level processing according to an embodiment of the present invention.

FIG. 34 is a high-level flow chart illustrating processing steps of a workflow system according to the foregoing aspects of the present invention. At a step 3402, a sensor 3108, detects the proximity of a document 3132a. This includes receiving a response signal from the tag 3134a that is physically associated with the document in response to an interrogation signal. The response signal includes information indicative of a tag identifier associated with the tag. At a step 3404, the sensed tag information is associated with information indicative of the location of the sensor which detected the response signal. As discussed above, locations of sensors can be known a priori by the sensor processing component 3104. Alternatively, a sensor can be appropriately configured to communicate some information along with the tag identifier that indicates an identity of the sensor itself A mapping of the sensor identity can be made to determine its location. In yet another alternative, an indication of the location of the sensor can be communicated to the sensor processing component. A time stamp can be associated with the tag identifier to indicate when the document was detected and the location of the detection.

At a step 3406, the tag identifier is associated with the document. This can be accomplished using information contained in a database 3122, for example containing a mapping between tag identifiers and document identifiers.

Certain actions can be taken on the document at steps 3408 and 3410. For example, the recipient may simply acknowledge receipt of the document. The user may annotate or otherwise modify the document; e.g., by associating other documents with it, and so on. The user interface 3106, can provide the necessary access and functionality to effect such actions. These actions can then be associated with the tag identifier by the workflow processing component 3102.

The user can enter a display command at a step 3412 to display all or a portion of the workflow. The user might submit a command to display the current location of a particular document or documents. At a step 3414, the association among the information made in the foregoing steps can be used to identify the location(s) of the document(s). The workflow can then be displayed where those stage(s) corresponding to the identified location(s) are highlighted in an appropriate manner to show their current locations. If tracking history is desired, then in a step 3416 the workflow graph can be displayed in a manner to highlight the flow of the document in the workflow graph.

Figure 35:
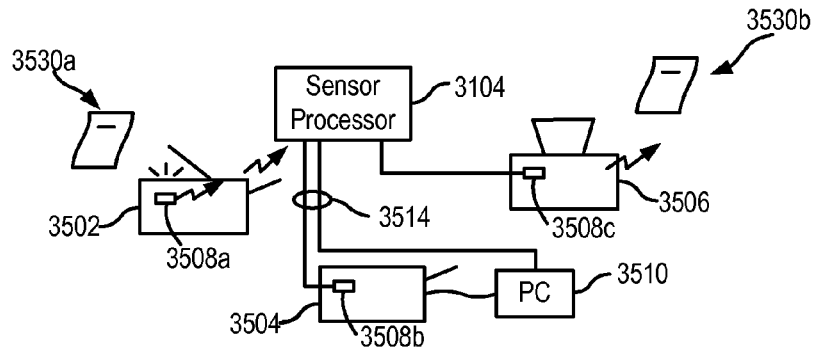
FIG. 35 show various sensor configurations for detecting actions that can be performed on a document.

FIG. 35 shows some additional sensors which can be incorporated in various document processing devices. A copying machine 3502 can be equipped with a sensor 3508a. Thus, if a copy of a tagged document 3530a is made, the sensor can detect the presence of the tagged document and indicate to the sensor processing component 3104, the action of a copy having been made. This action is then associated with the tag identifier.

Similarly, a printer 3504 having a sensor 3508b can detect printing of material. Stock paper, having physically associated with it one or more tags, can be detected by the sensor when processing a print job sent by a PC 3510. A communication link 3514 from the printer and the PC can provide to the sensor processing component 3104 information indicating the tag identifier and the document being printed. This establishes the existence of the printed document, and subsequent tracking of the document in the workflow. In addition, the action of the printing of the document can be associated with the document, and subsequently displayed to a user in the manner discussed above (see, e.g., FIGS. 32B and 32C).

The element 3504 can also represent a scanner device having a sensor 3508b. When a tagged document is scanned, the sensor can detect the tag of the scanned document and communicate the tag identifier to the sensor processing component 3104. The scanned data is stored in the PC as a document. A document identifier can be communicated to the sensor processing component to be associated with the tag identifier. In this way, a tagged document in the workflow can be converted to electronic form. This action of scanning can be captured and associated with the document.

FIG. 35 shows a facsimile transmission (fax) device 3506. This device is also equipped with a sensor 3508c. When a tagged document in the workflow is faxed to a recipient via the fax device, the sensor obtains the tag identifier and communicates that information to the sensor processing component 3104. There, the tag identifier is associated with the document identifier, as well as the action of being faxed. In addition, the fax device can communicate the fax number of the receiving machine to the sensor processing component.

Figure 36:
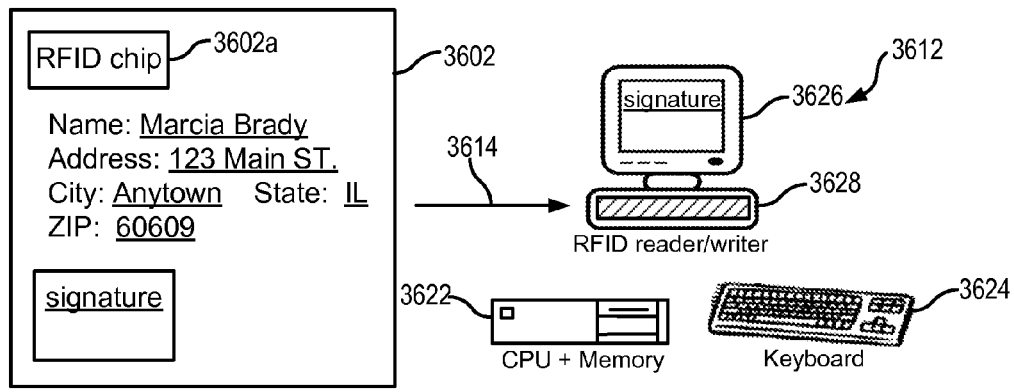
FIG. 36 illustrates an example of a workflow appliance in accordance with an embodiment of the present invention.

FIG. 36 shows an implementation of an embodiment according to another aspect of the invention, incorporating the use of re-writable RFID chips. When the RFID chips embedded in documents are re-writable, an "autonomous" workflow functionality can be provided for users not connected to an online workflow processor 3102. This can be done by describing the workflow that contains the given document 3602 and the position of the document in that workflow in a standard way. Such a description language would provide a means to specify the actions that have been performed on that document and the actions that can be performed on it in the future.

Users would scan a re-writable RFID chip 3602a contained in the document 3602 using a suitable device 3612 (more abstractly referred to as a workflow appliance). The workflow appliance can include a CPU (central processing unit) or other similar data processing component 3622, a memory component 3624, a display 3626, and a device 3628 for reading and writing the RFID chip 3602*a* and to provide user services such as logging in and so on. The workflow description 3614 can be downloaded from the RFID chip to the workflow appliance which displays the workflow diagram. The display can indicate where the document is in that diagram and what actions the user could take on that document. After the user takes one of those actions, it is recorded on the chip and the diagram is updated and rewritten on the chip. That data can optionally be encrypted with the next receiver's public key. When that user opens the document, he can decrypt it with his private key.

If the workflow description language is in a standard format, users of an autonomous workflow system can easily process documents produced by different service providers. For example, Blue Cross might use an Oracle Workflow system for their medical claim forms and Cigna might use an IBM system. However, the workflow appliance in a Doctor's office does not need to know that. The information added to the form, such as the name, address, and diagnosis code for the patient, can be recorded on the chip using the standard format.

A further aspect of the various embodiments of the present invention include information recorded on the re-writable RFID tag 3602*a* to direct the user to take certain actions. This provides a certain level of autonomous behavior in the document, where the document can require the recipient of the document to take actions in a context-directed manner. Information can be written to the RFID tag 3602*a* along the way in the workflow at its various stops by a backend workflow server. The information in the RFID can be updated at each stop, or only at certain stops, depending on the situation. In an extreme case, the RFID can contain the entire workflow in which case the document is in essence a fully autonomous document, instructing it's recipients (via an appropriately configured workflow appliance) where the next stop is, or what the next action is.

Figure 37:
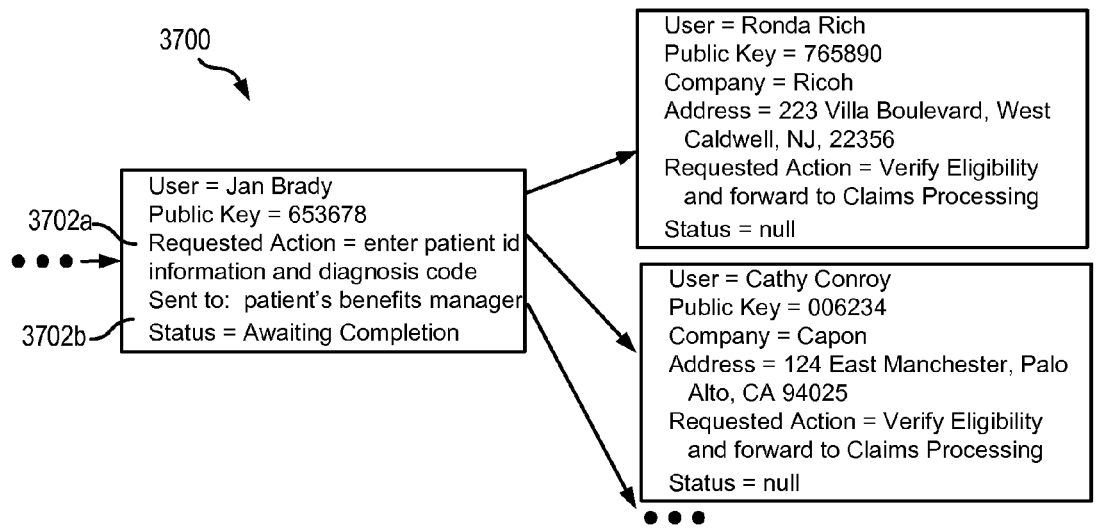
FIG. 37 illustrates an example of a partial workflow diagram of a forms processing system.

For example, the fragment of a workflow diagram 3700 depicted in FIG. 37 shows an action 3702*a* being requested of a user Jan Brady. She has been asked to enter the identification information for the patient, the diagnosis code, and to send the form to the employer's account manager. The routing information for the possible receivers (the account managers) is provided so Jan knows where to send the paper form after it has been filled out. This diagram fragment can be represented in a text-based format (e.g., XML) as shown in FIG. 38. Before the form is filled out, the status 3702*b* is "awaiting completion." After the form has been filled out, the status is changed to "in transit" as it is being sent to the intended receiver. Since the hypothetical patient works for the Ricoh company, the paper form was sent to Ronda Rice at 223 Villa Boulevard, West Caldwell, N.J. since she's the benefits manager for that company. It can be appreciated that this aspect of the invention allows for disparate workflow systems to co-operate, despite the differences in workflow procedure and policy that are likely to exist among the different systems. The amount of information contained in the RFID tag, of course, will depend on the storage capacity of the device. Additional devices may be incorporated. It can be appreciated that system requirements, functional requirements, performance requirements, and other such factors will determine specific implementation details.

An external workflow system can be informed of this updated workflow diagram either online, or asynchronously (e.g., via an email message), or not at all. Since the updated diagram is carried in the chip 3602*a*, a network connection is not required when the document's information is updated. This can be a significant advantage since the physical location where the update occurs does not need to be equipped with a network connection. In fact, a simple workflow status-updating appliance is sufficient.

The workflow appliance reads the standard workflow description from the chip, determines the actions that are possible, displays those actions to the user, provides a means for the user to enter the result of such an action, and rewrites the memory of the chip to indicate the action that was performed. For example, the workflow appliance 3612 shown in FIG. 36 can be suitably configured with appropriate software to process documents in a financial institution's workflow. The user is being asked to verify the validity of the signature on the form by comparing it to information in the account record. The result of this action, as well as the time, date, and place where it was performed, are recorded on the chip. By reading and writing a standard workflow description language, the appliance can process documents that are represented in a workflow system provided by any vendor that supports such a standard interface language. Standard workflow interface descriptions that provide interoperability between workflow systems are under development by industry groups such as the Workflow Management Coalition (see, for example, the web site at "http:\\www.wfmc.org").

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A paper document output device comprising:
   a print subsystem configured to produce, based on an electronic representation of a document, a hardcopy of the document on one or more pages of physical media;
   a tag subsystem configured to write an identifier to a radio-frequency identification (RFID) tag physically associated with the one or more pages of physical media, the identifier uniquely identifying the hardcopy of the document; and
   a communications subsystem configured to enable communication between the paper document output device and a host device, wherein the communication subsystem is configured to:
   receive the electronic representation of the document from the host device; and
   after the identifier has been written to the RFID tag, transmit to the host device the identifier and information about a physical location of the hardcopy of the document, for storage in a paper document tracking database, wherein the paper document tracking database includes correlation information linking the identifier and the physical location of the hardcopy of the document.

2. The paper document output device of claim 1 wherein the physical media is standard office paper.

3. The paper document output device of claim 1 wherein the paper document output device is a laser printer or a laser copier.

4. The paper document output device of claim 1 wherein the paper document output device is configured to generate the identifier.

5. The paper document output device of claim 1 wherein the RFID tag is physically associated with the one or more pages of physical media by being embedded in at least one page.

6. The paper document output device of claim 1 wherein the RFID tag is physically associated with the one or more pages of physical media by being attached to a surface of at least one page.

7. The paper document output device of claim 1 wherein the RFID tag is physically associated with the one or more pages of physical media by being attached to an object that is physically associated with at least one page.

8. The paper document output device of claim 7 wherein the object is a staple or a clip.

9. The paper document output device of claim 1 wherein the paper document output device is configured to generate the RFID tag as a sticker or label.

10. The paper document output device of claim 9 wherein, subsequent to generating the RFID tag, the paper document output device is configured to affix the RFID tag to at least one page of the one or more pages of physical media.

11. The paper document output device of claim 1 wherein the tag subsystem is further configured to write the electronic representation of the document to the RFID tag.

12. The paper document output device of claim 1 wherein the information about the physical location of the hardcopy document is same as a physical location of the paper document output device.

13. A method comprising:
receiving, by a paper document output device from a host device, an electronic representation of a document;
producing, by the paper document output device based on the electronic representation, a hardcopy of the document on one or more pages of physical media;
writing, by the paper document output device, an identifier to a radio-frequency identification (RFID) tag physically associated with the one or more pages of physical media, the identifier uniquely identifying the hardcopy of the document; and
after the identifier has been written to the RFID tag, transmitting, by the paper document device to the host device, the identifier and information about a physical location of the hardcopy of the document, for storing in a paper document tracking database, the paper document tracking database including correlation information linking the identifier and the information about the physical location of the hardcopy of the document.

14. A non-transitory computer readable storage memory having stored thereon program code executable by one or more processors of a paper document output device, the program code comprising:
code that causes the one or more processors to receive, from a host device, an electronic representation of a document;
code that causes the one or more processors to produce, based on the electronic representation, a hardcopy of the document on one or more pages of physical media;
code that causes the one or more processors to write an identifier to a radio-frequency identification (RFID) tag physically associated with the one or more pages of physical media, the identifier uniquely identifying the hardcopy of the document; and
code that causes the one or more processors to, after writing the identifier to the RFID tag, transmit to the host device, for storing in a paper document tracking database, the identifier and information about a physical location of the hardcopy document, wherein the paper document tracking database includes correlation information linking the identifier to the information about the physical location of the hardcopy of the document.

15. The method of claim 13 wherein the paper document output device is configured to generate the identifier.

16. The method of claim 13 further comprising writing the electronic representation of the document to the RFID tag.

17. The method of claim 13 wherein the information about the physical location of the hardcopy document is same as a physical location of the paper document output device.

18. The non-transitory computer readable storage memory of claim 14 wherein the program code further comprises code that causes the one or more processors to generate the identifier.

19. The non-transitory computer readable storage memory of claim 14 wherein the program code further comprises code that causes the one or more processors to write the electronic representation of the document to the RFID tag.

* * * * *